United States Patent

[11] 3,617,717

| [72] | Inventor | Lawrence R. Smith |
| | | Phoenix, Ariz. |
| [21] | Appl. No. | 819,877 |
| [22] | Filed | Apr. 28, 1969 |
| [45] | Patented | Nov. 2, 1971 |
| [73] | Assignee | Motorola, Inc. |
| | | Franklin Park, Ill. |
| | | Continuation-in-part of application Ser. No. 770,284, Oct. 24, 1968, now abandoned. This application Apr. 28, 1969, Ser. No. 819,877 |

[54] OPTIMIZING CONTROL SYSTEMS
46 Claims, 23 Drawing Figs.

[52] U.S. Cl.................................................. 235/151.1,
235/150.1, 162/262
[51] Int. Cl....................................................... G05b 13/02
[50] Field of Search.......................................... 235/150.1,
151.1, 151.11; 318/561

[56] References Cited
UNITED STATES PATENTS
| 3,428,791 | 2/1969 | Chandos | 235/151.1 |
| 3,466,430 | 9/1969 | Hardaway | 235/150.1 |

OTHER REFERENCES
Korn et al., Electronic Analog and Hybrid Computers, N.Y., McGraw-Hill, 1964, p. 524–525 QA76.4 K67

*Primary Examiner*—Eugene G. Botz
*Attorney*—Mueller and Aichele

ABSTRACT: Orthogonal Modulations of process control variables produces modulation of a performance indicating signal. This performance indicating signal is processed to generate a plurality of control signals indicative of direction and magnitude of change of a process control variable toward obtaining optimum performance. Each control signal results from multiplying the performance indicating signal by its respective modulation signal followed by integration and a sample and hold circuit. Primary control signals may be imposed on the process control with the optimumly controlled variables interacting with such primary control through process interactions. The integrated control signals are sampled during time periods small with respect to the shortest time period of the orthogonal modulation. The process control permits the process being controlled to settle down after each optimum control period. Adaptive feedforward techniques are described. Phase reversal of modulation between successive measurements improves noise immunity. Random noise modulation of frequency of modulation and phase reversals also increases noise immunity.

INVENTOR.
LAWRENCE R. SMITH

FIG. 2 - LEGEND

| | | | |
|---|---|---|---|
| P | PERFORMANCE INDICATING SIGNAL | + | LINEAR MIXER |
| S | OPTIMUM PERFORMANCE INDICATING SIGNAL | C | ANALOG CONTROLLER |
| X | OPTIMIZING CONTROL SIGNAL | A | OPERATIONAL DIFFERENTIAL AMPLIFIER |
| D | PRIORITY WEIGHTING FACTOR | ∫ | INTEGRATOR |
| j | MAXIMUM NUMBER OF CONTROLLED INPUT SIGNALS | SH | SAMPLE-AND-HOLD CIRCUIT |
| —(N)— | CABLE WITH N SIGNAL PATHS | G | PULSE GATE |
| ■ | ANALOG GATE | K | MAXIMUM NUMBER AT INPUT VARIABLE QUANTITIES |
| | | ⊗ | MODULATOR |

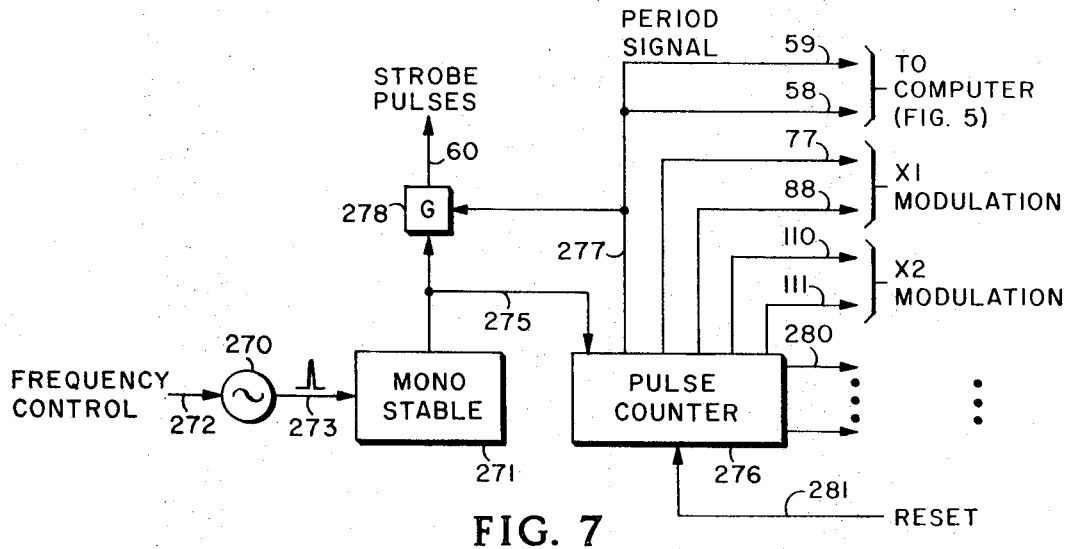

FIG. 7

INVENTOR.
LAWRENCE R. SMITH
BY
Mueller, Aichele & Rauner
ATTORNEYS

INVENTOR.
LAWRENCE R. SMITH

PROCESS CONTROL MODEL—558

CLOCK AND MODULATION SOURCE FOR
PHASE REVERSED MODULATION

IDEALIZED SIGNALS SHOWING PHASE-REVERSED MODULATION

ABSOLUTE OUTPUT ERROR COMPUTER

INVENTOR.
LAWRENCE R. SMITH
BY
Mueller, Aichele, & Rauner
ATTORNEYS

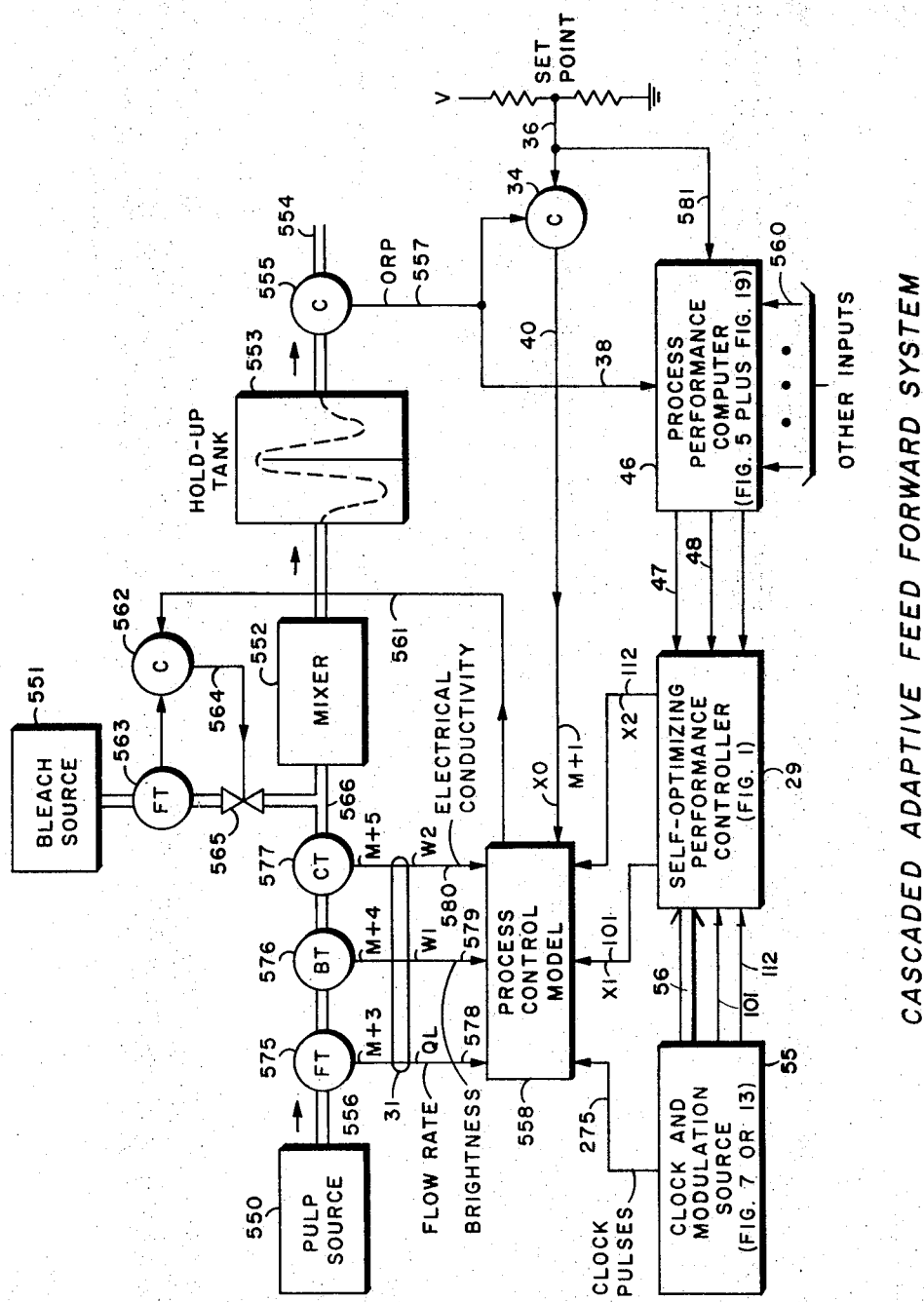

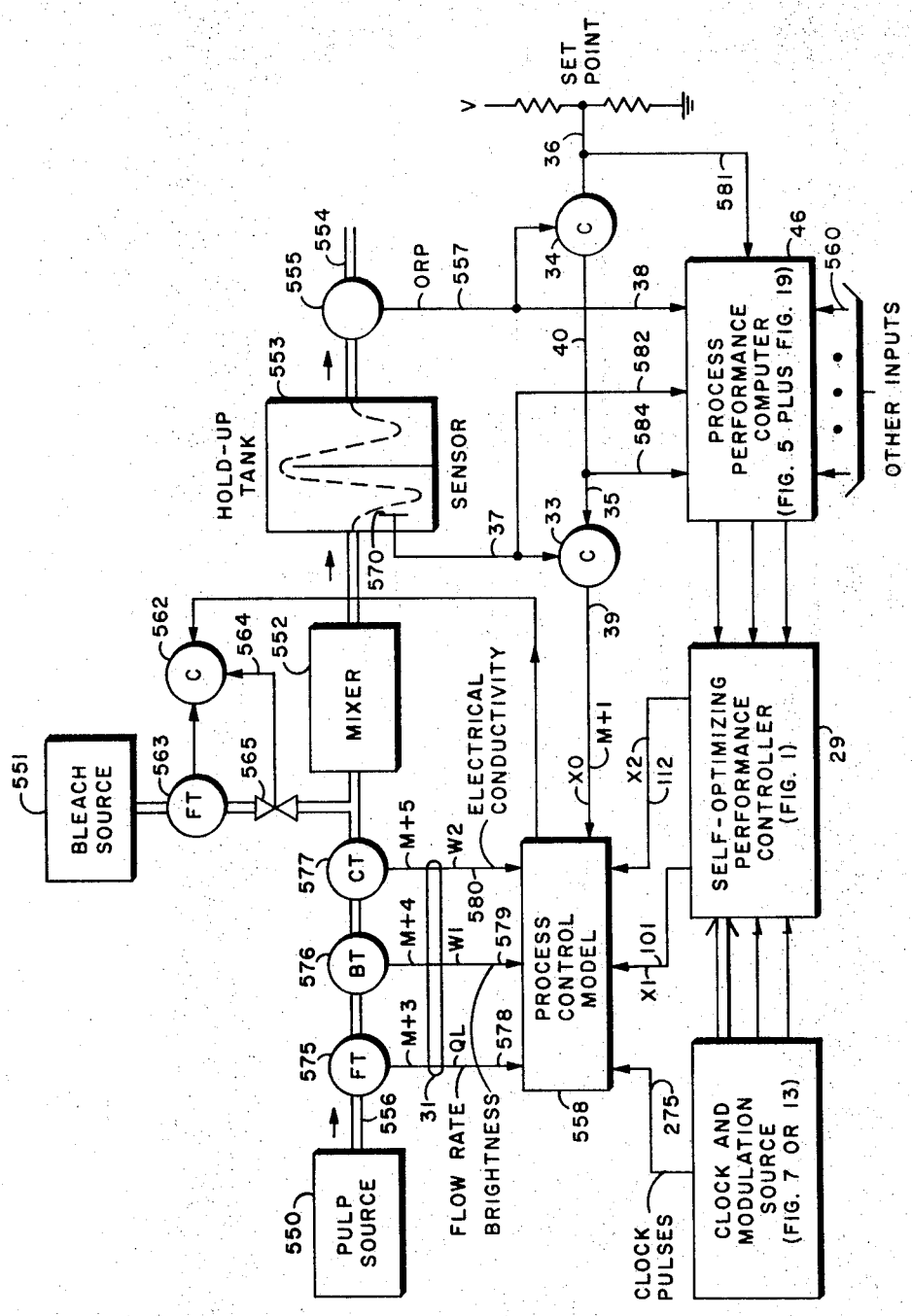
FIG. 16 CASCADED ADAPTIVE FEED FORWARD SYSTEM

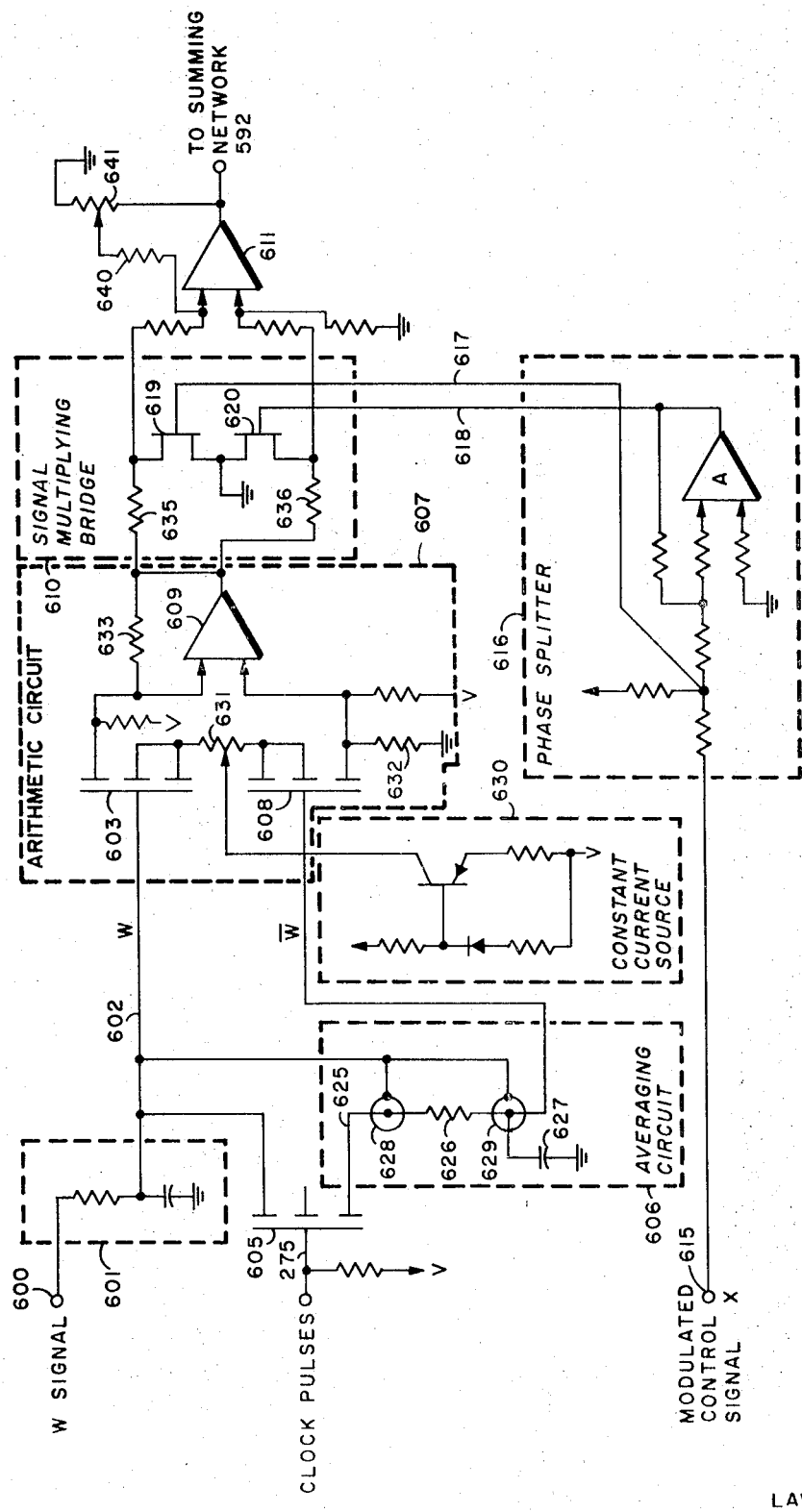
FIG. 18 ADAPTIVE LINEAR MODEL

LEAD-LAG NETWORK 721

LEAD-LAG CHARACTERISTICS

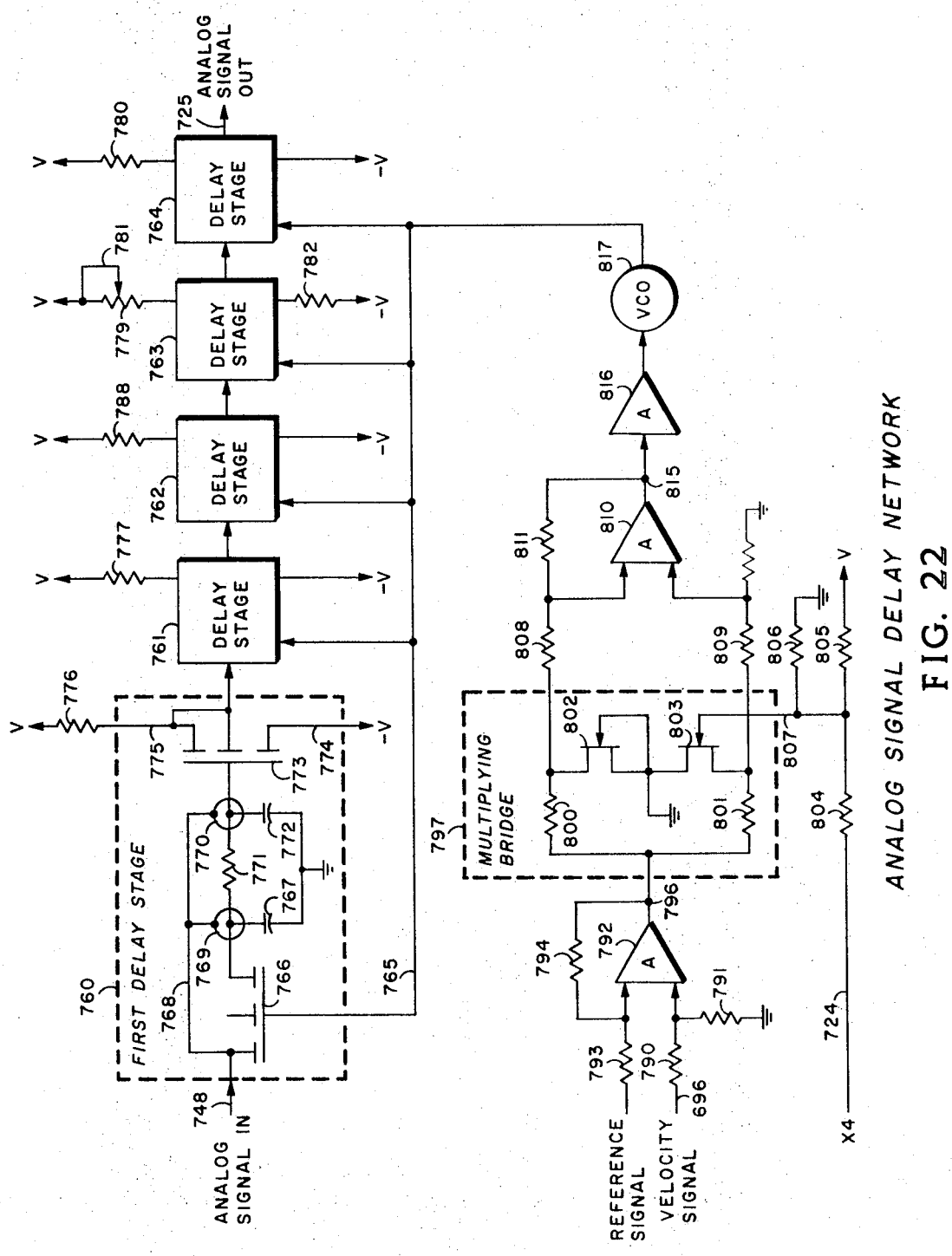
FIG. 22 ANALOG SIGNAL DELAY NETWORK
INVENTOR.
LAWRENCE R. SMITH
BY
Mueller, Aichele & Rauner
ATTORNEYS

OPTIMIZING CONTROL SYSTEMS

RELATED APPLICATIONS

This application is a continuation-in-part of application Ser. No. 770,284, filed Oct. 24, 1968 (Group 236), now abandoned.

An analog memory system referred to in the specification of this application is described in detail in Ser. No. 702,440 filed Feb. 1, 1968, in the name of the present applicant.

A control channel circuit is described in application Ser. No. 770,288, filed Oct. 24, 1968, in the name of the present applicant.

BACKGROUND OF THE INVENTION

This invention relates to supervisory control systems, particularly to those of the adaptive-control type, i.e., control systems for optimizing performance of a process toward a given performance criterion or objective.

The history of analog control, dating from the flyball governors on 18th century steam engines to the industrial three-mode controllers of the 1930's, has been concentrated on the stability of single control loops. By contrast, unit processes used in modern refineries and chemical processing plants involve several control loops. Modern economic conditions dictate a multidimensional control approach to these processes where emphasis is on optimizing the overall performance by interrelating existing control loops.

Optimization is defined as a technique which varies controlled variables for maximizing or minimizing a performance criterion, deemed necessary through changes in four major categories:

1. Environment—variations in ambient conditions (e.g., weather) that affect pressure, temperature, etc., so changing compressor capacities, heat exchange rates in air and water coolers, etc.
2. Plant/Process—variations in flow dynamics due to coking of lines, changes in catalyst activity with respect to time, heat exchange rates due to fuel quality, steam pressure, etc.
3. Process Fluid—variations in feed characteristics, molecular makeup, heat content, flow rates, etc.
4. Economics—variations in costs of feedstock, steam, fuel, etc.

A straightforward analysis of the process being controlled determines the dependent manipulated variables that have a dominant effect on the performance criterion or objective. Also, operating constraints can readily be established where limiting bounds are necessary to maintain safe or desired operating conditions. The optimizing function is to find the optimum values of the manipulated or controlled variables that best satisfy the performance criterion within such operating constraints.

In manually controlled systems, control room operators spend many hours adjusting controller set points and noting the resultant effect on process performance. The variables were merely "regulated" irrespective of optimizing process performance and optimization, if performed, was performed by the operators. That is, in such manual systems the process fundamental variables such as flow, pressure, temperature, level, etc., are controlled at set points established by manual adjustment. These variables are described as "regulated" or controlled variables. When the term "regulated" is used, it means that the variables are held at a preset level relatively independent of process disturbances and of variations in each of the other regulated variables. A process is not truly optimized by simply regulating the process variables. One of the primary reasons for regulating the variables is to make them independent of each other so as to be readily adjustable to levels of operation necessary to obtain satisfactory performance.

Unfortunately, the problem of optimization (i.e., making a product to specification at maximum profit) is often a relatively complex function of the various independent regulated variables. The necessity of also operating the plant within safe bounds further complicates the total performance or optimization problem. Such restrictions are termed "constraints" on process performance. Still further complications in optimizing process operation are created by uncontrolled variables such as inputs to the process that are changing with time which may modify the complex relationship of the various independently controlled variables for optimum operation.

In recent years the application of digital computing machines has focused attention to the automatic optimization of analog control loops in systems referred to as supervisory control systems. These digital computer systems attempted to provide some adaptation to process conditions of the supervisory control system.

In optimizing performance of a process, economic factors can be made as the overriding consideration. This approach results in economic benefits such as:

1. Higher Profits—increased yield due to reduction of off-spec material.
2. Controlled Quality—product meets spec within closer tolerance.
3. Utilities Costs—lower due to better utilization.
4. Labor Costs—lower due to increased efficiency.
5. Less Downtime—in changing product quality grades.

In assessing the total economic incentives for improved control, it is necessary to balance the above list against the capital costs of installing the multidisciplined control system. The lower the cost of such a control system and its installation, the sooner an optimizing control can be used to advantage.

A given process can be analyzed to determine a given process objective, i.e., minimum cost of operation, maximum profit from product produced, and the like.

The values of the independent regulated variables to minimize the total cost of operation or accomplish another performance objective change with time. This changing requirement results from changes in uncontrolled variables, such as ambient temperature, process input, aging of the process, etc. Because of these changes with time it is quite difficult, if not impossible, for a human operator to adjust the regulated variables to maintain optimum performance. This difficulty is increased when the operator is restricted to very small changes (large changes can disrupt operation particularly when large changes degrade performance). The difficulty is perhaps the greatest on processes with long response times because operators do not have the ability nor patience to appropriately make small changes separated by long time intervals. A control system that automatically adjusts the independent regulated variables to minimize the total cost of operation and maintains this minimum cost or that rapidly reestablishes optimum operation after a severe upset or change in operation is desired. Such a control system is termed an "adaptive control system," an "optimizing control system" and the like.

During such adaptive optimizing control, the dollar expenditure should be minimized which means that the cost of operation should be reduced as rapidly as possible. Further process operation should be such as to minimize the uncertainty of process performance about the optimum point, i.e., be operated in a stable manner at optimum. It is extremely desirable that any errors be as small as possible. This stability factor means that the system should reach optimum in a well damped manner.

The system should be designed such that the action of optimizing does not amplify or make worse upset conditions with resulting large changes in regulated variables. An operator will recognize abnormal conditions and will wait for these conditions to subside prior to exercising manual optimization. The same procedure should be followed in automatic optimization of process performance.

Most processes generate noise or receive noise from external sources which may interfere with the control of such processes. The process noises are not always random. For example, noise from 60 cycle power lines, rotating electric machines, natural resonances of actuators, sensors or other process related equipment are capable of generating noise having periodic characteristics. The amplitude of such noise may be as large, if not larger, than the modulation of the controlled variable as effected by a process control system. If the periodicity of such periodic noise is harmonically related to the modulation period, such noise produces errors in the generation of control signals. This error appears in the gradient of any optimizing action of an optimizing control system which utilizes periodic modulation, as taught by the present invention.

If the periodicity of the noise is nearly harmonically related to the modulation of the variables, the error introduced into the control of the process can also be serious. In this latter situation, such resulting errors in the control signals can slowly change from positive to negative and then alternate therebetween for generating a beat modulation of the variable being controlled. Such action can result in an undesirable periodic wandering or deviation of the controlled variable from the optimum or desired operating point which is not compensable by many process control systems. This type of error is more serious than that which may be caused by a random noise. Random noise will cause a controlled variable and, therefore, process performance to deviate from optimum or desired operating point on a statistical basis. It is very desirable that the standard deviation of the distribution of the controlled variables from their optimum or mean value be minimized.

Process noise can contain a periodic signal of very low-fundamental frequency. In those processes wherein the performance being optimized is periodically adjusted or reset to zero, this noise becomes periodic, with a fundamental frequency determined by the periodicity of such adjustment. Such noise is synchronous or approximately synchronous with the modulation of the controlled variables. This undesired action can occur in the practice of certain aspects of the present invention and of other process control systems using periodic adjustments of the performance variables. This self-generated synchronous noise can produce errors in the calculations of the gradients utilized to control the process. Such a self-generated synchronous noise can result wherein there is a random upset which requires a relatively large change in the controlled variables. Such is not an unusual situation and therefore should be considered in the design and fabrication of process control systems. Such random upsets may introduce a transient into the process that causes the performance of the process to continue to change during a plurality of subsequent periodic measurement and decision cycles which are used to adjust the various controlled variables in the process. The periodic adjustment of the performance signal can produce synchronous noise and its effect can produce an error that results in an additional transient that can produce further error and resulting transient and cause changes in controlled variables in the same direction as caused by the original upset or disturbance. This cumulative effect may continue and a runaway condition will result until random noise by chance reverses its effect on the controlled variables. The net result may be that there is random cycling of the controlled variables resulting in the process control actually introducing additional variations from the desired operating point or optimum operating point. It is desired to have a process control system which will compensate for such errors and eliminate the accumulation of such errors.

Noise received from external sources can produce a similar effect as that just described for low-frequency periodic noise beats with the modulation frequency. For example, a performance continuously changing in the same direction, i.e., commonly referred to as ramping, is converted to a synchronous or approximately synchronous noise signal by the periodic adjustment of the performance signal which can cause degradation of process performance. Such ramping noise may be introduced by temperature changes or by process changes from previous adjustments of controlled variables which produce noise within the process resulting in errors in calculations of the process control system. Errors in the calculations of the control signals for these controlled variables having the lowest frequency of modulation are more susceptible to such ramping noise.

Some processes are characterized by a so-called dead-time and by large variations of material qualities that enter the process at its input. Such a situation can be effectively controlled only with feed-forward techniques. In the past, disadvantages of feed-forward control techniques included the necessity to determine and know the relationship of the optimum process control strategy to the measurement of the material qualities at the process input. Such disadvantage can be eliminated if adaptive feed-forward techniques that automatically determine the above control strategy are used. Bleaching, chemical blending, drying and others are a few examples of processes where improved control can be obtained by utilization of more than a single measurement of the quality of the process input, i.e., that measurements of quality of the materials to be processed in a bleaching operation. For example, these measurements at the process input can include measurements of flow rate, consistency, brightness, electrical conductivity and temperature of the material. These measurements made at process input can be readily made available for feeding forward to control the flow rate of a bleaching agent. In this particular example, consistency and measurement can usually be adequately controlled at a constant value. This regulation of temperature and consistency still leaves the remaining variables of flow rate, brightness and electrical conductivity to be fed forward for the control of the bleaching agent.

SUMMARY OF THE INVENTION

It is an object of this invention to provide a self-optimizing process control system wherein the speed of response can be altered in a facile manner without altering the gain of the system.

It is another object of this invention to provide a self-optimizing adaptive type of process control system which may be utilized by simple components with a wide variety of possible connections.

It is another object of this invention to optimally control a process in accordance with plural variables which are to be optimized and the optimization being derived through a single process performance indicating signal.

Another object is the minimization of the effect of noise on an optimizing control system.

Another object is to minimize initial tuning requirements of a control system. Tuning is simple and straight-forward.

Yet another object is to enable a process control system to ignore undue process upsets and yet take rapid optimization action upon the subsiding of such undue upset.

Another object is to provide adaptive feed forward in a process control system.

A feature of the invention is the provision in a control system of a single performance indicating signal derived from a plurality of measured variables to be manipulated with orthogonal modulations for the generation of plural control signals respectively modulated by the same orthogonal modulations.

A feature of the present invention is the utilization of plural orthogonally modulated or "dithered" control signals to effect a control function based upon a gradient of system response to such modulated control signals.

Another feature is the utilization in a control system of plural modulated control signals having a relatively small modulation such that a system nonlinear response permits linear changing of an input variable which after successive linear approximations still can approximate a nonlinear function. A principle involved in this feature is that principle forming the basis of the integral calculus. This feature of small modulation amplitudes further reduces the effect of this modulation on process performance.

Another feature of the invention is the provision in a control system of modulated control signals wherein the frequency of such modulation can be changed to adjust the speed of response of such control system without altering the gain of the system and without modifying the system components. Integrations of the modulated signals and of a performance indicating signal from which the control signals are generated is performed on a time sampling basis with respect to each modulation cycle; such time sampling period is small with respect to the period of one modulation cycle.

Another feature of the present invention is the utilization of orthogonal (including quadrature) modulation of control signals for making the response of a given control signal to a variation in the system performance indicated by a single performance indicating signal independent of the response of the system to other orthogonally modulated control signals. The orthogonal modulation is selected such that over a finite period of time the integration of the product of any two different modulation signals is zero, but over this same time period the integration of the product of any one modulation signal times itself is unity. In other words, the effect of the variables on the performance of the system being optimized is separated by the use of orthogonal modulation of variables respectively controlled by respective control signals. Such separation permits simultaneous but separate control to be effected wherein the interaction within the system being controlled is considered in effecting such control actions.

Another feature is to permit the delay of integration or permit the spacing of optimizing procedures such that the control system may be permitted to hold operational status of the control signals without optimizing action.

Another feature is the modulation of a control signal which is derived from a feed-forward control signal combined with another control signal to effect optimization of a controlled variable associated with the second control signal.

Another feature is the optimization of a process of the type described wherein some of the controlled variables are not modulated but have an association with modulated controlled variables in a manner that the process is still optimized, through interaction of all variables in the process being controlled.

Another feature is the provision in a process control system of an optimum range of operation for each variable in a set of variables and the removal of the effect of a measurement of a variable when in such optimum range from the generation of control signals.

A feature corollary to the immediately preceding feature is that when a control variable is out of bounds of a defined range of optimum operation, it then exerts a definite influence on the generation of control signals, not only the control signal directly associated with the measured variable, but control signals for other variables as well. Such influence is through interaction within the process being controlled.

A feature in conjunction with the preceding feature is a set of plural overlapping optimum operating ranges for a given variable. When operated in a first range, a first optimization is obtained; and when operating within a second range, a second optimum operation is obtained. The arrangement is such that when operating in the second range, the effect of measurements of such variable in adjusting system operation is determined only by the first optimum operation range characteristic. However, when the variable is out of range for both the first and second ranges, both ranges shall have an effect on the generation of a performance indicating signal for quickly adjusting the variable toward optimum system performance.

Another feature is a process control system which has two types of time periods in the given decision or control cycle. In one portion of the control cycle, optimization procedures of the control system are inhibited while a second portion of the optimization procedures is active. The active portion is a predetermined finite time to provide a finite time interval for integrating changes in the performance caused by orthogonal modulation of various control signals. These periods may be fixed or variable in accordance with a given system design.

Another feature of the present invention is the random-noise or pseudo-noise modulation of the frequency of the modulation of the controlled variables for increasing the insensitivity of the process control system to noise.

Another feature is the random-noise or pseudo-noise modulation of the periodicity of the decision periods to increase the immunity of the process control system to noise.

Another feature is the utilization of feed-forward techniques which are adaptively controlled to control a process in a self-optimizing manner.

Another feature is the utilization of phase reversals of modulation to increase immunity of the process control system to noise.

Another feature is the ability of a process control system to selectively delay measurement by selective amounts without the introduction of errors in the calculations of gradients utilized for the self-optimization of process control. The delays can provide time for the process to settle after a given decision or adjusted cycles for reducing the effect of synchronous noise introduced into the process from the adjustment of the controlled variables resulting from the decision cycle.

Another feature is the utilization of an asymmetrical modulation for cancelling the effects of synchronous or near synchronous noise on the process being controlled.

Another feature of the present invention is the interposition of a process model between a self-optimizing performance controller and the process being controlled. Such interposition gives additional degrees of freedom in exercising control over the process. The controller cooperates with the model of the process to effect an adaptive self-optimizing control thereover. Delays in the process may be incorporated into the model.

A control system utilizing the present invention for controlling a plant, process or other controlled system (hereinafter collectively referred to as "process") has a plurality of sensing devices for making measurements of the performance of the controlled process. A process includes any chemical, electrical, mechanical action in combination thereof or other action which may be controlled to effect a desired result. Electrical signals representative of such measurements are furnished to a performance evaluation computer. The computer is designed or programmed to generate a single performance indicating signal for a plurality of measurements based upon the measurements in accordance with an optimum performance of the controlled process. Each measurement is compared with one or more criterion to determine whether or not the measurement indicates the process is optimized. The computer supplies the performance indicating signal to a plurality of control channels. Each control channel supplies a control signal to the process for controlling at least one variable. The measurements may include variables that are not directly controlled.

The control signals are continuously modulated such that the performance of the system with respect to each variable varies such that a gradient of performance in accordance with the modulation is provided with control over the process being effected on that basis. The modulation signals for the respective variables are orthogonal such as to remove interaction between the modulation signals such that each control channel is uniquely responsive to the single performance indicating signal as it is effected only by the variable being controlled. The single performance indicating signal may consist of two complementary analog or digital signals. Such a control system accounts for interactions of the variables in the process being controlled.

A process is controlled on a cyclic basis. During each repeated control or decision period there is a holding period during which the process is not being optimized and an optimizing period during which control functions are analyzed and modified as necessary. The holding period permits the process to more or less settle down from a preceding optimizing period. During the holding period, the performance indicating signal is automatically zero adjusted to a reference value such as to assure that this signal is in the center of the linear range of its associated circuit. The control signal amplitudes are still modulated during the holding period.

The control channels each have integrators that integrate a product of the performance indicating signal with sets of strobe pulses which are gated by the respective orthogonal modulation signals. In this manner, a long time constant is provided in the integration functions. The period of sampling is short with respect to the period of 1 cycle of modulation. In accordance therewith the frequency of the orthogonal modulation signals may be altered without affecting the integration function and, therefore, without affecting gain of the control system. This fact means the speed of response may be altered by altering modulation frequency while process stability tends to remain high because gain is not affected.

Some of the controls in the process need not be modulated as above described. Such controls are constraints on the process. Plural controllers or other types of controlling devices may be utilized to control primary variables which are measured and the measurement supplied to the evaluation computer. The desired set point is optimized and the variables controlled by the controllers that do not have the modulation are also optimized through the interactions of the various variables in the process being controlled.

For the present system to be advantageously practiced there should be at least two variables and one constraint for a given performance objective or criterion. The relationship of the two controlled variables is then optimized to such performance objective. Additional constraints may be added on system performance. Optimization then is performed within those constraints. If the constraints are designed such that true optimum operation of the process is inhibited, the optimizing system causes operation of the process as close as permitted by the given constraints to the ultimate optimal operation as defined in the process performance of the evaluation computer or in its programming.

Another feature is the provision in a process control system of disabling all control actions upon the detection of a predetermined upset within the process being controlled. The inhibition of optimization may continue until the upset subsides, i.e., reaches a threshold upon which optimization of the process is reestablished. During the inhibition period the process control signals are maintained at the values existing just prior to the upset being detected. If the upset occurs during an optimization period, the effect of the first portion of the optimization period is erased and the process is then controlled as if the optimization period had never begun.

Additionally, the system provides for optimum filtering of the performance signal being accomplished simultaneously with changes in timing adjustment. The measurements of the system are delayed after each optimization decision to accommodate dynamics of the system such that false decisions do not result. This arrangement permits the system and the process to take relatively large process optimization steps when being operated distant from optimum without the introduction of errors on subsequent optimization steps.

Automatic zero adjustment permits large DC amplification of performance signals at any point within its input range without danger of saturation. This arrangement also eliminates slow thermal drift.

One or more of the variables within the system may be switched to manual or internal control and the process control system will then control the process to seek the optimum condition of the remaining variables with the manually or internally set point of variables being a constraint on the optimization of the process being controlled.

The process control system of the present invention may be utilized by adding to an existing control system. The standard controllers may be operated or actuated by the optimizing control system; i.e., the optimizing control system of this invention is utilized to supply set point signals to existing controllers in a process control system. This facilitates changing an existing process to be controlled by an optimizing control system.

The optimization can be cascaded, i.e., pyramided for plural optimization systems. In other words, four minor processes can be independently optimized. The four systems operating as a unit can then be optimized. For this purpose, the modulation signals for optimizing the four minor processes and the four processes taken as a whole are synchronized by an external instrument to prevent beat frequencies from affecting control of any of the processes. Also, provisions can be made for bumpless transfer from optimization control to external set point or to manual control or vice versa.

For noise immunity a clock and modulation source may be utilized which selectively reverses the phase of the modulation of the controlled variables. Such reversal may be in successive decision and holding cycles or may be generated by a random noise generator such that the reversals are in a pure random or pseudo-noise random manner. Further, the frequency of the oscillator driving the clock generator can be driven in turn by a random or pseudo-noise generator for altering the frequency of modulation in a random manner.

A process control model consisting of adaptive linear models which are summed together is interposed between a self-optimizing performance controller and a process being controlled. The process control model receives input signals representative of uncontrolled variables as well as performance indicating signals. The modulated set point or control signals from the self-optimizing performance controller are combined with the other received signals to generate a control signal directed to a controlling device for controlling the process; such generated signal may be a set point signal or a conventional controller. Such controls may be cascaded, i.e., a controller may generate a set point signal for a second controller which in turn supplies a control signal to the process control model. The process performance computer receives a performance associated with each of the two cascaded controllers for optimizing the process control model in accordance therewith. The adaptive linear models can be clocked with the same modulation utilized to modulate the controlled variables. The process control model may utilize analog delay networks for delaying the adaptively and modulated control signals in accordance with delays in the process being controlled. Lead and lag relationships may also be established within the process control model.

THE DRAWING

FIG. 2 is a legend identifying the various symbols used in the drawing.

FIG. 5 is a combined block schematic diagram of a process performance evaluation computer utilizable with the FIGS. 1 and 9 embodiments.

FIG. 15 is a flow diagram of a process and process control system utilizing a process control model interposed between a self-optimizing performance controller and a process being controlled and utilizing the teachings illustrated in FIG. 1 of the present application.

FIG. 16 is a diagram similar to that shown in FIG. 15 but with cascaded controllers for effecting a different type of control through the interposed process control model.

FIG. 18 is a schematic diagram of an adaptive linear model for use in the FIG. 17 illustrated process control model.

FIG. 22 is a simplified block and schematic diagram of an analog signal delay network usable with the FIG. 20 illustrated process control system.

DETAILED DESCRIPTION

Figure 1:
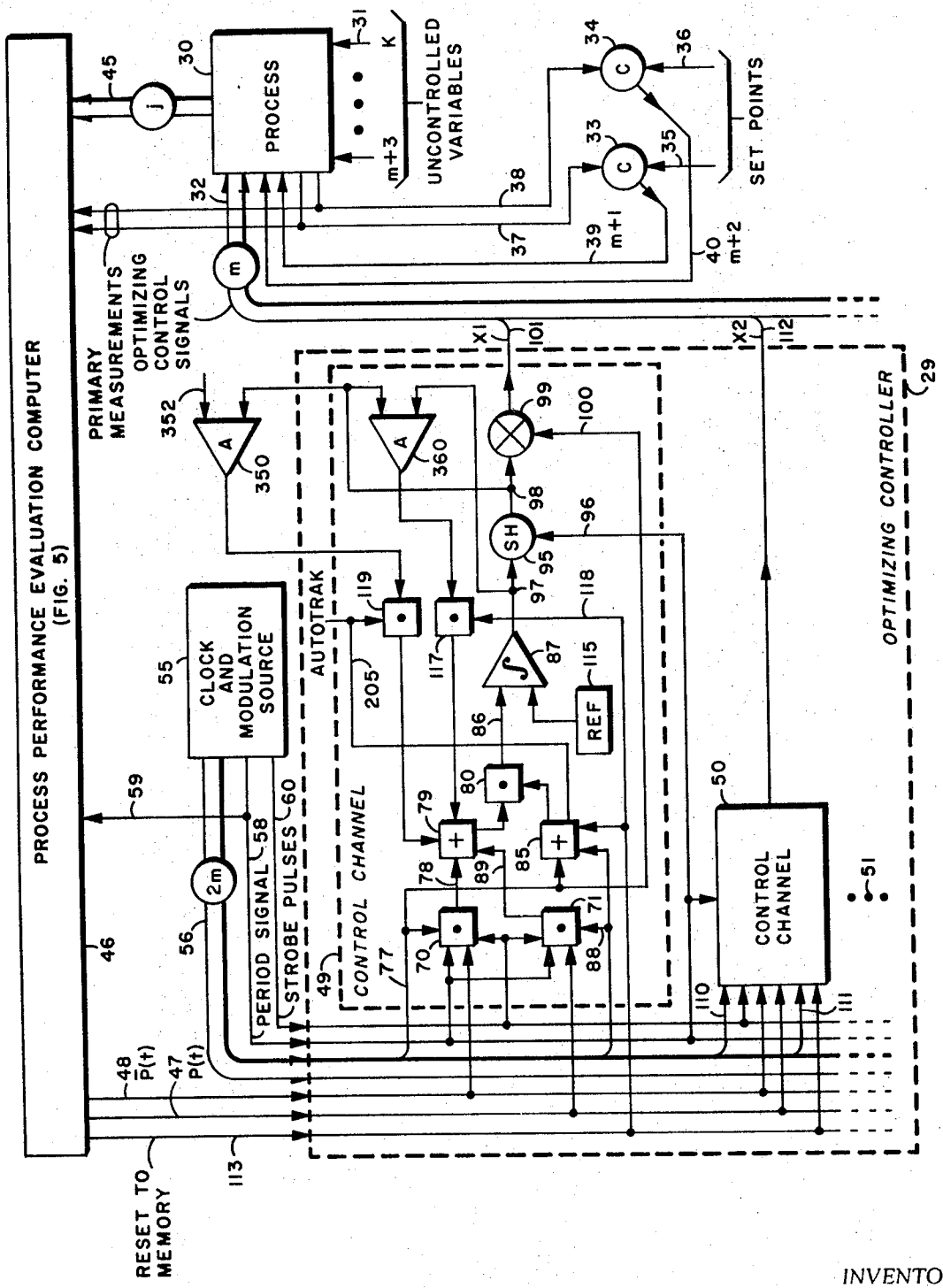
FIG. 1 is a simplified block diagram of a system illustrating a utilization of the present invention.

As used herein, the term "process" is meant to denote any actions of chemical, electrical or mechanical nature, or any combination thereof, which are controllable by a control system. It is expected that process controlling actions will vary with time, i.e., are usually a function of time.

In the drawing, like members denote like parts and structural features in the various diagrams. The specification is divided into labeled segments to facilitate a reading and understanding thereof.

THEORY OF OPERATION

The theory of the system is explained wherein the performance criterion is to minimize cost of operation. It is understood that other performance criteria may be utilized. The process performance $P(t)$ is a function computable from measurements of a plurality of variables indicative of system performance.

A process being controlled usually has a plurality of uncontrolled or unregulated input variables such as ambient temperature, viscosity of a fluid, wear and tear on equipment, and the like. Further, such a process has several variables that are controlled either through a controller of some type or by manual settings. Such variables can be speed of motor, flow rates, equipment adjustments such as vane positions in a pump or compressor, and the like. What the process is doing with the input variable is called "performances." Examples are efficiency of operation to obtain a desired effect, temperature of operating equipment, torque on a shaft, actual speed or rate of operation, and the like. Each of the various process performances can be collectively considered together to define a total performance $P(t)$ that varies with time, as will become apparent. This total performance is indicative of how the process is accomplishing a given objective, that is, whether or not the process is performing the desired function, i.e., pumping a fluid at a constant rate, at maximum efficiency. The various individual performances may affect total performance in varying degrees; therefore, in determining total performance, each performance may be scaled or given a particular weighting factor in accordance with its importance to total performance.

There is a complex interaction between a given variable and several performances. Usually one of the process performances is a function of several, if not many, of the input variables. For example, in a pumping station the performance of efficiency is a function of flow rate speed of the pump, vane adjustment of the pump, viscosity of the fluid, wear and tear of the equipment, etc. When adjusting one variable, not only is one or more performances affected, but the relationships of the other variables to the process performances are also changed. For example, if the speed of the pump is increased, then the position or adjustment of the pump vanes to obtain maximum efficiency is different. Such interrelationships in many processes may be subtle. It is in fact important to consider that changing one variable, i.e., motor speed, may degrade performance, i.e., efficiency, if another variable, i.e., vane position, is not also changed. An optimizing control system must take into account such interrelations and interactions on a concurrent or simultaneous basis, yet enable simultaneous independent control of certain variables to obtain optimization. The theory of such a system for minimizing cost is set forth below.

The total cost performance of any process can be expressed in terms of "cost of operation" as shown mathematically by the following equation:

$$P(t) = \frac{D1H}{2}(P1-S1H+|P1-S1H|)$$
$$+\frac{D1L}{2}(S1L-P1+|S1L-P1|)$$
$$+\frac{D2H}{2}(P2-S2H+|P2-S2H|)$$
$$+\frac{D2H}{2}(S2L-P2+|S2L-P2|)$$
$$\vdots$$
$$+\frac{DjH}{2}(Pj-SjH+|Pj-SjH|)$$
$$+\frac{DjL}{2}(SjL-Pj+|SjL-Pj|) \quad (1)$$

Wherein:
P1, P2, ..., Pj are positive-valued measured performances 1 through j,
S1H, S2H, ..., SjH are high specification limits for the respective performances P1 through Pj,
S5L, S2L, ..., SjL are low specification limits 1 through j for the respective performances P1 through Pj,
D1H, D2H, ..., DjH are the respective unit cost penalties for performances above the respective high specifications S1L through SjL,
D1L, D2L, ..., DjL are the respective unit cost penalties for performances P1 through Pj below their respective low specifications S1L through SjL.

The quantities between the slashed lines "/ /" absolute positive magnitudes. Each line in equation (1) contains two terms showing the effect of a given measured or calculated performance (one of the performances 1 through j) on total performance $P(t)$.

Figure 6:
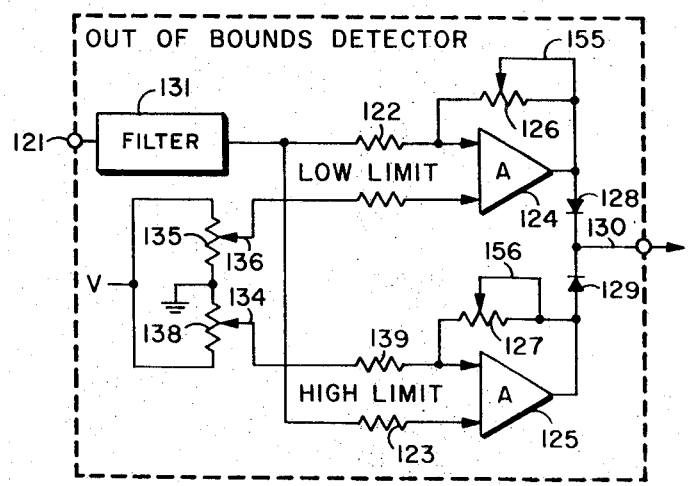
FIG. 6 is a schematic diagram of an out-of-bounds detector used in the FIG. 5 illustrated computer.

This formula is generic in that it can express total operating cost to any desired degree of accuracy. The form of the equation is ideal for analog circuitry since it can be implemented by summing 2j linear operational amplifiers and diodes of the form shown in FIG. 6. No limitation to the illustrated form of analytical element is intended. The FIG. 6 illustrated circuit (described in PROCESS PERFORMANCE EVALUATION COMPUTER) solves the two terms of equation (1) for each variable, hereinbelow set forth:

$$\frac{DjH}{2}(Pj-SjH+/Pj-SjH/)+\frac{DjL}{2}(SjL-Pj+/SjL-Pj/) \quad (1A)$$

Equation (1A) represents the effect of the *j*th performance on the total process cost performance. The cost performance Pj exceeding the high limit of operation, SjH, is the first left-hand term of equation (1A). The amount or deviation from specification is represented by Pj−SjH. If Pj is greater than SjH then the term (Pj−SjH+/Pj−SjH/) is twice the actual deviation from optimum specification. That is, the absolute magnitude of Pj−SjH appears twice in the term and is summed. Accordingly, the term is divided by two to make the term represent true deviation. If the measured *j*th performance Pj is less than or under the upper performance specification SjH, then as to that specification only, the variable is at optimum.

When the upper specification limit it not being exceeded, there should be zero penalty assessed; therefore, that portion of equation (1A) relating to the high specification limit should go to zero. Under such operating conditions the term Pj−SjH is negative, i.e., Pj is less than SjH. However, the term /Pj−SjH/ is equal in value but is always positive to cancel the signed term Pj−SjH.

The low bounds of operation specification are defined in a similar manner. Therefore, if Pj is less than SjH and greater than SjL, equation (1A) reduces to zero, i.e., zero cost penalty is indicated.

P1 through Pj are functions of the K independently regulated variables. If all of these performances are measured and manipulated by computing elements of the form referred to herein, then summed in a linear summing amplifier, optimum operation of the process is indicated when the output of the summing amplifier is minimized (total operating cost is minimized). In most cases, the individual performances, as well as bounded performances, will be maintained within their respective high and low specifications; but in all cases the plant will be operated at its minimum total operating cost as dictated by the system, specifications, and unit cost penalties. For example, if the cost penalty for exceeding a specification is more than offset by a decrease in cost by increased throughput, the process will operate at slightly off specification but high throughput. Bound penalties may be sufficiently high that operation cost outside of bounds is prohibitive.

Equation (1) represents in mathematical form a desired operation of a system incorporating the teachings of the present invention. In accordance with equation (1), the penalty or weighting factors are constant making the penalty a linear function of deviation from specification limits. However, no limitation thereto is intended; it is to be understood that nonlinear penalties may be used. It is easier to describe this system in terms of linear penalties because of straight line relationships.

A nonlinear cost performance function based upon equation (1) for one measured performance may be approximated to any desired degree by the use of several of these basic computing elements. This is analogous to the approximation of a curved function by several straight line segments. Fortunately, the cost penalty for exceeding a desired performance specification or bound can be approximated adequately in most applications by one or two straight line or linear approximations.

When intending to minimize the value of the total performance function P(t), all of the controlled variables are repeatedly adjusted to minimize P(t). These controlled variables may not be all of the input variables to the process. In that case, the controlled variables are repeatedly adjusted to minimize the total performance function even with the uncontrolled input variables, as will become apparent with a continued reading of the specification.

If it is desired that the high limit for a given performance be zero and this performance measurement is always above such high limit, then the penalty or weighting factor for performance of a controlled *j*th variable in equation (1) reduces to:

$$P(t)=(DjH)(Pj) \quad (2)$$

Equation (2) ignores the effect in process performance of performance measurements other than the *j*th performance measurement. As an example, equation (2) may represent fuel input to a process where it is desired to minimize cost. Minimum cost would be zero fuel input. Such requirement means the process performance objective is penalized by fuel usage. Such a requirement causes the control system to minimize fuel usage in accordance with the weighting factor DjH.

Restraints or bounds on measured performances are obtained by the use of identical computing elements with high assigned cost penalties (DjH and DjL). As long as these measurements are between their high and low specification bounds (SjH and SjL), they do not contribute to the defined total cost of operation; but when exceeding either limit, the cost of operation increases in accordance with the assigned cost penalty.

If more than one performance has a specified performance that can never be met, then optimum performance is obviously obtained when the combined cost penalties for not meeting specifications are minimum. This system performance will obviously be dependent upon the assigned magnitudes of the weighting factors, i.e., the assigned cost penalties.

It is recognized in process performance that the total performance being optimized is dependent upon all of the M controlled variables. It should also be recognized that each of the *j* performances may also be dependent upon many or all of the M controlled variables. M is an arbitrary number. Since in equation (1) it is desired to operate from a single performance indicating signal, the system must be designed such that any control channel effecting control does not react to variations in the system performance signal that are due to variations of another variable. For example, for one process there may be M control channels of an optimizing control system providing set point signals to M analog controllers for controlling M variables in the process. The magnitude of these set point signals is modulated such as to correspondingly modulate the system performance being optimized. By making the modulation of the different variables orthogonal such that over a finite time interval (from time T1 to time T2) the integration of the product of two different modulation signals is equal to zero, one performance indicating signal may be used to effect generation of the M set point or control signals as will become apparent. Such a finite time interval may be arbitrary but is usually chosen in accordance with the response characteristics of the system being controlled. Such independent or detectable variations in system performance can be ascertained if the following relationships for the orthogonal modulation are satisfied:

$$\int_{T_1}^{T_2} A(t) \cdot G(t)dt; \text{ results in 1 for } A(t)=G(t)$$
$$\text{or 0 for } A(t) \neq G(t) \quad (3)$$

In equation (3) the notations A(t) and G(t) represent two functions that vary with respect to time and are integrated over the finite time period T1 through T2. Equation (3) further states that the integral of the two functions is zero over the time interval T1 to T2 when the two variables are unlike. If the functions A(t) and G(t) are equal, then over that finite period of time the resultant integration is unity.

In applying equation (3) to the present invention, let A(t) represent the modulation of a control or set point signal supplied by a control channel to thereby modulate a system performance in a like manner. Then let G(t) represent the modulation components in the performance indicating signal produced by all control channels. Equation (3) states if the modulation components of the controlled variable A(t) and the modulation components of the performance indicating signal G(t) are multiplied and then integrated over the time interval T1 to T2, then all modulation components in the performance indicating signal result in a zero answer *except* where the modulation components are correlated with the modulated controlled variable.

In mathematical terms;

$G(t) = a_1 A_1(t) + a_2 A_2(t) + \ldots + a_M A_M(t)$  (3A) which assumes that the relationship of the total system performance to the controlled variables is linear over the range of the modulation. This is a good assumption for small modulation amplitudes.

Then $$\int_{T_1}^{T_2} A_1(t) \cdot G(t) dt = a_1 = \frac{\partial G(t)}{\partial A_1}$$

because $$\int_{T_1}^{T_2} Ai(t) Aj(t) dt = \begin{array}{l} 1 \text{ for } i = j \\ 0 \text{ for } i \neq j \end{array},$$

that is, modulation signals are orthogonal over the time interval from $T_1$ to $T_2$.

Equation (3) is satisfied in the practice of the present invention through the use of orthogonal modulation signals as now described.

Harmonically related signals $f_1$, $2f_1$, $4f_1$, $8f_1$ and etc. Satisfy the relationships set forth in equation (3) and are orthogonal for the purposes of this equation provided that the time interval T1 through T2 is equal to the period of a fundamental frequency of such modulation signals or an integral number of such fundamental periods. The finite period may begin at any point in the period of the fundamental frequency. Any symmetrical wave form may be utilized. That is, the graphical representation of the wave form must have equal areas representing negative and positive excursions of such signals. The wave forms need not be symmetrical provided the integration results are the same and the two integration results are subtracted from each other. For ease of manipulation, square wave or rectangular wave signals are used in the illustrated system. Harmonic signals utilized for integration over such finite time intervals are truly called orthogonal since they generate orthogonal vector functions one with respect to the other.

Explaining further, if two symmetrically alternating signals having differing frequencies that are not harmonically related are integrated over a finite period of time, for example a time equal to one cycle period of the lower frequency of the signals, the integral of the two signals over that finite period of time will never be zero. Therefore, if such nonharmonically related signals are used, the effect of one variable on process performance could not reliably and accurately be separated from the effects of the other variables within a finite time period.

On the other hand, if two harmonically related symmetrically alternating signals are integrated over a time period equal to one cycle of a lower harmonically related frequency, the net integration results in zero each and every time. If two identical signals of unit amplitude are integrated over 1 cycle or multiple cycles thereof, the integration result will be unity. Then the criterion for orthogonal signals is to obtain a zero integration result from an integration over a short finite period of time. Such result permits the selectivity required for successful operation of the illustrated control system.

A second example of orthogonal vector functions is the quadrature vector functions. In electrical signal wave forms, quadrature signals are those displaced by 90°, i.e., the vectors are at right angles. Therefore, such quadrature signals satisfy the requirements of equation (3). That is, by integrating two quadrature signals, i.e., one that is shifted 90° with respect to the other, over one complete cycle of the signal results in an integral equal to zero. Therefore, two signals modulated by quadrature signals will have no affect one on the other to meet the requirement of equation (3).

If the modulation of the controlled variable is kept small, then the variation of the performance indicating signal as caused by the modulation of all of the variables can be defined by a linear relationship. Therefore, even though the system responds to variations in variables in a nonlinear manner, the above theory is applicable through the use of small modulation of the variables. This statement is based upon the theory of calculus wherein nonlinear functions are represented and correlated one with the other in a linear manner through the use of a large number of small increments often referred to by the Greek letter delta. The theory of the present invention follows the theory of calculus to this extent. Therefore, based upon the above statement the following is true:

$Pc = Po + a_1 x_1 + a_2 x_2 \ldots + a_j x_j$  (4)

wherein Pc indicates the current performance indicating signal P(t) after a small change of all of the variables $x_1$ through $x_j$. Po indicates the initial value of the performance indicating signal.

Since the change is so small that the relationship is linear, the gradient, or the rate of change, of the performance indicating signal about the initial operating point Po is a constant. The gradients of equation (4) are a set of partial derivatives:

$$\frac{dPc}{dx_1} = a_1;$$

$$\frac{dPc}{dx_2} = a_2;$$

and $$\frac{dPc}{dx_j} = a_j \quad (5)$$

Assuming that the process being controlled has zero time delay (which in a practical situation for the most part is not realistic) and substituting the below identified modulated signals, A(t) for the variables, x, set forth in equation (4):

$Pc = P_o a z a_1 A_1(t) + a_2 A_2(t) + \ldots + a_m A_m(t)$  (6)

It is desired that the integration over the interval T1 to T2, as later set forth, of the product of a given modulation signal and the performance indicating signal will separate out the effect that each modulated controlled variable has on the total process performance from all other variables. This action permits all the variables to be simultaneously changed in an independent manner in a direction to minimize the performance objective thereby reducing cost to a minimum. This statement also applies to a situation to maximize a particular performance function. Such modulated variables should be modulated at as high a frequency as possible for improving the ability to operate with large noise and to obtain rapid optimization of the system. Also consider the later described modulation technique used to develop noise immunity in a process control system.

By using modulation of the orthogonal type and integrating over the finite time interval T1 through T2 equal to the period of a fundamental frequency of all the modulation, the following equations represent the action at each modulation signal frequency:

$$\int_{T_1}^{T_2} A_j(t) Pc(t) dt = a_j \quad \int_{T_1}^{T_2} A_j(t) A_j(t) dt \quad (7)$$

$$= a_j \quad (8)$$

$$= \frac{dPc}{,} \quad (9)$$

In other words, the gradients of the performance indicating signal in the planes of the controlled variables as set forth in equations (4) and (5) can be determined by M integrations over a finite period of time of the product of the performance indicating signal (which is a function of time) and each of the modulation signals (also which are functions of time). In accordance with equations (3) and (5), equations (7), (8) and (9) then form a basis of system design.

As mentioned above, square wave modulation was used in the illustrated embodiment. Square waves are desirable in implementing the present invention because of the ease of generation of a plurality of such square waves that are related harmonically or in quadratic manner.

Multiplication of the modulation with the performance indicating signal can be performed with nearly zero error by means of electronic switches wherein the modulation can be represented as plus 1 or minus 1 in accordance with the polarity of the modulation, i.e., whether the modulation of a controlled variable is relatively positive or relatively negative at a given time. If MOSFETs are utilized for switches, such switches when used for multiplication also provide good electrical isolation for long memory capability of an integrator used to integrate the signals generated by the multiplication. This permits very slow but accurate integration rates. Such high impedance sampling switches provide means for handling process delays and process lags without the use of variable RC or LC filters in the process control system. This arrangement is a decided advantage in reducing cost and maintenance. The elimination of these filters and making the integration independent of the modulation frequency, as will be later explained, eliminates phase shifting and band pass networks for tuning a control system to a given process being controlled by merely changing the frequency of a single oscillator used to generate a plurality of orthogonal modulation signals. Further, the orthogonal modulation signals can be generated from an external system for providing synchronous operation among a plurality of independently operable processes or systems for eliminating beat frequencies between instruments used to measure or make comparisons between two processes.

This invention also permits pyramiding process control systems wherein a plurality of systems can be optimally operated together in a synchronous manner. For example, a given plant may have four major processes, A, B, C and D for producing a single product. It is desired to operate the plant such that incoming orders are filled with current plant output to reduce inventory. That is, the plant is operated to produce a product meeting specifications of the incoming orders, such specifications may vary with time as different customers submit their respective orders. In order to meet the various product specifications, each of the four processes may have to be varied, i.e., the performance objectives are altered to obtain differing product specifications. Such modification may include alteration of weighting or penalty factors as well, If the plant objective is maximum efficiency, such performance objective may remain the same. Each of the different process performances, including signals, can be signal inputs to an overall plant controller which optimizes plant operation with respect to the four processes. This arrangement results in separately optimizing processes A, B, C and D and also optimizing plant operation to maximum efficiency. It is also to be understood that other combinations of processes may utilize the present invention to advantage.

Figure 3:
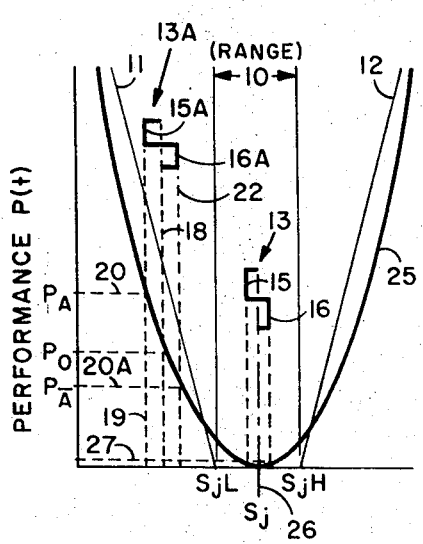
FIG. 3 is a graphical illustration of a process performance response characteristic showing the effects of dithering or modulation of a controlled variable on process performance.

The effect of modulated variables on a performance of a process being controlled and the response of the control system for determining process control gradients are now further described with respect to FIG. 3 which is a graph showing a system performance or response, $P(t)$, with respect to a given variable $x_j$ under a given set of conditions wherein all other variables are held constant. It is understood that for each variable there is a similar set of curves and these curves vary as other variables in the process change. That is, total performance to be optimized requires consideration of how all variables affect all performances.

Referring now to FIG. 3, curve 25 represents the variation of a performance signal $P(t)$ with respect to a controlled variable X. It is desired to minimize the value of the performance indicating signal with respect to variations in the controlled variable. Therefore, the optimum operating point is at point Sj. Assume that this process is operating at or around point Sj. The modulation of the controlled variable is represented by square wave 13. It is seen that as the modulation first as at 15 takes the variable toward the vertical ordinate, the process indicating signal increases in amplitude a slight amount as indicated by line 27. Upon returning the modulation toward line 26, the performance signal reduces to point Sj and then again increases as at 16 along the response line 25 to a maximum height again indicated by line 27. By multiplying the performance indicating signal, represented by line 27 for square wave modulation, by +1 during the first half of the modulation cycle and by −1 during the second half (or vice versa), then integrating the two products, the integrated result will be zero for all operations centered around point Sj. Accordingly, the vertical ordinate represents the magnitude of the results of integrating the performance indicating signal at the optimum operating point Sj. This magnitude may vary from zero in accordance with known system design principles. This fact requires the assumption that the integration period be equal during both halves of the modulation. The modulation period need not necessarily be symmetrical. Therefore, there will be no change in the control or set point signal on line 98 (FIG. 1) which permits the process 30 to continue to operate around optimum point Sj as caused by the modulator 99 modulating the control signal $X_1$ on line 101.

Assume next that the operating point of the system or the process 30 is represented by the vertical line 18 which corresponds to a system performance signal Po. Then the modulation signal 13A during its first half cycle 15A causes the controlled variable to move toward the vertical ordinate causing an increase in amplitude of the performance indicating signal $P(t)$ as indicated by line 20. This increased amplitude indicates poorer process performance. During the second half 16A of the modulation cycle 13A, i.e., during the excursion of the modulation away from the vertical ordinate, there is a decrease in amplitude of the performance indicating signal (improved performance) to horizontal line 20A. During the first half of the modulation cycle, the relatively positive signal $P(t)$ is gated to a control channel integrator; whereas during the second half of the modulation cycle, the performance indicating signal $P(t)$ is inverted in polarity without change in amplitude to create the relatively negative signal $\overline{P}(t)$. $\overline{P}(t)$ is supplied to such integrator, as later fully described. Since the amplitudes as indicated respectively by lines 20 and 20A are different and the integration times are equal, there will be a nonzero result indicating that the process performance is not at optimum value. Since the second half causes the performance signal to be inverted, i.e., utilizes the line $\overline{P}(t)$ signal, the net integrated voltage of such integrator will be positive with respect to the previous integrated voltage causing an increase in the amplitude of a control signal. The increased amplitude control signal moves the magnitude of the variable X away from the vertical ordinate and toward the optimum operating point Sj. (Modulation continues, the DC value of the signal $X_1$ is increased.)

It can be similarly stated that for operation of the process in other portions of curve 25, there will be a corresponding change in the control signal amplitude to cause a corresponding change in the amplitude of the variable X toward the optimum operating point Sj.

The above described action of the process control has been described wherein the magnitude of the variable $x_j$ varies directly with the magnitude of the control signal. In many instances this may not be the case; for example, as the control signal amplitude increases, devices are available that cause the controlled variable $x_j$ to decrease. In such an instance, the signal inversion may be provided.

The penalty (performance) of a measured variable that is to be bounded would result in a curve shown by line segments 11 and 12 of FIG. 3. Such a curve is mathematically given in equation (1A) as generated by the circuit as shown in FIG. 6 (to be described later).

In FIG. 3, points SjL and SjH respectively denote the lower and upper bounds of the variable Pj between which there is no penalty in performance. The slope of lines 11 and 12 represent the values DjL and DjH of equation (1A). It should be remembered that lines 11 and 12 show the contribution of only one term of the total performance equation as given in equation (1). The total performance P(t) is the sum of all terms of this equation. In accordance therewith, the penalty paid by having the process variable or a performance being out of the no-penalty range 10 increases as the distance from the range increases. As shown by lines 11 and 12, this penalty on system performance is linear with respect to the changes in process variable or performance being bounded. It is understood that this penalty may vary in a nonlinear manner by providing a broad optimum range of operation wherein the process may vary to provide optimum variation and enables the process to be more stable and enables variation within the range without causing undue control to be effected by a process control system. Also, the penalty for exceeding a high-specification limit may be different from the penalty for going below the low-specification limit.

The system may be so constrained that true optimum operation is never obtained for a given performance. For example, it may be desired to minimize cost in a process. That process may utilize fuel. Therefore, to minimize cost there should be no fuel consumption. This could well be an impossible situation if the process is to run at all. As a result, the system will tend to operate such that minimum fuel is used even though, as arbitrarily defined for minimum cost, there should be no fuel utilized. In another manner, efficiency of the system may be defined by making certain measurements. It may be desired to maximize efficiency. Therefore, system performance as utilized herein can be defined as a measurement or a set of measurements or a signal or value resulting from a calculation based upon system measurements wherein it is desired to minimize or maximize such measurement within defined limits or bounds, either subject to certain constraints or without such constraints. In addition, it may be necessary to optimumly control the system to a specified state of operation even though the specified state prevents the idealized optimization of process performance. For example, it may be desired to manufacture a product to a given product specification in a manner that will maximize throughput, i.e., maximum product output while maintaining a plant within safe operating bounds which prevents actual maximum throughput.

One or more terms of equation (1) may have either just a lower limit or an upper limit. In such an instance, the computer would consider only one of the lines 11 or 12 as shown in FIG. 3. In accordance therewith, any value of the process performance greater than the point SjL would provide optimum performance; the opposite can be said for the higher limit. An example of such a single sided bound would be a pressure (a performance) on the boiler having upper safe limit. As long as the pressure remains below the upper limit, there would be no need to change the pressure with respect to the performance indicating signal. In some instances, it may be desirable to have a plurality of weights or penalties for a given performance. For example, there may be an optimum range of operating the If the boiler is operated outside of that range a small penalty may be introduced into the system. In such a case, there is no urgency to return the pressure rapidly to the optimum range. Such rapid return actually may introduce further perturbation or disturbances in the system which may be undesirable. However, there may be an upper limit which is different than the desired operating point. Such upper limit would then have a very high priority or penalty because the system could then destroy itself. Therefore, the upper limit then would have a very high penalty, i.e., the slope on line 12 would be very steep. As the boiler pressure increased beyond a given limit toward a dangerous point of operation, the gradient would be very large causing a very large change in the controlled variable control signal to thereby reduce the pressure of the boiler rapidly to a safe point below upper limits.

There may be more than just two optimum operating ranges for a given performance. Each range may lie one within the other such that as the process variable moves from one range to another the penalty for the weighting factor changes. This then can be used by the computer to change controlled variables toward optimum at differing rates because of differing penalties imposed upon system operation due to the excursion from optimum.

DESCRIPTION OF ILLUSTRATIVE SYSTEM

Figure 4:
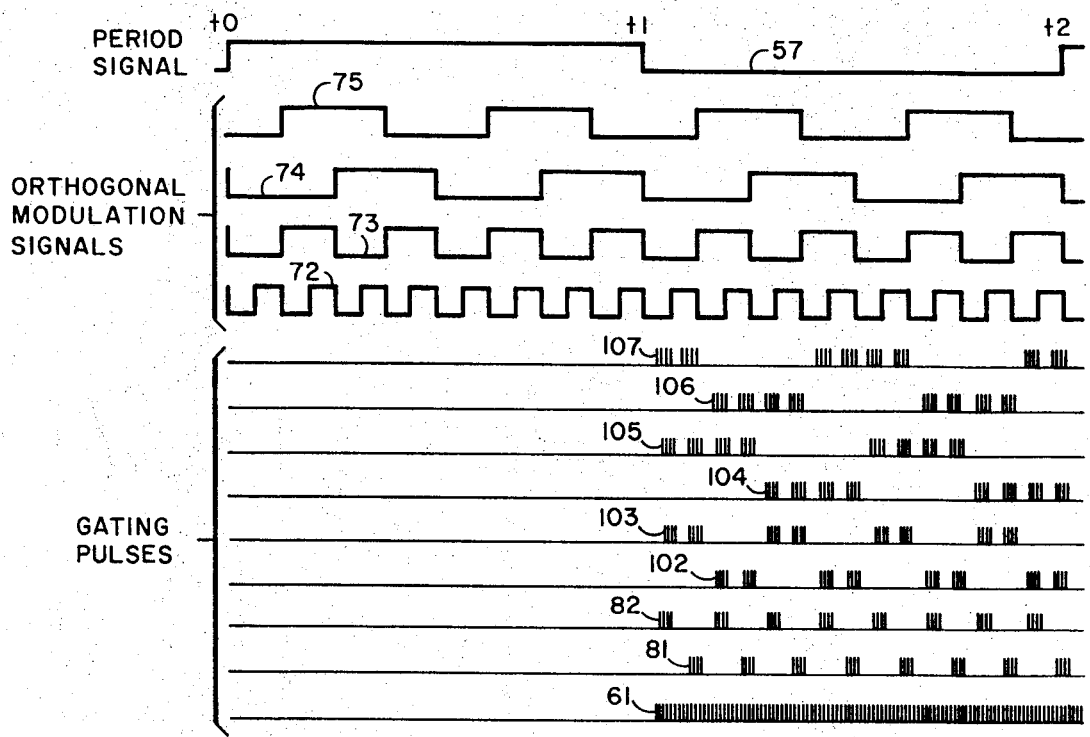
FIG. 4 is a timing diagram illustrating the operation of the present invention as shown in FIGS. 1 and 9.

Referring now more particularly to FIGS. 1, 2 and 4 a system embodying the theory of operations described above is illustrated and described.

For convenience of the reader, FIG. 2 is a legend indicating what the symbols used in the FIGS. represent. The process or plant being controlled is represented by box 30 which has a plurality of uncontrolled variables including in-process perturbations represented by the plurality of vectors 31 respectively denominated $m+3$ through $k$. The process 30 has $m$ variables which are controlled by the self-optimizing system. The optimizing control signals are received over cable 32 having $m$ signal paths. In addition to the control signals received from optimizing controller 29, there are two analog controllers 33 and 34 of known design; each has a set point input 35 and 36 which is compared with measurements received from process 30 respectively over lines 37 and 38. As a result of comparison of such signals, a control signal from controllers 33 and 34 are respectively supplied over lines 39 and 40 to process 30 in the usual manner. Such interconnections are more fully explained later with respect to the application of the system of this invention as shown and explained with respect to FIG. 9. Therefore, in process 30 there are $m$ variables which are controlled by optimizing controller 29; there are two variables $m+1$ and $m+2$ which are controlled by known analog controllers 33 and 34; and there are $m+3$ through $k$ uncontrolled variables. The process 30 also has $j$ performances which are measured. These measurements are represented by analog signals supplied over $j$ signal path cable 45 to process performance evaluation computer 46. The characters $m$, $j$ and $k$ are arbitrary whole numbers, usually of different values.

In a constructed embodiment, the computer 46 compared the received $j$ performance measurements with performance specification limits or bounds as set forth in equation (1) of the theory of operation. The comparison results were then summed to obtain P(t). The performance P(t) is indicated by two complementary signals denoted P(t) and P(t). The term complementary as applied to analog signals means two signals always having equal amplitudes but of opposing polarity with respect to a reference signal.

Computer 46 supplies the pair of complementary analog process performance indicating signals P(t) and P(t) respectively over lines 47 and 48 to a plurality of control channels 49, 50 and others as indicated by ellipsis 51. Clock 55 supplies orthogonal modulation signals to modulate the control signals in cable 32 with such modulation signals used in combination with other signals to gate the signals on lines 47 and 48 to the respective control channels 49, 50, etc. This clock source is described in detail with respect to FIG. 7. For purposes of describing FIG. 1, it is sufficient to state that it supplies a set of orthogonal modulation signals over $2m$ signal path cable 56 to the respective control channels. Each control channel is connected to the clock and modulation source 55 by two signal paths for receiving complementary modulation signals which are orthogonal to all other modulation signals supplied to the other control channels. The control channels are responsive to the receipt of the orthogonal modulation signals, plus period signal 57 supplied over line 58 to optimize process 30. The period signal is supplied to computer 46 over line 59 for causing the computer to selectively generate the process performance indicating signals P(t) on line 47 and $\overline{P}(t)$ on line 48. Sets of strobe pulses 61 (FIG. 4) are supplied over line 60 to all of the control channels for time sampling P(t) and $\overline{P}(t)$ signals between times $t1$ and $t2$ (see FIG. 4). Such time sampling enables the system to have its speed of response altered without altering its gain as described in the section entitled CONTROL CHANNEL. Between times $t0$ and $t1$ no such strobe pulses are provided and no optimizing actions are performed by the various control channels.

Referring now more particularly to FIG. 4, it is seen that one control or decision cycle is represented as the elapsed time between $t0$ and $t2$. This cycle is repeated in accordance with the frequency of period signal 57. The first half of each cycle is termed a holding period wherein the performance indicating signals P(t) and $\overline{P}(t)$ are established near the reference signal level irrespective of the actual performance of process 30. This action assures maximum dynamic range to changes in the performance signal produced by modulation of the control variables. The gating pulses are inhibited at this time to prevent the control channels from changing the control signals (except for the continuous modulation thereof). At the time $t1$ the optimizing period of the control or decision cycle begins with the emission of stroke pulses 61 over line 60 and the negative going portion of period signal 57 supplied over lines 58 and 59. At this time, computer 46 is activated to supply a performance indicating signal indicative of the process 30 and simultaneously activates the control channels to optimize the respective control signals supplied over cable 32 as a result of receiving P(t) and $\overline{P}(t)$, as will become apparent.

Each of the control channels may be constructed identically. For purposes of illustration, control channel 49 is shown in block diagram form in FIG. 1 and in circuit detail form in FIG. 8. For an understanding of the cooperative relationship of the various parts of the FIG. 1 illustrated system, the block diagram is sufficient to begin with. A first set of analog gates or switches 70 and 71 receive strobe pulses 61, the period signal 57, as well as one set of orthogonal modulation signals. For purposes of discussion, control channel 49 is defined as receiving the highest frequency modulation signals indicated by numeral 72 in FIG. 4. Signal 72 is the second harmonic of modulation signal 73 and, therefore, is orthogonal thereto. Modulation signals 72 and 73 are respectively the fourth and second harmonic of modulation signals 74 and 75. The signals 72, 73 and 74 are essentially in phase in that the zero axis crossings occur at identical times. Modulation signal 75, however, is in quadrature relationship to signal 74 since it is in a 90° phase relationship with respect to the lower frequency modulation 74. As such, all four modulation signals shown in FIG. 4 are in an orthogonal relationship such that if a controlled variable is modulated by any one of such modulation signals and the performance indicating signal is so gated (a form of modulation) by the respective one of such modulation signals, a control channel has the capability of detecting the effect on the process performance indicating signals of only its controlled variable.

It is understood that in the generation of modulation signals some harmonics may be omitted. For example, if it is desired to have a very fast response with respect to a particular variable, the next higher modulation signal frequency may be the eighth harmonic rather than the second, no limitation to any selection of harmonics being intended. In addition, a modulation signal (not shown) in 90° phase relationship with respect to signal 73 or 72 may be utilized and still maintain the orthogonal relationship with lower frequency signal 74 or other modulation signals not shown that have different signal frequencies It is preferred that all of the modulation signals be generated from a common frequency source in order to easily maintain phase relationships for eliminating beat frequencies between the control channels.

Figure 13:
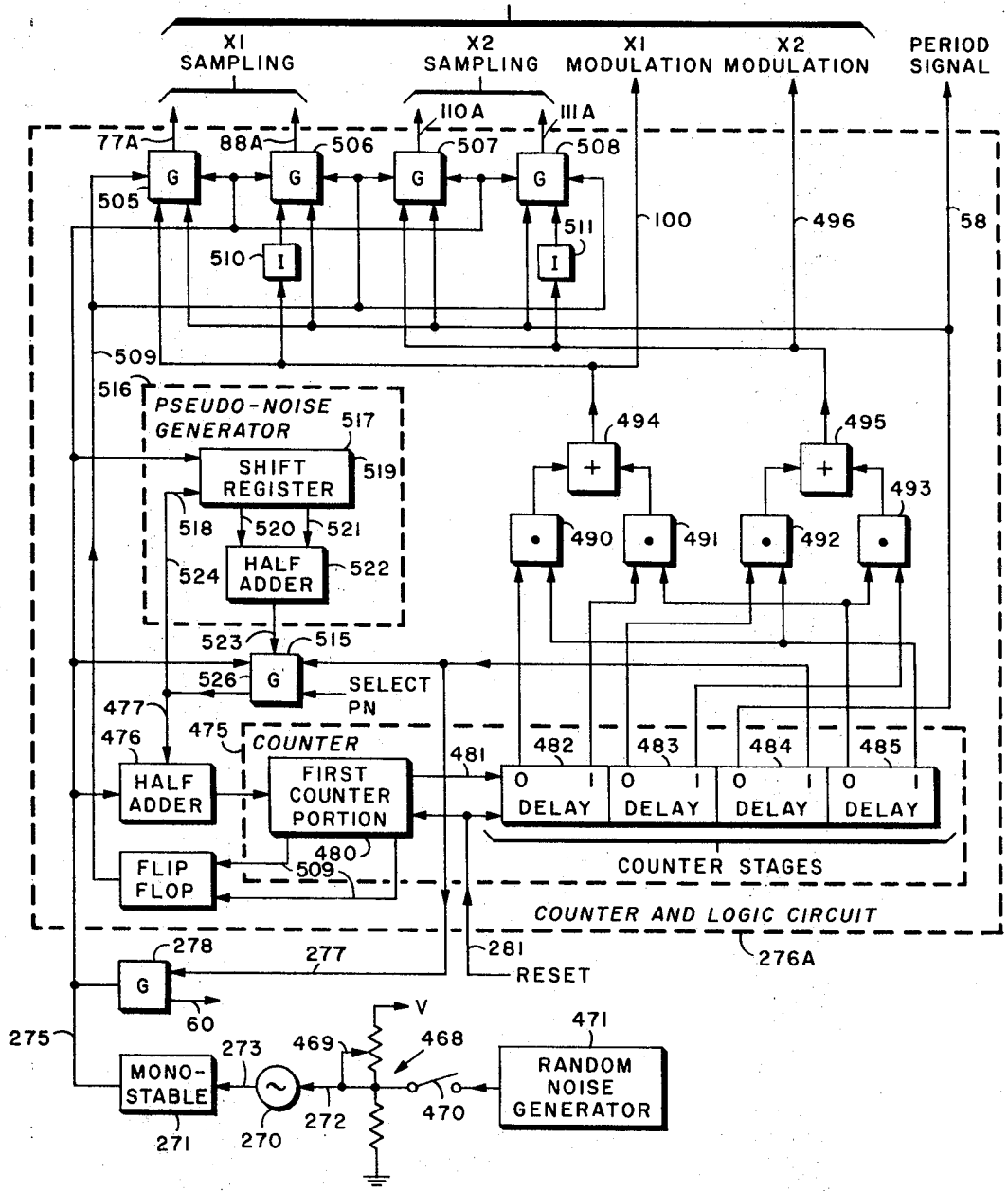
FIG. 13 is a combined schematic and block signal flow diagram illustrating a clock and modulation source utilized for phase reversal of signals modulating controlled variables in a process control system.

Returning now to channel 49, modulation signal 72 is supplied over line 77 from cable 56 to enable gate 70 cojointly with strobe pulses 61 supplied over line 60. With the time coincidence of each strobe pulse and the modulation signal being negative, as shown in FIG. 4, a burst of strobe pulses 82 inside gate 70 enable gate 70 to pass the signal on line 48 to line 78. This action is equivalent of multiplying the process performance indicating signal $\overline{P}(t)$ by minus 1. The reason for this is that line 48 carries the $\overline{P}(t)$ signal which is the negative or complement of the analog signal P(t) representative of the system performance. This negative signal $\overline{P}(t)$ is supplied through linear mixer 79 to a second analog gate 80. Second analog gate 80 is always enabled to pass analog signals whenever either of analog gates 70 or 71 is enabled. Signal 72 on line 77 is also supplied to mixer 85, thence to analog gate 80 for enabling analog gate 80. Reference is made to FIG. 13 and the descriptive material in connection therewith for another way of gating the strobe pulses to achieve integration. Integrator 87 contains a differential amplifier. Source 115 supplies the reference signal referred to above to a reference input thereof.

Line 88 from cable 56 carries the modulation signal (not shown) having an 180° phase relationship to signal 72. For purposes of convenience, this is termed as a complementary modulation signal to signal 72 since whenever signal 72 is positive the modulation signal on line 88 is negative an equal amount such that if the two signals were algebraically added together the net sum would be zero at all times. Therefore, when the signal on line 88 is negative, the signal on line 77, is positive for closing gate 70. Therefore, gates 70 and 71 are alternately enabled and disabled (opened to pass pulses and closed to block pulses respectively) during each cycle of modulation signal 72. The strobe pulses 61 are also supplied to gate 71 as above described for gate 70. Analog gate 71 selectively connects line 47 to line 89 for passing the performance indicating signal P(t) through linear mixer 79 thence analog gate 80 to integrator 87.

In accordance with the above description, during the first occurring or during the negative half cycle of modulation signal 72, the negative performance indicating signal $\overline{P}(t)$ is supplied to the integrator 87 signal input for reducing the amplitude of the integrated signal by predetermined amount in accordance with the amplitude of the performance indicating signal caused by the respective control variable. During the positive half cycle of modulation signal 72, gate 71 passes the positive performance indicating signal P(t) to thereby increase the integrated signal in integrator 87. If the system is optimally performing with respect to the controlled variable, as explained in the THEORY OF OPERATION section, the net change in integrated voltage will be zero. If it is not operating within the optimum range, then there will be a net change indicating the direction and amplitude of the variable is to be altered to adjust process 30 toward optimum.

Sample and hold circuit 95 includes gating means responsive to period signal 57 on line 96 (which is connected to line 58) to gate the integrated signal supplied over line 97 from integrator 87 at the end of the optimizing period or time $t2$. During the interval $t1$ to $t2$ the gating means in sample and hold circuit 95 is closed for preventing integrator 87 from altering the stored signal. Sample and hold circuit 95 supplies an analog control signal over line 98 to modulator 99 which is actuated by the modulation signal 72 received over lie 100 connected to line 77 of cable 56. Therefore, modulation signal 72 not only modulates or gates the received performance indicating signal but also the output analog control signal from sample and hold circuit 95. The modulated control signal shall have the same wave shape as modulation signal 72 but having varying DC amplitude components as determined by the signal on line 98. This modulated control signal is supplied over line 101 and cable 32 as set point signal $X_1$ to an analog controller (not shown) in process 30. The modulated control signal on line 101 causes a corresponding modulation in the variable being controlled. The resultant modulated system performance is then supplied as a measured signal over cable 45 to computer 46 to complete the control cycle.

As described with respect to control channel 49, the bursts of pulses 81 and 82 do not actually appear on any line but represent the enabling of analog gate 70 and 71 respectively to pass the performance indicating signal and its complement to integrator 87. Therefore, the signals on lines 48 and 47 are respectively passed through the analog gates 70 and 71 only at the times corresponding to the burst of strobe pulses 81 and 82.

The integration time of the performance indicating signal and its complement is small with respect to the period of the highest frequency modulation signal 72. Therefore, if the frequency of the highest modulation frequency 72 were increased such as to decrease its period, integrator 87 is not affected because the integration time provided by the short sampling times of the strobe pulses 81 and 82 can remain the same. Note that the spacing between the strobe pulses could be decreased. However, the duration of the strobe pulses and the number of such strobe pulses during a given cycle of modulation 72 remain the same. Further ramification of this relationship is described in the section entitled CONTROL CHANNEL. Therefore, the response of the process 30 may be speeded up or slowed down in accordance with the frequency of modulation. Yet the integration performed by integrator 87 is not altered. Therefore, the gain of the loop including process 30, computer 46 and the control channels is not altered. This feature provides the ability to easily tune a control system to a process being controlled by maintaining the gain constant. Also, none of the components in the system need be changed or does a large scale digital computer require reprogramming which is expensive and time consuming.

Control channel 50 receives the performance indicating signal P(t) and its complement $\overline{P}(t)$ over lines 47 and 48 and manipulates them in the same manner as described for channel 49. It may receive a modulation signal 73 over line 110 and the complement of such signal over line 111. It supplies its modulated control signal $X_2$ over line 112 to cable 32.

Each control channel has two signal paths associated therewith for receiving a modulation signal and its complement cable 56 has $2m$ signal paths, i.e., twice the number of signal paths as there are modulation signals. In the alternative, a high frequency or broad band inverter circuit of unit gains may be provided in each of the control channels. In such an instance, only the modulation signals are supplied over a cable having $m$ signal paths with the complement of such modulation signals being generated in the respective channel. Such an arrangement reduces the size of the cable. Where there is wide geographic dispersion of equipment, such an arrangement may be advantageous.

The control channels illustrated in FIG. 1 other than channel 49 are gated respectively by the orthogonal modulation signals 73, 74 and 75. Within these channels there are sets of strobe pulses corresponding to the strobe pulses 81, 82 utilized in channel 49. For example, channel 50 may utilize modulation signal 73 to generate sets of strobe pulses 102 and 103 which respectively gate or modulate the P(t) and $\overline{P}(t)$ signals from lines 47 and 48. Note that the burst of pulses 102 and 103 correspond to the one-half cycle period of modulation signal 73. In accordance with this gating, the modulation of a controlled variable by modulation signal 73 will be detected only by the control channel 50. The other modulation signals 74 and 75 respectively utilize the strobe pulses 104, 105, 106 and 107 in the manner described.

Process 30 upon occasion may receive an upset such that performance is radically improper. Such upsets are usually of a transient nature and will settle back to a point wherein the process is then within a reasonable operating situation. During the upset, optimizing should be inhibited and upon the upset subsiding optimizing is then reestablished. This is similar to the procedure a human operator would follow when he would observe an upset. He would not attempt to optimize during the upset since any action could cause a further upset. Therefore, the operator would wait until the upset subsides.

Process performance evaluation computer 46 has a later described upset detector. That detector will emit a "reset to memory" signal over line 113 to all control channels 49, 50, etc. One effect of reset to memory signal is to erase any optimization which has been stored on the integrator 87 during the integration period when the reset to memory signal is received and then to hold the integrator 87 and circuit 95 such that no changes are incurred in the control variable during the upset condition. The reset to memory signal also resets the clock to the $t0$ time which inhibits further integration until the $t1$ time recurs. The delay of $t0$ to $t1$ should allow for the upset to subside; but if it has not subsided, another reset to memory pulse is received and the cycle is repeated.

The line 113 reset to memory signal as later described is passed over line 118 to open analog gate 117 for passing an analog signal to linear mixer 79. It simultaneously opens gate 80 via linear mixer 85. The analog signal is supplied by differential amplifier 360 as a difference signal between the output signal of integrator 87 (on line 97) and the output signal of sample and hold circuit 95 (on line 98). The above gating causes the integrator 87 output to reset to equal the sample and hold output signal on line 98. When the upset detector resets the clock, the period signal will open gating means in sample and hold 95 to connect integrator 87 to the input of the sample and hold circuit 95. Since the integrator output has been reset to equal this stored signal, there is no change in the output signal on line 98 of the sample and hold circuit 95. Thus, the control channels will hold the conditions that existed prior to the upset until the upset subsides.

It may also be desired to reset the integrator to an external signal such as the internal set point of a controller. The internal set point is connected to one input of differential amplifier 350 so that an auto track command signal on line 205 will open gates 119 and 80 to pass the output of the differential amplifier 350 through mixer 79 and gate 80 to the input of integrator 87. The signal to be tracked by integrator 87 is supplied over line 352 to amplifier 350. Because of this feedback, the integrator output will move toward the signal received over line 352. Such signal on line 352 may be a set point from a controller, a measurement from a process or other source as may be suitable to a given process control situation.

PROCESS PERFORMANCE EVALUATION COMPUTER

Figure 9:
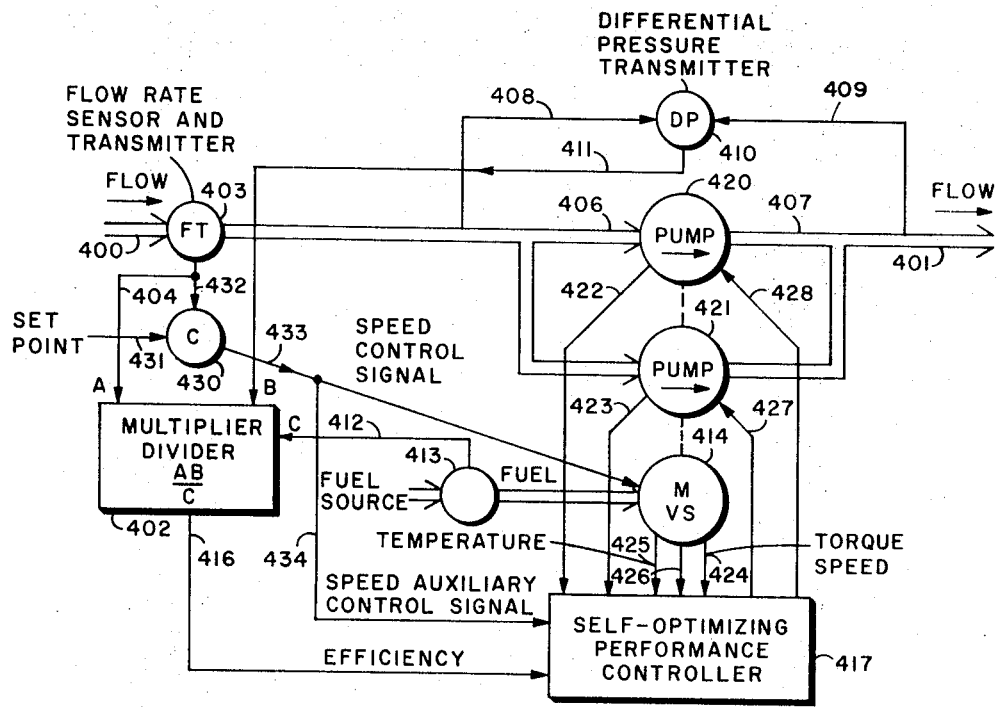
FIG. 9 is a schematic diagram of a pumping station which has its operation optimized to efficiency with a constraint of constant flow rate and which utilizes teachings of the present invention.
Figure 19:
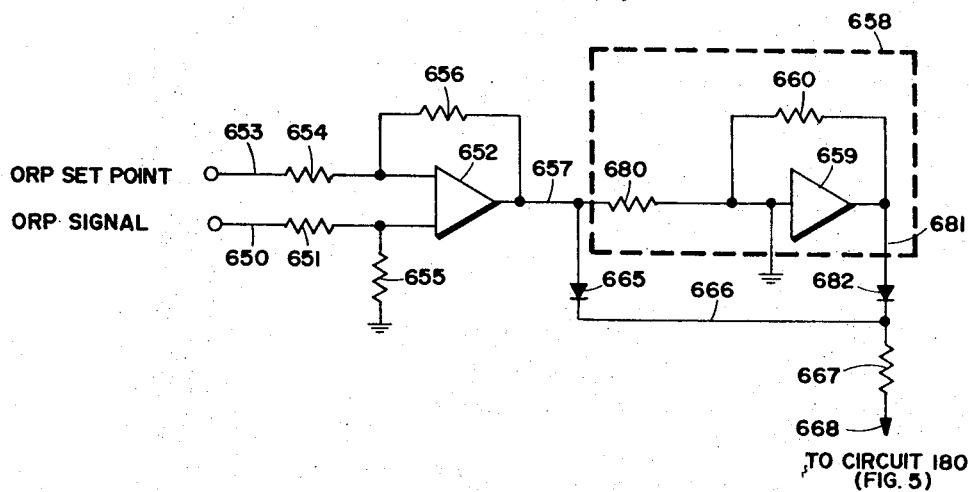
FIG. 19 is a simplified schematic diagram of an absolute output error computer.
Figure 20:
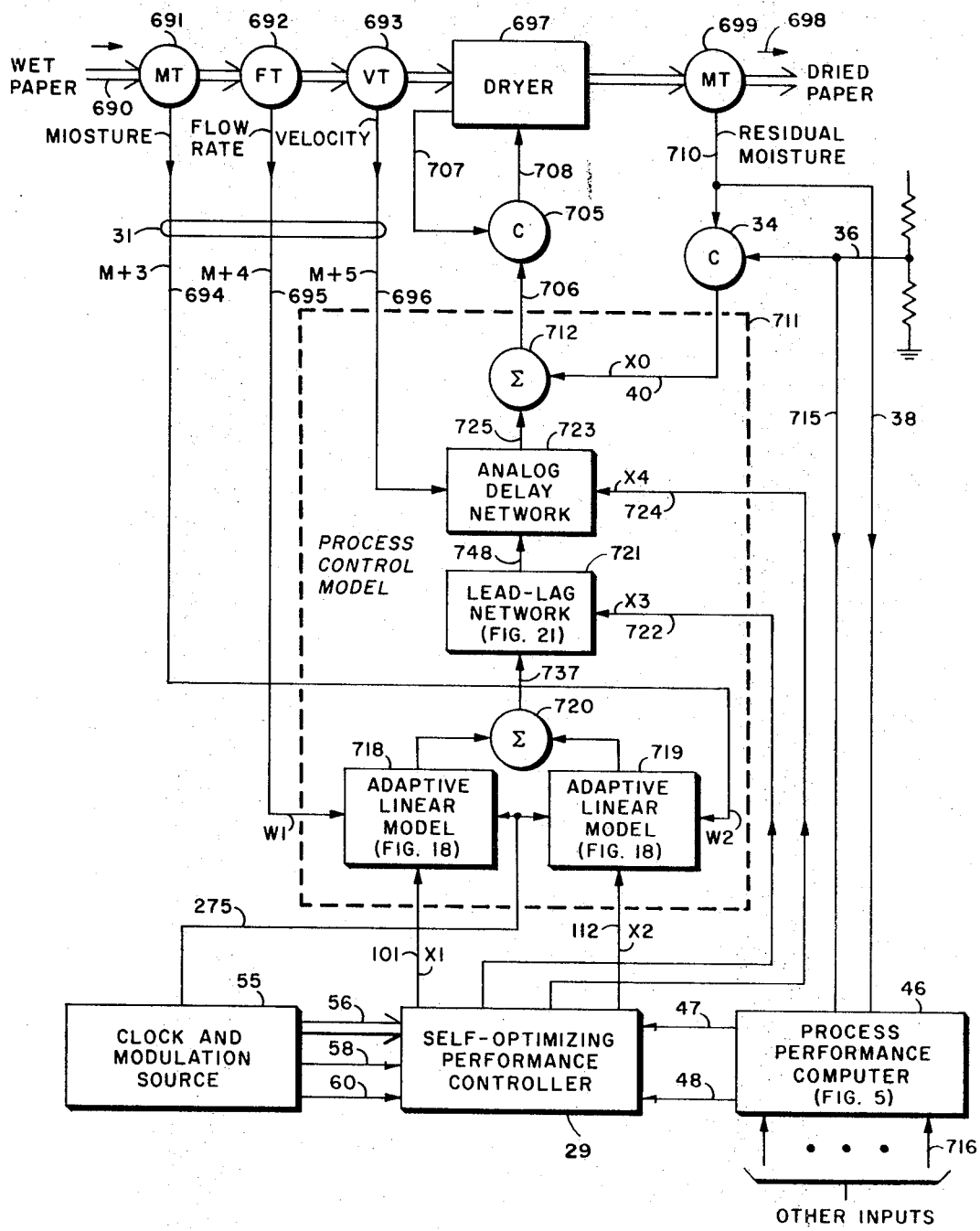
FIG. 20 is a flow diagram of a process utilizing the self-optimizing performance controller described with respect to FIG. 1 wherein the process has an extensive delay with such delays being incorporated into an interposed process control model.

FIG. 5 shows in block schematic form a process performance evaluation computer utilizable either as computer 46 in FIG. 1, as the computer included with an optimizing controller of FIG. 9, and as the computer shown in FIGS. 15, 16, or 20, if combined with the absolute output error computer shown in FIG. 19. The FIG. 1 illustrated system can use any appropriate form of computer as computer 46.

The $j$ measurements supplied over the $j$ signal path cable 45 are supplied respectively to $j$ number of out-of-bounds detectors 120, one detector for each of the $j$ measurements. Other input signals may be applied to terminals 145 as well as an input from a primary measurement from the absolute output error computer of FIG. 19, for example, on line 39A, all as later described.

Before proceeding further, please refer to FIG. 6 which shows the circuit configuration of an out-of-bounds detector usable with the FIG. 5 illustrated computer 46. Terminal 121 receives the measurement signal from one signal path of cable 45. This received measurement signal is supplied through filter 132 and pair of isolating resistors 122 and 123 respectively to a pair of differential amplifiers 124 and 125. Filter 131 may be constructed as filter 180 of FIG. 5. The amplifiers 124 and 125 have a set of inputs and supply signals at the outputs indicative of the difference of the two input signals in a known manner. Resistors 126 and 127 provide feedback to one of the inputs to the respective amplifiers. The value of these resistors may be used to determine the weighting factors. The use of adjustable shorting bars 155 and 156 permits adjustment of such factors. The output signals of the amplifiers 124 and 125 are connected through a pair of isolating switching diodes 128 and 129 which have their cathodes joined to common or summing junction 130. The operation is such that if the signal amplitude on input 121 lies within the no penalty range as set forth and described with respect to FIG. 3, amplifiers 124 and 125 will both supply relatively negative signals to reverse bias diodes 128 and 129. This action effectively isolates the out-of-bounds detector from the rest of the computer such that the measurement signal on terminal 121 does not enter into the calculation of the process performance evaluation signal. Therefore, as will become apparent, the process performance evaluation signal will be zero if each and every out-of-bound detector 120 is so cut off from the rest of the computer.

Amplifier 124 makes a comparison of the signal on terminal 121 with the low limit signal SjL supplied through variable resistor 135 having a reference voltage input through tap 136. As the tap 136 is moved upwardly, there is an increased voltage supplied to the lower input of amplifier 124. As this input amplitude is increased, the lower limit is correspondingly increased. Referring to equation (1), the term Pj−SjL is calculated by the out-of-bounds detector taking the magnitude Pj (received on terminal 121) and subtracting the reference signal SjL (supplied from resistor 135) therefrom by differential action of amplifier 124.

If the signal on terminal 121 has a greater amplitude than the reference signal supplied through resistor 135, a negative signal is supplied to the anode of diode 128, therefore, indicating that the lower limit at the measurement signal is not out-of-bounds with respect to the lower limit.

Correspondingly, a reference signal is supplied through center tap 134 of potentiometer or resistor 138, thence through current limiting resistor 139 to the upper input of differential amplifier 125. The measurement signal is supplied through current limiting resistor 123 to the lower input to effect a subtraction by the differential action of amplifier 125 of the reference or upper limits reference signal from the measurement signal indicated by the absolute quantity of Pj−SjH of equation (1). When the reference signal on the upper input is more positive than the signal on the lower input, a relatively negative signal is supplied to the anode of diode 129 reverse biasing it and preventing the signal on terminal 121 from affecting the calculation of the performance indicating signal P(t) This action satisfies equations (1) and (1A) when the input signal on terminal 121 is within bounds. The use of a differential amplifier to accomplish such subtraction by analog comparison techniques is well known and need not be further described.

When the measurement signal on terminal 121 is out-of-bounds with respect to either the lower or high limits, a positive signal will be supplied through the respective diodes 128 and 129 to enter into the calculation of the performance indicating signal. It will be remembered that while the signals were exceeding either the lower or upper bounds or limits is of the same electrical signal polarity, the modulation of the controlled variable will result in a change of the performance indicating signal in such a manner that the direction of deviation from optimal will be indicated in the control channel as was explained in THEORY OF OPERATION with respect to FIG. 3.

The penalty on one side of the out-of-bounds or the permitted range of operation can be made different than that provided on the other bound. For example, the low-limit amplifier 124 (FIG. 6) may have a gain of say 55 whereas the high limit amplifier 125 may have a gain of 100 to provide a much higher penalty or weight on the higher end of the optimum range than on the lower end. Of course, other networks may be utilized as out-of-bounds detectors to provide yet other systems of weighting or penalties for an input signal exceeding a given bounds or limit. Also, it is apparent that only one amplifier 124 or 125 could be utilized in a given detector for having a single side limit, i.e., just a low limit or a high limit. Additionally, the other amplifiers may be added to the out-of-bounds detector to have a plural limit. In other words, an intermediate low limit and an extreme low limit may be provided. The intermediate low limit would have a first penalty, and the extreme low limit would (when exceeded) add an additional penalty to the performance computer of FIG. 5. Also, the upper and lower limit may be the same, i.e., zero range of optimum operation.

Returning to FIG. 5, each of the out-of-bounds detectors 120 is connected through a weighting and current limiting resistor 135 to a summing node or line 136 which is connected to an upper input of differential amplifier 137. The positive signal on line 136 is a sum of all of the signals supplied from the various out-of-bounds detectors 120 in inverse proportion to the resistive impedances of resistors 135. Hence, a second manner of assigning weights to the variables is to use a resistance value in inverse proportion to the assigned weight. From this signal is subtracted a reference voltage which is supplied over line 138 to a lower input of differential amplifier 137. This amplitude is subtracted from the signal on line 136 to supply the differential signal at junction 139. The gain of the amplifier 137 is adjusted by adjusting the potentiometer 149 in a known manner. Because amplifier 137 inverts the signal from line 136 to the negative signal $\overline{P}(t)$, line 48 is connected through current limiting resistor 141 to junction 139. Junction 139 is also connected to the upper input of amplifier 142 through weighting resistor 199 for generating the process performance indicating signal P(t) supplied through limiting resistor 143. Amplifier 142 is adjusted by resistor 198 such that the signal P(t) is equal in amplitude but opposite in polarity to the signal on line 48 with respect to the reference signal supplied over line 138. The line 138 reference signal may be the same signal as that supplied by source 115 (FIG. 1) to integrator 87.

In addition to the out-of-bounds detector supplied signals, there is provision made for receiving a primary measurement signal to be optimized over line 149 through resistor 150. The resistors 135 and 150 all may have equal impedance values. A utilization of the primary measurement signal on line 149 will become more apparent in the discussion with respect to FIG. 9. Of course, a plurality of such primary measurement signals may be used.

The system used to inactivate and reset the performance evaluation computer during the holding period from time t0 to time t1 and to activate the computer during the optimizing period from time t1 to t2 is explained. The period signal 57 is received from clock and modulation source 55 over line 59 and supplied to the (gate) field electrode of MOSFET 160 of the period clamp circuit 159. Resistor 161 terminates line 59 and provides a bias connection to the bias voltage −v. A relatively positive signal supplied to the field electrode of the MOSFET will cause a low-impedance path between the source and drain electrodes 162 and 163, whereas a relatively negative signal on line 59 causes a current nonconductive path to be imposed between the source and drain electrodes 162 and 163. Storage capacitor 165 is connected between the drain electrode 163 in a guard plane arrangement indicated by circle 166 to the reference voltage −V. A guard plane arrangement 166 comprises a conductive plate on one side of a printed circuit board with the capacitor 165 being mounted in insulating relationship thereto on the opposite side such that the voltage differential across the insulating board is held to be a minimum for reducing the leakage path of capacitor 165. The construction illustrated in the referenced patent application Ser. No. 702,440 may be used; no limitation thereto intended. In accordance therewith, the capacitor 165 is charged when the MOSFET 160 is current conductive through current limiting resistor 167 to the voltage on junction 139. The period clamp circuit 159 is completed by a MOSFET 168 operating as a source follower and transistor 170 operating as an emitter follower. When MOSFET 160 is gated "on" by the period signal on line 59, the output of amplifier 137 is returned to its input through the two followers and resistor 175. The net result is the gain of amplifier 137 is less than unity and the output on junction 139 is at the center of its operating range, i.e., is at reference potential. When MOSFET 160 is turned off by a negative state of the period signal, capacitor 165 maintains the DC level of the junction 139, but now the amplifier gain is high as dictated by the adjustment resistor 140. MOSFET 168 has an extremely high-gate impedance so that capacitor 165 will not discharge during the time period that the input 59 remains negative. Therefore, from $t0$ to $t1$ both the voltages on line 47 and the voltage on line 48 are clamped to the reference potential on line 138. The period signal on line 58 closes all input gates of the control channels 49, 50 and 51 such that there is not response to such signals.

While the performance evaluation computer has been described as an analog unit which current sums the various input signals to generate a performance indicating signal as a result of such summing action, no limitation thereto is intended. Other forms of analog computers may be utilized and digital computers may be programmed to generate a performance indicating signal.

The primary measurement signal received from line 39A (FIG. 19) is shown to pass through an adjustable filter 180 having variable capacitor 181 to adjust the filter response. A resistor 182 and a MOSFET 183 (used for unloading) complete the active filter. Operation of such a filter is well known and is utilized to reduce the noise that may be present on the input from affecting the computer operation. Such filters could also be provided on the $j$ inputs to the out-of-bounds detectors. The output signal of filter 180 is supplied over line 185 to differential amplifier 186. Amplifier 186 has a reference input connected to ground reference potential through resistor 187. Voltage V is connected through variable resistor 187A to provide an adjustable reference. Resistor 188 supplies negative feedback from junction 149 to the signal input at resistor 189. The amplified signal from line 39A is supplied to the current summing line 136 through weighting resistor 150.

The above described circuitry provides a signal sided cost penalty for the performance measurement of input 39A. The desired specification for this performance may be zero as established by a zero reference input to amplifier 186. The positive input will never reach this desired zero cost specification, but the controlled variables are adjusted such that this cost is minimized provided that other costs from the out-of-bound detectors 120 are not significant. This signal produces the factor $P(t)=C_jP_j$ described in the THEORY OF OPERATION which assumes other cost terms of the total performance $P(t)$ are zero. That is, the desired high specification for performance Pj which enters the computer on line 39 is zero and the unit penalty for performances greater than zero is Cj. As is easily seen, this factor is computed simply by scaling the input Pj on line 39A by the cost factor Cj and then summing this result with the other (j−1) performance factors which produce the total performance $P(t)$ that will be minimized.

It is understood that a plurality of such performance measurements which have a desired high specification of zero could be present in the total performance $P(t)$ that is to be optimized. Such inputs or additional inputs from more out-of-bound detectors can be added to the total performance through summing resistors 145.

It is worth stressing again the fact that each individual performance measurement which serves as inputs to the performance computer can be dependent upon all of the controlled variables and that the system will adjust these controlled variables to levels that will minimize the total cost as computed.

It should also be mentioned that the DC level of $P(t)$ is not critical provided that $\overline{P}(t)_{DC}=-P(t)_{DC}$ with respect to the reference on the reference terminal of the integrators. The DC component of $\overline{P}(t)$ produces equal but opposite integration to that produced by the component of $P(t)$ if the above equality is satisfied. It is only necessary to maintain these DC components at a level small with respect to the linear range of the amplifiers 186 and 142 so that the effective range of these amplifiers is not significantly degraded.

In the section DESCRIPTION OF THE ILLUSTRATED SYSTEM, reference was made to an upset signal which generated a "reset to memory" signal on line 113. This signal inhibits operation of the control channels, as will later be described. The upset is detected in the computer by the upset circuitry generally designated by numeral 200. Upset detector 200 has a pair of inputs 201 and 202 respectively connected to lines 47 and 48 for receiving the complementary performance indicating signals. A pair of diodes 203 and 204 clamp line 105A (FIG. 5) to the most negative of the complementary performance indicating signals. The amplifier 206 has a threshold reference input comprising resistor 207 having an adjustable tap connected through resistor 208 to amplifier 206 for establishing the magnitude of the complementary performance indicating signals defining an upset condition. Line 205 is connected to the other input for differential comparison with the threshold. If the $P(t)$ signal becomes extremely negative, diode 203 causes the voltage on line 205 to become more negative than the threshold voltage, causing a large positive signal to be supplied over line 113. Line 113 is the "reset to memory" signal that erases the information that had been stored in each integrator between the last $t1$ time and the time of the upset. This is explained in the section on CONTROL CHANNEL. To insure sufficient time for this resetting action prior to resetting of the clock (counter 276), a delay circuit 209 including unijunction transistor oscillator consisting of capacitor 210, resistor 212 and unijunction transistor 211 causes a delay in the firing of the unijunction transistor 211 which resets the counter 276 (FIG. 7) An incandescent lamp 215 may be utilized to indicate an upset condition. As used in the constructed embodiment relatively positive signal on line 113 indicates an upset condition. This is supplied to the control channels as illustrated in FIG. 8.

Resetting of the counter causes the period signal to go positive (time $t0$ is reestablished which clamps the signals on lines 47 and 48 to a level well below the threshold level of amplifier 206, i.e., the reference signal amplitude on line 138 as explained with respect to the period clamp circuit 159. This removes the "reset to memory" pulse or signal and starts the delay period $t0$ to $t1$. At $t1$ time, the performance computer will be unclamped for the integration period of $t1$ to $t2$. If the upset still exists (performances are changing rapidly), line 47 or 48 will again exceed the threshold and the cycle will be repeated. This cycle will continue until performances are sufficiently stable to allow the completion of an integration cycle.

CLOCK AND MODULATION SOURCE

Figure 7:
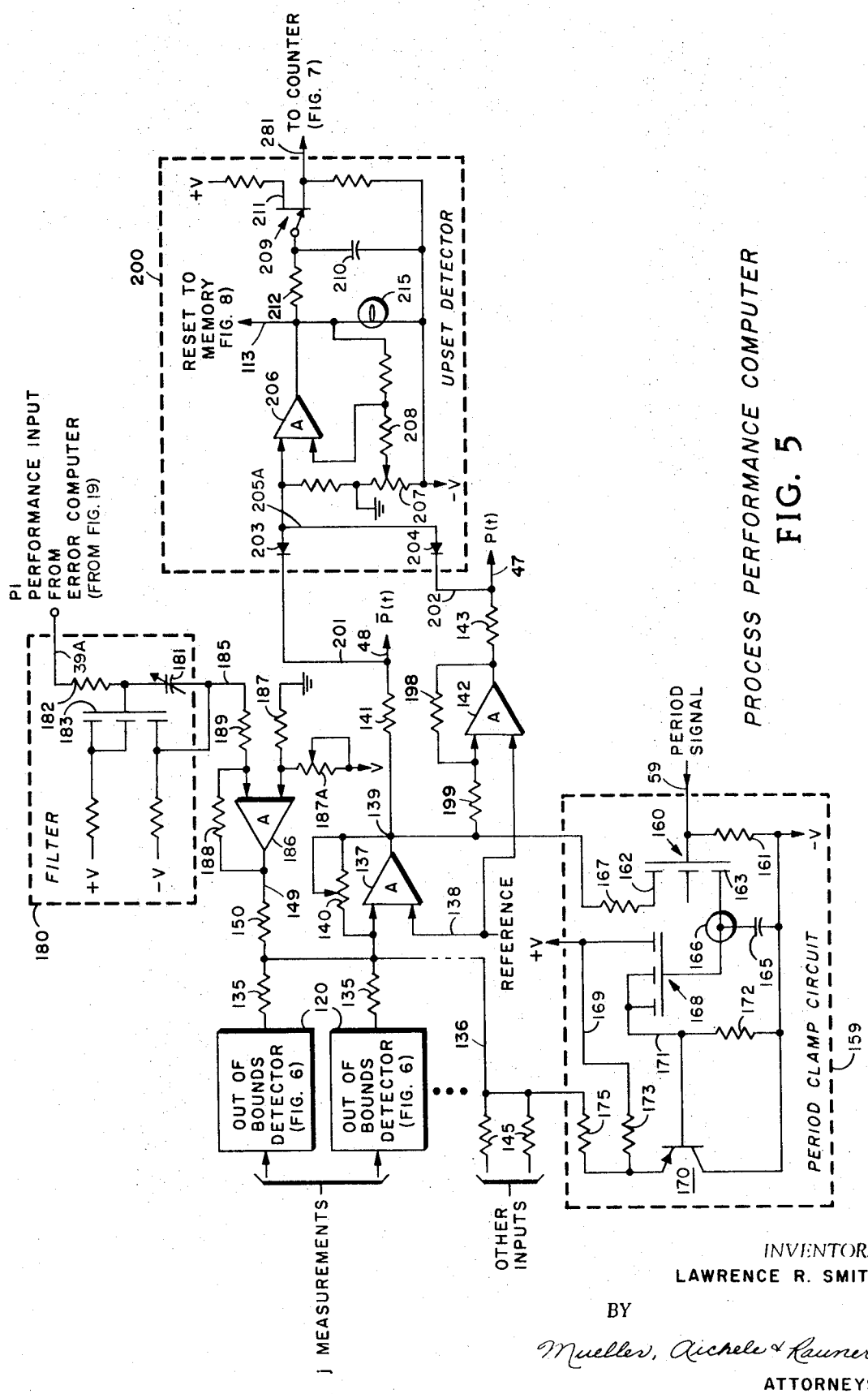
FIG. 7 is a block or signal flow diagram of a clock and modulation source usable with the FIGS. 1 and 9 illustrated embodiments.
Figure 8:
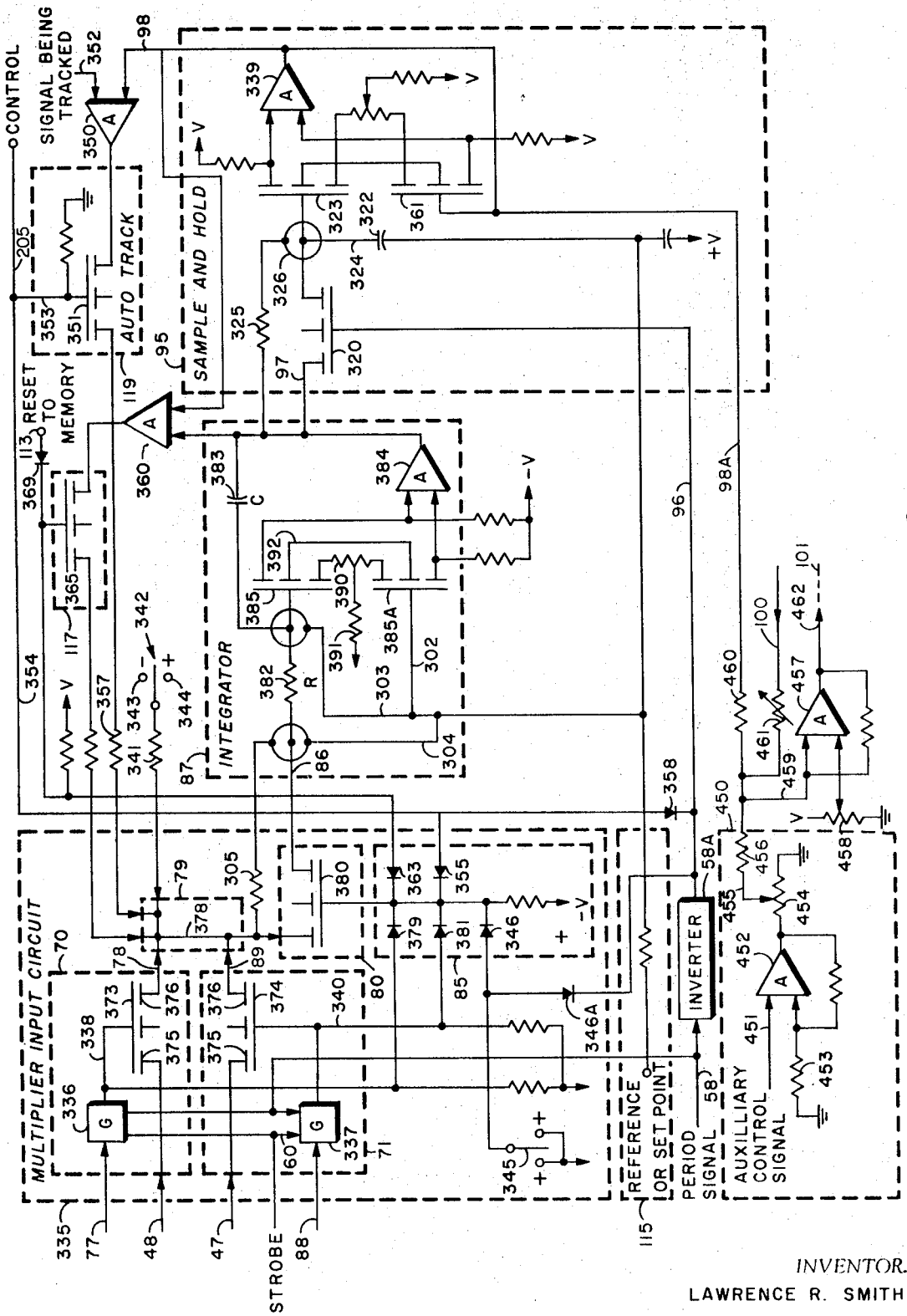
FIG. 8 is a schematic diagram of a control channel used in the FIG. 1 embodiment.

The clock and modulation source illustrated in block diagram form in FIG. 7 is utilized to generate all of the signals shown in FIG. 4 except the analog gate strobing pulses which are derived from the strobe pulses 61 in the control channels 44 and 50, as will be described in the section pertaining thereto. As stated in the previous sections, the modulation frequency of the control signals generated by the optimizing controller can have their frequencies changed without altering the gain of the control system. To this end a variable frequency oscillator 270 repeatedly supplies short duration pulses to the input of a monostable multivibrator 271. A frequency control signal on line 272 may be utilized to alter the frequency of the oscillator 270. Such oscillators can be voltage controlled oscillators, oscillators wherein tunable circuits can be electrically or mechanically tuned to different frequencies of oscillation, or can be a counter wherein there is a very high-frequency source and the output frequency is selected by various dividing down circuits well known in the art. A particular form of frequency source 270 is not important to the operation of the present invention. Monostable multivibrator 271 is responsive to each received pulse from line 273 to generate one pulse of predetermined duration in a train of pulses 61. The pulses 61 are utilized to determine integration time in the control channel and, therefore, the pulse width or duration of pulses 61 is preferably carefully maintained constant throughout the operation. A change in the duration of these pulses will alter the gain of system. In accordance therewith, the monostable multivibrator 271 can be made adjustable to control the gain of the system wherein all of the loops have their gain adjusted simultaneously.

The predetermined width pulses 61 are supplied over line 275 to pulse count down counter 276. Counter 276 may consist of a plurality of interconnected flip-flops as is well known in the trade. For example, counter 276 may have 10 flip-flops. Such a counter is shown in the book *High-Speed Computing Devices* by the staff of Engineering Research Associates on page 18, McGraw-Hill Company, 1950. Of course, other counters have been utilized and many designs are available. The modulation signal carrying lines 77, 88, 110, 111, etc., (also see FIG. 1) are connected to selected flip-flop stages, it being well understood that each flip-flop will have an output signal that has a frequency in accordance with its digit position in the counter. For example, the counter stage receiving the pulses on line 275 will change state each time a pulse is received. Its output signal having a frequency of one-half of that of the pulses on line 275 and, therefore, is the highest frequency modulation signal. This stage is often referred to as the least significant digit. At the other end of the counter, the flip-flop stage which forms the end of the counter, i.e., the last one to receive a pulse is termed the most significant digit and it has the lowest frequency of the output signals of any flip-flop in the counter. The output of the most significant digit of the counter is supplied over line 277 to gate 278 and over lines 58 and 59 to the components shown in FIG. 1. As shown in FIG. 4, the holding period from $t0$ to $t1$ is the positive portion, this being arbitrary; and any phase relationship between the various modulation signals may be used. The gate 278 is enabled or actuated by the signal on line 277 to pass the pulses from line 275 over line 60 to the control channels as shown in FIG. 1. When the signal on line 277 is positive, gate 278 is closed and passes no pulses. However, when the gate 278 is opened by the relatively negative period signal 57, the pulses 61 are then supplied over line 60 as shown in FIG. 1. It should be noted that the counter 276 is continuously actuated by the pulses on line 275 to continuously generate the period signal 57 as well as the modulation signals 72, 73, 74 and 75. In this embodiment, therefore, the control signals are continuously modulated even though the optimizing control is not active to optimize signal during all of the time. Also as shown, the clock and modulation source generates a period signal wherein the holding period is equal to the optimizing period in duration. No limitation thereto is intended. Depending upon the characteristics of the system a process being controlled the holding period may be substantially longer than the optimizing period. Counting techniques utilized to accomplish this are will known and need not be discussed further.

The modulation signals 74 and 75 are in quadrature phase relation. A simple logic circuit can be added to a pulse counter 276 to so generate a quadrature square wave signal. For example, an additional flip-flop may be added having inputs which causes that flip-flop to change state each time the wave form 73 changes state in a predetermined direction, i.e., as shown from relatively negative to relatively positive. In this case a frequency having twice the frequency of the desired quadrature signal is utilized to generate the signal 90° phase shifted with respect to a modulation signal having one-half the frequency of signal 73. Of course, other techniques are utilizable to generate the quadrature square waves and such may be used.

In FIG. 7 the $X_1$ modulation signals are supplied over lines 77 and 88 to channel 49. Line 77 carries signal from one side of a flip-flop stage used to generate the $X_1$ modulation whereas the signal on line 88 is taken from the opposite side to form complementary modulation signals on the two lines as above defined. In a similar manner the $X_2$ modulation signals are supplied over lines 110 and 111 to channel 50. The other channels are similarly connected to counter 276 as indicated by arrows 280.

A signal on line 281 resets the counter to the $t0$ state. Techniques for resetting counters are well known in the art. This reset line is utilized in connection with the upset detector in process performance evaluation computer 46.

Operation of the system can be significantly improved if the strobe pulses are delayed for a short time after any change of any controlled variable. This delay allows time for the system to recover from a change. The delay need not be long because the modulation amplitude or change of variable is small. This is equivalent to an operator pausing after a change prior to his taking a reading. System delays, and overshoots produced by improper tuning of secondary controllers, are ignored by this introduced delay. This ability to delay in an analog instrument is a very important feature.

This is accomplished by adding another input to gate 278 to which is connected a counter signal. This signal is changing at twice the rate of the fastest modulation signal. Also see FIG. 13 as later described.

CONTROL CHANNEL

The complementary process performance indicating signals $P(t)$ and $\overline{P}(t)$ are supplied to the plurality of control channels 49, 50, and 51 which in turn supply control signals used as set points by controllers in process 30. All of the control channels may be identically constructed; accordingly, only channel 49 is described in detail.

Referring to FIG. 8, the process performance indicating signals on lines 47 and 48 are supplied to multiplier input circuit 335 which includes analog gates 70, 71, 80 and linear mixers or circuits 79 and 85. In multiplier input circuit 335 the complementary performance indicating signals are effectively successively multiplied by binary plus and minus 1 to provide successive sets of opposite polarity signals over line 86 to integrator 84. If the performance of the process 30 is at optimum, the integration results in zero change whereas if it is not at optimum the integration result is a change indicative of the gradient necessary to provide a change in the controlled variable to return the process toward optimum. The output signal of integrator 87 is supplied to sample and hold circuit 95 over line 97. Sample and hold circuit gates the line 97 to a storage element only when the integration is complete as will be later described. Circuit 95 then, in turn, supplies a control signal through amplifier 339 thence over line 98 to modulator 99 (FIG. 1). Modulator 99 receives a modulating signal over line 100 from clock source 55 to modulate the control signal such that the control element effects a modulation of the controlled variable in process 30 to more or less perform a so-called "dither" in the variable such that the process performance signals on lines 47 and 48 vary in accordance with such modulation.

Strobe pulses 61 are received over line 60 to pulse gates 336 and 337 of analog gates 70 and 71. Such gates are enabled or actuated to pass strobe pulses 61 by period signal 57 going negative in conjunction or time coincident with modulation signal 72 on line 77 going negative or the complement signal on line 88 thereof going negative, respectively. Such gating action produces the repetitive burst of gating pulses 82 and 81, respectively, on lines 338 and 340. The gating pulses 81 and 82 are supplied respectively to the MOSFETs 373 and 374 field electrodes respectively in analog gates 70 and 71. When a signal on the gate electrode of MOSFETs 373 and 374 (of the type used in a constructed embodiment) is positive with respect to the source electrode, there is a low impedance provided between the source and drain electrodes 375 and 376 to thereby open the gates 70 and 71 to supply the performance indicating signals to summing junction or line 378 forming linear mixer 79. Some of the MOSFETs are made current conductive by a negative control signal; in any event, the MOSFETs are switched between current conduction and nonconduction by the gate pulse signals. Simultaneously, the pulses on lines 338 and 340 are supplied through isolating diodes 379 and 381 in linear mixer 85 to the gate of MOSFET 380. MOSFET 380 is analog gate 80. Such pulses make MOSFET 380 current conductive between its source and drain electrodes. Therefore, the signals P(t) and P̄(t) on line 378 are successively supplied to line 86 at the input to integrator 87.

The gates are pulsed N times during each half cycle of the fastest modulation period. If the pulse width, $T_p$, of the gate pulses is controlled and the number of pulses is always N, the time of integration will be $N \times T_p$ and will be independent of the period of the modulation. This is a sampled data system; and if the time interval between pulses is small compared with the response time of the system, there will not be any loss in information because of sampling. The sampling not only produces an integrator with scale factor that does not change with clock frequency but also produces an integrator capable of extreme accuracy when integrating over very long periods. As shown in FIG. 4 for pulses 106 and 107, the first occurring pulse in a burst or group of such pulses id delayed from the change in signal state of the corresponding modulation signal 74. In fact, there is a delay between bursts of pulses. Generation of such bursts of pulses is explained later with respect to FIG. 13.

The integrator 87 has a time constant determined by the value of the resistance of resistor 382 and the capacitance of integrating capacitor 383. The effective time content of integration is $$\frac{(N)(T_p)(RC)}{T_1 - T_2}$$

which produces a true integrator with a scale factor that does not change with the period $T_1-T_2$. Integrator 87 is of usual active element integrator design, having an operational amplifier 384 with the integrating capacitor 383 connected between its input and output. A pair of MOSFETs 385 and 385A provide dual inputs to operational amplifier 384 to provide an extremely high impedance input such that the integration is independent of the base period. Resistor 390 connected between the two source electrodes of MOSFETs 385 and 385A is connected through an adjustable tap on resistor 390 and resistor 391 to a reference voltage for centering the operation of the MOSFETs 385 and 385A. The substrates of the MOSFETs 385 and 385A are connected together by a single wire 392 but not connected to any reference potential. It is found that this connection provides good balancing between the two MOSFETs but yet provides for extremely high impedances and allows the cases to be thermally connected to each other for good temperature stability. Operation of the integrator 87 is well understood and will not be described for that reason.

The input to the integrator 87 is from reference source 115 which supplies a reference voltage for the system. Line 302 connects the field electrode of MOSFET 385A to source 115 and thereby transfers the reference potential to one input of amplifier 384. Additionally, source 115 signal is supplied over lines 303 and 304 to guard planes (described in application Ser. No. 702,440 supra) around resistor 382 and capacitor 383 to reduce the leakage path of the integrating capacitor 382 and its connection to resistor 382. This guard plane is also connected through high impedance resistor 305 to summing line 378. The purpose of resistor 305 is that when the MOSFET 380 (gate 80) is turned off, it presents a normally high impedance between the source and rain electrodes. However, there is still a finite leakage path; by connecting the reference voltage through the resistor 305 to junction 378, it will assume the reference voltage from the guard plane and thereby reduce the voltage across the source and drain electrodes of MOSFET 380 and reduce the leakage current. This action provides the maintenance of integrator 87 signal for a long period of time when the integrator is inactive.

The guard planes referred to above are not shown in the drawing as a physical structure. Resistor 382 is mounted between a pair of upstanding high-quality insulating studs on an insulating board of the printed circuit type. On the reverse or underside of such printed circuit board there is a conductive plate which has an electrical connection to line 303. Accordingly, the reference voltage is supplied to such guard plane thereby reducing the voltage across the resistor 382 supporting studs (not shown) to thereby reduce the leakage of capacitor 383 to its environment. Additionally, another metallic layer (not shown) may be mounted adjacent the capacitor 383 in the insulating board (not shown) to provide an environment around the capacitor having a voltage similar to the voltage stored therein. This enables the capacitor 383 to maintain its charge over a longer period of time. The fact that the capacitor 383 has its output terminal connected to the filed electrode of MOSFET 385 means that path is very high impedance. Therefore, minimum leakage is provided to capacitor 383.

Returning now to the multiplier input circuit 335, when the modulation signal 72 goes positive, MOSFET 373 of gate 70 is switched to current nonconduction between its source and drain electrodes. The polarity of the signal on summing line 378 is now pulsed negative N times when pulses 82 make MOSFET 374 of gate 71 current conductive to pass the P(t) signal to summing line 378. It is remembered that this is the negative of the P(t) signal on line 47 to effect a subtraction of P(t) by P̄(t) in integrator 87. Simultaneously therewith, the gate signal on line 340 passes through diode 381 to the field electrode of MOSFET 380 to make it current conductive for passing the complementary performance indicating signal P̄(t) on line 48 to line 378 to effect the subtraction of P̄(t) from P(t). During one-half modulation signal 72 the integrator 87 reduces the voltage across capacitor 383 as opposed to the increasing voltage occurring during the other half cycle of signal 72. As explained with respect to FIG. 3, if the process control system is operating around point Sj, the magnitudes of the performance signal during both halves of the modulation signal will be the same and there will be no change at the end of the integration cycle of the voltage across capacitor 383. However, if the performance is along the gradients of curve 25 (FIG. 3), there will be a net change with the direction of change indicating how the controlled variable is to be altered to bring the process toward optimum or desired operation.

The integrator output is disconnected from the memory capacitor 322 of sample and hold circuit 95 during the period of integration because the gate voltage on MOSFET 320 in circuit 95 is negative during this time. (The period signal on line 58 is inverted by invertor 58A.) At the end of the integration period, this voltage becomes positive and the integrator output is applied to the memory capacitor 322. Line 96 carries the inverted period signal 57 to the filed electrode of MOSFET 320 which serves as an analog gate between the output line 97 of the integrator amplifier 384 and circuit 95 storage capacitor 322. Therefore, the memory capacitor 322 will have a voltage thereacross in accordance with the voltage on capacitor 383. This stored voltage is in turn supplied to the field electrode of MOSFET 323 and thence to amplifier 339 to thereby maintain the signal on line 98 constant during the integration period. Operation of sample and hold circuit 95 is the same as that fully described in the application Ser. No. 702,440, supra. The amplifier system including differential amplifier 339 and MOSFETS 323 and 361 is unity as explained in Ser. No. 702,440. Capacitor 322 may have a guard plane as described for capacitor 383.

The voltage across the capacitor 322 during periods other than the integrating period is equal to the integrator output voltage since MOSFET 323 is current conductive.

The analog gate 320 and memory capacitor 322 thus maintain a constant voltage on line 98 during the period of integration and this voltage is changed after each integration period by an amount equal to the net integrator change. This means that at optimum the memory capacitor voltage and consequently the voltage on line 98 will not change because the net integration will be zero.

The line 324, and storage capacitor 322, the field or gate electrode of MOSFET 323, and drain electrode of MOSFET 320 are guarded with resistor 325 which connects the integrator output line 97 to guard plane 326. Since the integrator voltage at optimum is nearly equal to the memory voltage at optimum, this guarding reduces the potential across the leakage paths for capacitor 322. Also, the loss of charge through the filed electrode of MOSFET 323 is minimized because of an extremely high impedance presented thereby.

The integration period initiated by the period signal 57 is repeated as the clock 55 successively generates period signal cycles. The interval between successive integration periods may be varied or may be constant. For example, the nonintegrating period, i.e., when the signal on line 97 is not being altered by the integrator 87, may be the same time as the length or duration of the integrating period. It is also remembered that the modulation signal 72 is supplied to modulator 99 which continuously modulates the control signal on line 98 before supplying it as a set point signal to process 30.

It is to be noted that lines 77 and 88 carry the modulation signal and the complementary modulation signal respectively which may be used to gate the performance signals without the strobe pulses on line 60. As mentioned previously, this results in an integrator with a scale factor that varies with the period modulation.

In addition, it should be noted that the sampling pulses need not be continuous during each half of the modulation cycle. In fact, it is highly desirable to delay the sampling pulses by gating means and sample only during the last half or last quarter of each half of the respective modulation cycles. A delay of this type is analogous to a human operator making a change in a variable and waiting for the process to settle before he makes his measurement. This means that overshooting because of poorly tuned controllers or time delays introduced by system dynamics will not hinder adaption.

The control channel 49 can be manually controlled to preset the control channel in a process when first starting up or under emergency situations. In this regard, multiplier 335 is supplied with resistor 341 having one end connected to a summing line 378 and the other end connected to a manual toggle switch 342. In the unactuated position, switch 342 has its center terminal disposed between positive and minus terminals 343 and 344 such that no electrical connection is made to junction 378. When manual control is desired to decrease the signal amplitude on line 98, the center terminal is moved to terminal 344 to supply a positive voltage for supplying a positive stored charge to capacitor 322. To do so, the MOSFETs 380 and 320 must be made current conductive. In this regard, manual control switch 345 is connected to the field electrode of MOSFETs 380 and 320 through isolation diodes 346 and 346A, respectively. When the center terminal switch 345 is et to either extreme, diodes 346 and 346A are forward biased and the MOSFETS 380 and 320 are made current conductive. By ganging the center electrodes of switches 342 and 345 together, the integrator output can be changed by switching the two switches 342 and 345 to either increase or decrease the voltage on line 98. In this manner, the process control system can be manually operated through the use of the described control channel. It is understood that other manual control means may be utilized and that the presently described control channel can be interconnected with other systems in a manner to effect bumpless transfer of process control between the control systems.

While first installing an optimizing control system, it may be desired to operate a process before the optimizing control is made operative. Also, the optimizing control may be utilized to replace an existing process control system. In any switch over between control systems, it is desired that the process not be disturbed, i.e., the supervisory process control function be transferred from the previous process controller to the optimizing controller in a bumpless manner. To this end, an "auto track" analog gate 119 is provided. Analog gate 119 when opened connects the output of a difference amplifier 350 to the integrator input such that the magnitude of the signal on line 352 is automatically tracked by control channel 49. Auto track control signals are supplied over line 353 to the filed electrode of MOSFETs 351 and 380 (via line 354) to make them current conductive. In this manner, the difference between output and set point signal is supplied through auto track gate 119, thence through resistor 357 to summing line 378 in linear mixer 79. Since MOSFET 380 is current conductive, the signal on line 98 is then supplied to integrator 87. Integrator 87 will, therefore, automatically follow the magnitude of the signal on line 352 by altering the charge in integrating capacitor 383. Line 354 is also connected to the field electrode of analog gate MOSFET 320 through diode 358 to make MOSFET 320 current conductive such that the integrator 87 output signal is stored in memory capacitor 322 of sample and hold circuit 95. Therefore, the output signal on line 98 is the same as signal on line 352 whenever the auto track control signal is present. The signal to be tracked may be supplied by closing a manual switch (not shown), from a controller, a measurement made in a process or other source.

When control is desired to be switched from the previous controller (not shown) to control channel 49, the channel 49 is first actuated to auto track the analog controller or process measurement (not shown). After control channel 49 has tracked the line 352 signal, MOSFET 351 is made current nonconductive to stop the auto track operation. Since the memory capacitor 322 has stored therein a signal corresponding to the present control signal utilized in process 30, the set point or control signal supplied through amplifier 339 over line 98 is the same as the previous control signal in process 30. Therefore, process 30 continues to operate as previously even though a new supervisory control system has been installed.

When an upset condition is detected in process 30, it is desired that the optimization procedures of the supervisory control system be inhibited. The computer 46 illustrated in FIG. 5 detects the upset as described and supplies a "reset to memory" signal over line 113. In control channel 49, the reset to memory signal on line 113 is supplied through diode 369 to the field electrode of MOSFET 365 to make it current conductive. Line 113 is also connected through diode 363 of linear mixer 85 to enable or make MOSFET 380 current conductive. This action completes the return of the output of the difference amplifier 360 to the input connection of integrator 87. Sample and hold output line 98 is connected to the second input of the difference amplifier 360. The first input is connected to the integrator output on line 97. The gain of the amplifier consisting of MOSFET 323, MOSFET 361, and amplifier 339 is unity. This means that the output 98 voltage is equal to the voltage on capacitor 322. The output signal of integrator 87 prior to an integration period is the same as voltage stored in memory capacitor 322 of sample and hold circuit 95. The phasing of the difference amplifier 360 is chosen so that the integrator output will be forced to equal the voltage stored in the memory capacitor 322 when the reset to memory gate pulse is applied as above. The just-described connections maintain the analog magnitude stored in capacitor 322.

MOSFET gate 320 is normally closed, i.e., current nonconductive, during the integration period $t1$ to $t2$. When an upset condition occurs during an integration period, the signal in the integrator 87 is erased with the amplitude of the signal stored in capacitor 322 being imposed on integrator 87; then process 30 is maintained by the control signal amplitude previously and currently being supplied thereto over line 98. In sum and substance this states that the effect of the integration of integrator 87 during the integration period is erased by the receipt of a reset to memory signal on line 113. The reset to memory signal is repeatedly supplied over line 113 from the process evaluation performance computer 46 until the upset condition has been removed. In accordance therewith, there is not integration by integrator 87 permitting the capacitor 322 to remain at its constant value for maintaining the control to process 30 at the last previously computed magnitude. It is remembered that the computer 46 repeatedly resets the clock source 55 during an upset inhibiting a new integration period until the upset condition subsides.

In the utilization of an optimizing control, it is desired to provide feed-forward or other auxiliary control techniques. To this end, auxiliary control circuit 450 may be added to control channel 49. The auxiliary control signal is received from a source (not shown) over line 451. This auxiliary control signal may actually be a measurement from process 30 in a portion of the process which is upstream from the point that the control signal on line 98 exerts influence over process performance. As such, it is considered a feed-forward signal well known in the supervisory process control art. Also, it may be another type of signal as may be desirable to effect optimizing control over the process 30. A differential amplifier 452 receives the signal on line 451 and amplifies it in accordance with a reference developed across resistor 453 connected to the other input to amplifier 452. The output signal is supplied through potentiometer 454 to line 455. By adjusting the tap on potentiometer 454, the effect of the signal on line 451 is adjusted. This adjustment determines the relative effects or weighting of the channel 49 optimized signal on line 98 and the auxiliary control signal on line 451. The so-adjusted signal on line 455 is supplied through a current summing resistor 456 to an input of amplifier 457.

The second input to amplifier 457 is the potentiometer 458 which may be connected to a reference voltage source. The line 459 not only receives the signal through resistor 456 but also the output signal from line 98 supplied through line 98A and summing resistor 460. In addition, the modulation voltage for perturbating the output may be supplied through adjustable resistor 461 and line 100 (FIG. 1). The summed signal as differentially amplified by amplifier 457 is supplied over line 462 to control a variable within process 30. The line 462 becomes the control channel output as shown by line 101 of FIG. 1 to supply an optimizing control effect to the process 30.

AN OPTIMIZED PUMPING STATION

Referring now more particularly to FIG. 9, the invention is shown in one operating environment in which a constant flow of a fluidic material through pipe line 400 is pumped to an increased pressure at the output pipe line 401 with the pumping being performed at maximum efficiency within the constraint of a constant flow input rate. Efficiency is determined by multiplier-divider computer 402 which receives the flow rate information from flow rate sensor and transmitter 403 over line 404 and identified as input A. The pumping performance, i.e., the pressure-differential between input manifold 406 and output manifold 407 is measured by a differential pressure transmitter 410 respectively connected to the manifolds by pressure transmitting lines 408 and 409. Differential pressure transmitter 410 supplies an electrical signal over line 411 to the B input of multiplier-divider computer 402. The third input C is supplied over line 412 from a fuel meter 413 indicating the rate of fuel supplied to variable speed engine or motor 414. The efficiency of the pumping station is the equation AB/C which is the work done divided by the fuel input. The multiplier-divider 402 may take the form of a multiplier-divider disclosed and claimed in the Oliver Pat. application, Ser. No. 480,315, filed Aug. 17, 1965, now U.S. Pat. No. 3,414,721, issued Dec. 3, 1968, and assigned to the assignee of the present application.

The efficiency performance signal is supplied in analog form over line 416 to self-optimizing performance controller 417. The self-optimizing performance controller 417 may be constructed in the same manner as the optimizing controller illustrated in FIG. 1. In the particular instance, the line 416 would supply the input to the computer 46 to terminal 39A as shown in FIG. 5. Controller 417 includes computer 46, clock 55, and control channels 49 et seq.

The fluidic material passing through input pipe line 400 to the input manifold 406 is received by a pair of turbine pumps 420 and 421 which increase the pressure of the fluidic material and exhaust same through the output manifold 407 to output pipe line 401. The variable speed engine or motor 414 is mechanically coupled to drive both pumps at the same speed. The pumps 420 and 421 may have variable vanes, i.e., the pitch of the vanes is variable such that the flow rate therethrough and the pressure developed can be varied for a given speed of the motor. To obtain maximum efficiency there must be an optimal balancing between the vane position and the motor speed which is controlled by the signal on line 433 to obtain a constant flow rate through the flow rate sensor and transmitter 403. The vane position is indicated electrically over lines 422 and 423 to a pair of out-of-bound detectors within self-optimizing performance controller 417. Such out-of-bound detectors may be the detectors 120 as shown in FIG. 5. In addition, the variable speed motor 414 supplies electrical signals over lines 424 and 425, respectively, indicating motor speed and temperature which may be to another set of out-of-bound detectors. In other words, the motor 414 may have an upper and lower speed limit and may operate within a predetermined range of temperature. Outside of the range certain inefficiencies may be inherently introduced into the operation of the motor. Motor torque signals are supplied over line 426. Such a signal is supplied to an out-of-bound detector in controller 417 which has only an upper limit or bound, i.e., a maximum torque on the shaft connecting motor 414 to pumps 420 and 421 as determined by the strength of such shaft.

Self-optimizing performance controller 417 supplies modulated control signals which serve as set point signals over lines 427 and 428, respectively, to pumps 420 and 421 for controlling the vane position therein in a known manner. Analog controller 430 receives a set point signal over line 431 and compares same with the flow rate indicating signal supplied over line 432 and supplies a signal over line 433 for adjusting the speed of motor 414 in accordance with the comparison of the set point signal and the measured flow rate. Therefore, there is provided an optimizing pumping station wherein the constraint, i.e., constant flow through the sensor 403, is determined by a set point signal and the station is optimized to operate at maximum efficiency around such constraint.

In addition to supplying the speed control signal over line 433 to motor 414, the speed control signal may be supplied over line 434 as an additional input to self-optimizing performance controller 417. To this end, line 434 may be connected to one of the input lines 451 shown in FIG. 8. Fuel may be an electrical energy or a combustible fuel type.

Uncontrolled variables affecting pumping efficiency include wear and tear on the pump vanes operation of the motor being varied with humidity and temperature changes, resistance to flow in the illustrated pipe lines, and the like.

In the FIG. 9 station, the vane position signals supplied over lines 422 and 423 indicate that the vanes in pumps or turbines 420 and 421 have limiting positions as to satisfactory operation. The optimizing action is the balancing of motor 414 speed and vane position to maximize the efficiency signal on line 416 as limited by the constraint of constant flow, allowable ranges of torque, temperature, vane positions, and etc. The efficiency performance is calculated from three performance measurements: flow rate, differential pressure, and fuel consumption. As an additional constraint, the differential pressure across pumps 420 and 421 may be restricted to a predetermined range of operation. If so, the signal on line 411 would then be supplied to controller 417 (connection not shown) for determination of whether or not the differential pressure is within the predetermined acceptable or optimum range.

NOISE IMMUNITY

Figures 10, 11:
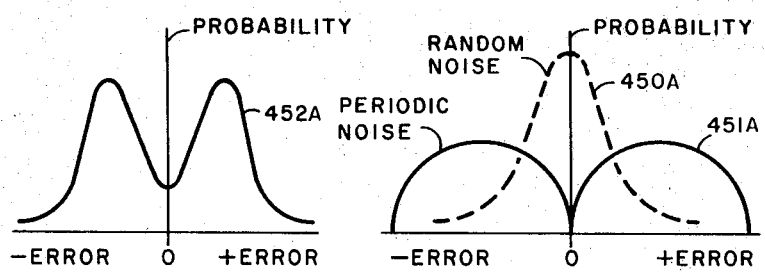
FIG. 10 is a graphical representation of two probability curves showing the effect of random and periodic noise on errors in a process being controlled.
FIG. 11 is a graphical representation of the variation of probability of the effect of noise on a process derived by combining the two curves of FIG. 10 to show the effect of random noise utilized in a process control for effecting immunity to other noise by such process control system.

Referring to FIG. 10, there is illustrated in graphical form the probability of an error occurring in a process control system as the result of receipt of random noise and of periodic noise. Curve 450A shows the probability distribution of error, both positive and negative errors, as the result of the receipt or the presence of random noise in a process. It should be noted that the probability of zero error is quite good due to random noise. As the error increases either positively or negatively, there is a decreasing probability of random noise affecting system performance.

Compare the above-described curve with curve 451A for the probability of error affecting process performance as the result of the presence of the receipt of periodic noise. The probability of zero error is zero. In other words, in the presence of periodic noise, there is always an error introduced into the system. This probability may vary in accordance with curve 451A. A combination of random along with periodic noise will produce a resulting probability curve shown in FIG. 11 (curve 452A). The vertical ordinates between FIGS. 10 and 11 should not be scaled. The curve in FIG. 11 shows that while the probability of zero error is increased, the probability of positive or negative errors due to the periodic noise is decreased.

Figure 12:
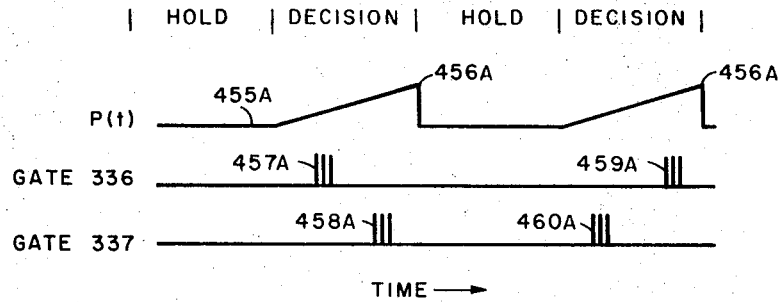
FIG. 12 is a graphical representation of waveforms illustrating the effect of phase reversal of modulation when a ramp type of noise is present in a process control system.

One type of periodic noise that is synchronous with process operation is the so-called ramping noise shown in FIG. 12. (Process performance signal P(t) 455A). During each sampling period the performance signals 455A periodically ramp to a peak at 456A. The resetting of the performance computer with the periodic signal 57 causes the performance to return to zero during the delay portion of the system cycle. Thus, a ramping performance is a synchronous noise signal. The object is to reduce the effect of the synchronous noise indicated by the peaks 456A upon system performance. To so do, applicant reverses the phase of the sampling pulses and of the modulation such that the ramping noise is cancelled in integrator 87.

Referring back momentarily to FIG. 8, the analog performance signal gated by gate 336 is the negative going signal $\overline{P}(t)$, whereas the signal gated by gate 337 is the positive going performance signal P(t). These two signals are then summed in the integrator 87 to effect a subtraction between the two quantities. Remembering that the signal gated by gate 337 is additive from a positive signal viewpoint while the signal gated by gate 336 is subtractive, the effect of phase reversal of the sampling pulses and of the modulation is readily understood by referring to FIG. 12. Gate 336 receives the sampling pulses 457A during the first portion of the decision cycle which corresponds to a lower amplitude portion of wave 455A. During that same decision cycle, gate 337 which receives the positive performance signal is sampled by a set of pulses 458A. As a result, the gradient in integrator 87 will be positive since the pulses 458A sample a higher amplitude portion of wave 455A than that sampled by the pulses 457A associated with the negative signal gate 336. In another decision, the cycle represented by the series of pulses 459A for gate 336 and 460A for gate 337, the pulses 459 sample the higher amplitude portion while pulses 460A sample the lower amplitude portion of wave 455A. Assuming that the noise is of constant amplitude, there is provided a negative gradient in the integrator 87 by the fact that pulses 459A sample the higher amplitude portion of wave 455A while the pulses 460A sample the lower amplitude portion. This negative gradient is equal in amplitude and is effective to cancel the positive gradient in integrator 87 caused by the ramp noise during the preceding decision cycle. Therefore, the reversals of the phase as illustrated in FIG. 12 for synchronous noise will serve to cancel the effect of that noise on the process control.

While in FIG. 12 two successive decision cycles having noise ramping to peaks 456A were shown as having phase reversals in the sampling pulses, it is not required that the phase reversals be alternated in successive decision cycles. Such phase reversals should average to zero on a statistical basis. For example, random noise modulation of the phase of the modulation during different decision cycles results in the statistical average of such random noise to be zero such that the immunity to noise as above referred to is achieved. In actual practice, the random noise modulation of the reversal of phases, which reversal of phases is effected during or at at the end of the holding period to minimize any effects on integrator 87, is actually better than that of alternating the phase during successive ones of such cycles.

PHASE REVERSAL OF THE MODULATION SIGNALS

Figure 14:
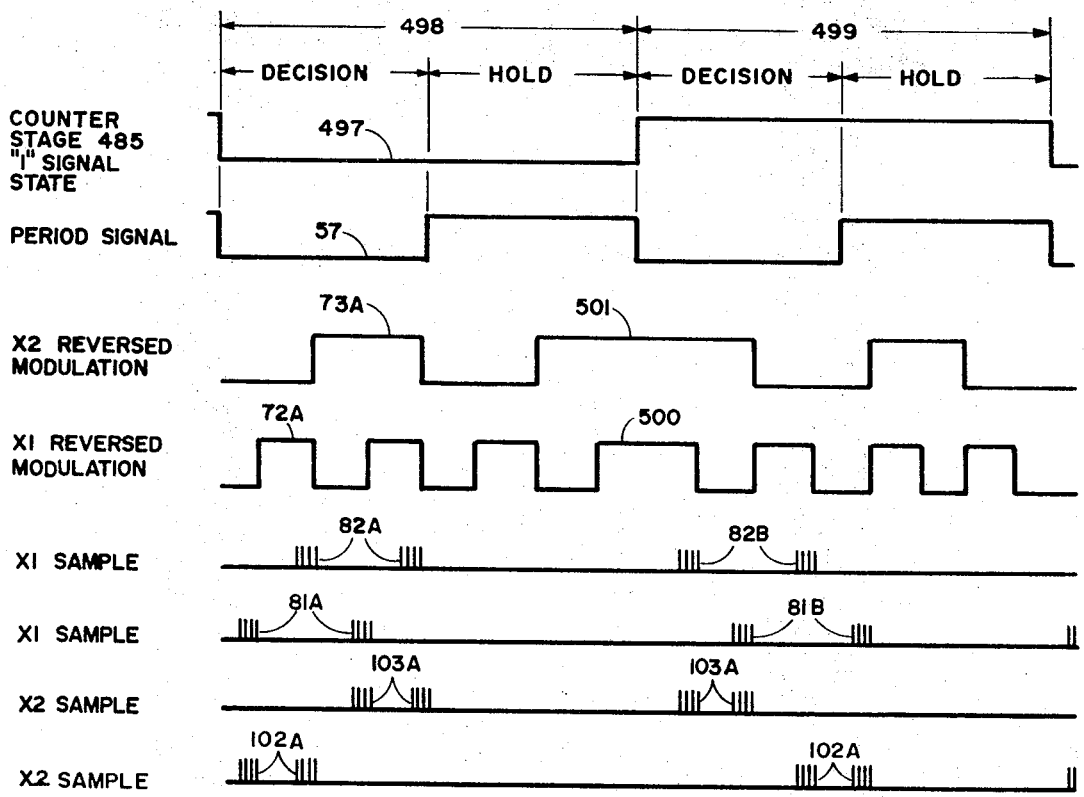
FIG. 14 is a graphical representation of idealized signals utilized to describe the apparatus shown in FIG. 13.

Referring more particularly now to FIGS. 13 and 14, there is described the apparatus utilizable to reverse the phases of modulation as well as random noise or pseudo noise modulation of such phase reversal plus the frequency of modulation. The system illustrated in FIG. 13 may be used in any of the described applications herein as a substitute for the clock and modulation source 55 illustrated in FIG. 7. As previously mentioned, the combining of strobe pulses 60, period signal 57, and the modulation signals to form sampling signals can be accomplished within control channels 49, 50 and 51 or within a clock and modulation source 55. As shown in FIGS. 1 through 8, the above described signals are combined within the control channels. In the FIG. 13 illustrated clock and modulation source, the signals are combined within the source and then the sampling pulses, such as pulses 81A, 82A, 102A and 103A shown in FIG. 14, are distributed from the clock and modulation source to the various control channels. In such an instance, the analog gates 70 and 71, shown in FIG. 1 as a part of control channel 49, will only have two inputs. One input will be respectively from lines 47 and 48 which carry the complementary process performance indicating signals, while the other inputs are the lines in a cable 56 which then carry the groups of strobe pulses as gated within the clock and modulation sources as appearing on lines 77A, 88A, 110A, and 111A of FIG. 13. These lines are connected respectively to the gates 70 and 71 of channel 49 and to corresponding analog gates (not shown) of channel 50 replacing respectively lines 77, 88, 110 and 111. The signals 81, 102 and 103 each having the suffixes A or B are supplied respectively over those lines.

Counter 176 of FIG. 7 is replaced by the counter and logic circuitry 276A of FIG. 13. Reset line 281 receives the same signal as line 281 of FIG. 7. The monostable multivibrator 271 is the same which receives actuating pulses of short duration over line 273 from frequency source 270. Frequency source 270 receives the frequency control signal over line 272 from voltage divider 468. When switch 470 is open, as shown, the voltage developed between ground reference potential and voltage V determines the frequency of oscillator 270. Shorting bar 469 is utilized to adjust the frequency of operation of frequency source 270. If the frequency of modulation is to be varied in a random or pseudo-random manner, switch 470 is closed for connecting random noise generator 471 to line 272 to vary the frequency of operation of frequency source 270 in accordance with the noise generated therein. Random noise generator 471 may be of any type including zener diode noise generator or may be a pseudo noise generator of the shift register sequency type as later described with respect to circuit 276A. In any event, the frequency signal supplied by source 270 actuates monostable multivibrator 271 to produce repetitive short duration clock pulses over line 275. Gate 278 receives the clock pulses and when enabled by a signal over line 277 from counter 475 will pass such clock pulses as strobe pulses (FIG. 4) over line 60. Such strobe pulses are supplied to control channels such as those shown in FIG. 1 wherein the strobe pulses 61, the modulation signals, and the period signal 57 are combined within the control channel to form the sampling pulses, such as pulses 81 and 82, etc., as shown in FIG. 4. The line 277 is connected to delay stage 484, a flip-flop, within counter 475. The line 277 signal is the inversion of period signal 57 supplied over line 58 as later described, and opens gate 278 during each decision cycle to pass pulses 61.

The clock pulses on line 275 are also supplied through a half adder 476 to counter 475. For the present, it may be assumed that the input to half adder 476 received over line 477 always represents a binary zero such that each and every clock pulse representing a binary 1 supplied to half adder 476 from line 275 is passed to counter 475 without alteration. Counter 475 then counts the number of clock pulses to establish the modulation waveforms, as will be described.

Counter 475 includes a first counter portion 480 which has a given modulus. Upon exceeding the modulus, a pulse of short duration is supplied over line 481 to a plurality of counter stages 482, 483, 484 and 485 which are interconnected as a counter in a known manner (connection not shown). The counter portion 480 with the stages 482 through 485 constitute a single counter of usual construction. The bistable counter stages 482 through 485 are broken out to show the connections of logic determination for phase reversal of the modulation generator. Each stage is capable of storing a binary digit (bit) having a numerical representation of a binary "0" or binary "1." Assuming that counter 475 has N stages (Nison arbitrary integrator), the most significant digit position represented by flip-flop or counter stage 485 has the value $2^{N11}$. The least significant digit of the counter stages 482 has a numerical significance of $2^{N14}$. Modulation generated by logic circuit illustrated as a part of circuitry 276A is the lower frequency modulation signals, it being understood that counter portion 480 may have additional connections (not shown) to other control channels (not shown) which utilize higher frequency modulation signals.

A set of AND-gates 490, 491, 492 and 493 are connected to the counter stages 482, 483 and 485. AND-gates 490 and 491 have a common output through linear mixer or inclusive OR-circuit 494. OR-circuit 494 is connected to line 100 which in this embodiment is connected to control channel 49 (FIG. 1) for actuating modulator 99. In this FIG. 13 embodiment, line 100 is separate from line 77A, it being understood that the strobe pulses 81A and 81B supplied over line 77A (FIG. 13) are supplied not only to AND-gate 70 (FIG. 1) but also to OR-circuit 85 (FIG. 1) for opening AND-gate 80 (FIG. 1). Line 100, as shown in FIG. 13, carries the modulation for modulating the control signal $X_1$. In a similar manner, the AND-gates 492 and 493 have their output signals combined in OR-circuit 495 to be supplied over line 496 as the $X_2$ modulation signal to control channel 50 which is connected to the modulator (not shown) therein which modulates the $X_2$ control signal. The $X_1$ reversed modulation signal is shown in FIG. 14 as waveform 72A while the $X_2$ modulation on line 496 is shown in FIG. 14 as waveform 73A. These two modulation signals may be compared with the waveforms 72 and 73 of FIG. 4 and are respectively associated with the $X_1$ and $X_2$ sample pulses of FIG. 14.

AND-gate 490 supplies an actuating signal whenever counter stage 482 is in the binary 0 state and the counter stage 485 is in the binary 1 stage. AND-gate 491 supplies an actuating signal whenever the counter stage 482 is in the 1 state and a counter stage 485 is in the 0 state. It is seen that counter stage 484 generates the period signal. Accordingly, the reversal of signal state from 0 to 1 and vice versa in counter stage 485 is at one-half the frequency of the period signal 57 as shown by waveform 497 in FIG. 14. It is seen from inspection of FIG. 14 that during the decision and hold cycle 498, AND-gate 491 is enabled by the zero side of counter stage 485 ("1" stage is negative making the zero side positive or gate enable state) and will supply the modulation in accordance with the switching of counter stage 482 from the one output side. During the next succeeding cycle 499, counter state 485 is set to a "1" to enable gate 490 and disable or open gate 491 such that the zero side of flip-flop or counter stage 482 is utilized through AND-gate 490 to generate modulation signal 72A which is the opposite phase. This change in phase is shown as an elongated positive portion 500 intermediate the hold and decision portions of the cycles 498 and 499 respectively. In a similar manner, AND-gates 492 and 493 generate phase reversal, or reversed modulation signal 73A based upon the switching of counter stage 483 with the phase reversal being effected during the elongated positive portion 501 as aforedescribed for waveform 72A. It is understood that other forms of phase reversal circuits may be utilized, the illustrated circuit being a simple approach for causing phase reversal at the end of a hold cycle. The phase reversal may be accomplished at the beginning of the hold cycle if desired. It is preferred not to change the phase during the decision cycle. To so do could introduce errors in the integration.

The generation of the sampling pulses 81A through 82A and 102A through 103B is by pulse gates 505 through 508. Each of the gates 505 through 508 receive the clock pulses on line 275, the period signal 57 supplied from line 58 and receive delay or spacing signals over lines 509 from first counter portion 480. A selected stage (not shown) of the counter portion 480 at some submultiple synchronous frequency of the pulses on line 275 is utilized to actuate the gates 505 through 508 as a frequency divided control signal such that the sampling pulses for $X_1$ and $Xhd 2$ samplings are at a submultiple frequency of pulses 61 shown in FIG. 4. This provides a delay mechanism in integrator 87. No requirement to the successful practice of this invention is required. What this means is that after the holding period and after a change in modulation signal state, there is a slight delay until the sampling pulses are supplied to the gates 505 through 508. This delay can be changed by selectively connecting lines 509 to different stages of counter portion 480. Referring to FIG. 14, pulses 81 and 82 are delayed from the transitions of signals 72A. Pulses 102 and 103 associated with signal 73A are likewise delayed from such transitions to appear as two successive bursts of pulses during one-half cycle of signal 73A.

The other connections to gates 505 through 508 are from lines 100 and 496 respectively carrying the $X_1$ and $X_2$ modulation signals. Since the $X_1$ sampling pulses on lines 77A and 88A respectively carry the 81 and 82 burst of pulses, an inverter 510 is connected to gate 506 such that gates 505 and 506 will alternately carry the sampling pulses in accordance with the $X_1$ modulation signal. That is, gate 505 passes pulses 81A and 81B in accordance with the phase of the $X_1$ modulation on line 100. This action follows the phase reversing of modulation signal 72A. Gate 506 supplies sampling pulses 82A and 82B during the opposite signal state of the $X_1$ modulation. As shown, pulses 81 are supplied during the negative portion of signal waveform 72A while pulses 82 are supplied during the positive portion. Gating circuitry responsive to such signal states are well known and will not be described for that reason.

Correspondingly, the $X_2$ sampling pulses 102 and 103 are similarly gated by gates 507 and 508. Inverter 511 cooperates with gate 508 in the same manner that inverter 510 cooperates with gate 506.

In some instances, it may be desired to modulate the duration of the holding period such that it may be longer or shorter than the corresponding decision period. Referring momentarily to FIG. 14, the positive portions of period signal 57 corresponds to the holding period. It is desired to modulate the duration of that portion of signal 57 without altering the duration of the negative portion, i.e., the decision or measurement cycle in the process control system. To this end, gate 515 and pseudo-noise generator 516 are added to the system of FIG. 13.

Pseudo-noise generator 516 is a simple shift register sequence generator consisting of a shift register 517 of usual design. That is, a signal introduced into shift register 517 at the input 518 as a binary 1 signal is shifted down the length of the register toward end 519 in accordance with the clock pulses received from line 275. The last two stages of shift register 517 have their one or active condition output indicating signals supplied respectively over lines 520 and 521 to half adder 522. The internal construction of half adder 522 is well known and sometimes referred to as an exclusive-OR circuit. The truth function represented in half adder 522 is that an actuating signal will be supplied as an output signal over line 523 only if the signals on lines 520 and 521 are unalike. This is also often referred to as a logic adder wherein there is no carry. It is understood that the half adder 522 may be substituted for by other logic circuits to form other shift register sequences often referred to as pseudo-noise sequences. The actuating signal on line 523 is supplied to gate 515 and thence over line 524 back to the input of shift input 518 of shift register 517 for effecting a closed loop for generating a linear shift-register sequence. It is also supplied over line 477 to half adder 476. Since the clock pulses on line 275 actuate gate 515, the pulses on line 477 are in synchronism therewith. Therefore, each time a pulse appears on line 477, the pulse supplied to half adder 476 from line 275 is inhibited and there is no input to counter 475. Only when gate 515 is not passing a pulse, at a given time, will the pulse on line 275 be supplied to counter 475. Therefore, the pulse pattern supplied by half adder 476 to counter 475 will be an inverse or complement of the shift register sequence supplied by PN generator 516. Since the pulses supplied by half adder 476 during control by PN generator 516 will always be at a rate less than the line 275 pulse repetitiveness during a given holding period, i.e., during the positive portion of the period signal 57, the duration of the holding period will always be greater than that shown in FIG. 14. The duration of the holding period will vary in accordance with the PN sequence of pulses.

The pseudo-noise modulation of the holding period is actuated by the inverse of the period signals supplied by counter stage 484 over line 525 in conjunction with a control signal received from a source (not shown) over line 526 entitled "-select PN." Therefore, gate 515 is enabled to pass the pulses from line 523 only when the select PN signal actuates the gate and during the holding portion of period signal 57. To decrease the holding period from that shown IN FIG. 14, the pseudo-noise signals on line 524 may be applied to a set of gates (not shown) serving as an input to selected digit portions of first counter portion 480 to reduce the number of pulses required to cause a pulse to be emitted over line 481. The output of half adder 476, instead of being supplied to the least significant digit position of counter portion 480, may be selectively connected to any digit position therein for selectively shortening the duration of the holding period represented by the positive portion of signal 57.

It is understood that other forms of modulation of the duration of the holding period may be used. The particular shift register sequence is simple but is sufficient for process control purposes for increasing the noise immunity of the process control system.

The variation of the holding period by the pseudo-noise generator 516 modulates the time of decision such that synchronous noise resulting in the process by the repetitive decision making is altered on a pseudo noise basis. A true noise generator may be substituted for the shift register sequence illustrated in pseudo noise generator 516.

ADAPTIVE FEED-FORWARD CONTROL USING INTERPOSED PROCESS CONTROL MODEL

Referring now more particularly to FIG. 15, a bleaching operation is shown in block signal flow diagram having adaptive feed forward of three variables. In the system, a liquor in the form of paper pulp from paper pulp source 550 is mixed with chlorine bleach from source 551. After a delay, the bleach and pulp are mixed together in mixer 552 and then supplied to a "hold-up" tank 553 which accumulates the mixed chlorine and pulp and holds the mixture until a subsequent process is ready to accept same. The bleached pulp is being supplied through output conveyor system 554 and is measured by an oxidation reduction potential (ORP) sensing unit 555. The process is operated such that the quality of the incoming material through conveyor system 556 is not controlled. That is, the bleaching operation must bleach all incoming pulp to a given oxidation reduction potential criterion irrespective of the quality of the incoming pulp. The ORP indicating signal generated by sensor 555 is supplied over line 557 to an analog controller 34 corresponding to the analog controller 34 shown in FIG. 1. The ORP signal on line 557 corresponds to process performance P1 supplied over line 38 to process performance computer 46. Controller 34 receives a set point over input line 36. The signal on line 557 is compared with the set point signal and supplied as a control signal over line 40 to the process control model 558 interposed between the self-optimizing performance controller 29 and the process being controlled including mixer 552.

Process control model 558 is designed to solve an equation representative of the bleaching operation being performed in the system shown in FIG. 15. This equation will include the relationship the uncontrolled input variables have on process performance. For example, the quality of the pulp varies such that a constant ratio of chlorine to pulp cannot produce optimum control. Insofar as bleaching is concerned, the uncontrolled variables of the process are brightness represented in the later listed equation as variable $W_1$ and electrical conductivity represented as variable $W_2$. These two uncontrolled variables are supplied to process control model 558 for solution in the equation of the process. The quantity QL represents the amount of pulp being supplied by conveyor 556 to mixer 552.

The gain of the illustrated process is large which means that minor deviations from a desired optimum relationship of the uncontrolled variables, brightness and electrical conductivity, requires a substantial change in the amount of bleach supplied from source 551. Because of the large delay from the mixer 552 and hold-up tank 553 to ORP sensor 555 which determines the effectiveness and the relationship of the bleach source 551 to the quality of the pulp material on input conveyor 556, any control is ineffective without feed forward. In other words, the values of the brightness and electrical conductivity must be anticipated such that the ORP reading of sensor 555 can remain within a desired range of values. For reasons beyond the teaching of this particular specification, it is desired that the difference between the signal on line 557 and the signal on line 581 which may be termed as as error signal must affect the self-optimizing performance controller 29 in accordance with the square of such signal value. Therefore, process performance computer 46 upon the receipt of performance signal P1 from line 38 must subtract the signal on line 581 and generate the square of such value. The absolute output error computer shown in FIG. 19 and later described accomplishes this mathematical function within computer 46. This addition to computer 46 illustrated in FIG. 5 is exemplary of the type of apparatus that is expected to be used with the FIG. 5 illustrated computer circuit or with computer circuits of other designs to calculate the total performance P(t).

It can be stated that the error, i.e., is the difference between the desired and actual process ORP reading. Therefore, the optimum control strategy is some function of the two variables $W_1$ and $W_2$ which can be expressed as an infinite series expanded about the average value or the expected average value of such uncontrolled variables. Such a relationship can be expressed as:

$$F(W_1, W_2) = X_0 + X_1(W_1 - \bar{W}_1) + X_2(W_2 - \bar{W}_2) X_3 (W_1 - \bar{W}_1)(W_2 - \bar{W}_2) + X_4 \frac{(W_1 - \bar{W}_1)^2 + X_5 + (W_2 - \bar{W}_2)^2}{2!} + \ldots \quad (10)$$

wherein $\bar{W}_1$ and $\bar{W}_2$ are the average values of the variables $W_1$ and $W_2$ respectively, $X_0$ through $X_5$ and etc. are constants and F indicates the function of the two variables $W_1$ and $W_2$.

For small changes of the variables $W_1$ and $W_2$ from their established or expected average values, the infinite series set forth in equation (10) converges rapidly. Accordingly, the total equation can be approximated with a reasonable degree of accuracy by using only the first three terms of the series, simplifying equation (10) to: $F(W_1, W_2) = X_0 + X_1(W_1 - \bar{W}_1) + X_2(W_2 - \bar{W}_2)$ (11) Process control model 558 in FIG. 15 is designed to solve equation (11) where $X_0$ is inputted from controller 34 over line 40 and $X_1$ and $X_2$ are inputted from the self-optimizer 29 over lines 101 and 112 respectively.

Obtaining satisfactory accuracy by using equation (11) requires that the average value of the variables $W_1$ and $W_2$ be continuously monitored and calculated such that the differential between the actual value and the average value is as small as possible. The time used to average the variables must be sufficiently long to make certain that the averages change slower than the term $X_0$ changes by the feedback control effected by controller 34 (FIG. 15).

In system operation the absolute value of the difference between ORP indicating signal supplied over line 38 and the ORP set point supplied over line 581 is minimized. Process performance computer 46 may receive other inputs over lines 560 which are taken into consideration in optimizing the bleaching operation. The total performance signals P(t) and $\overline{P}(t)$ are supplied over lines 47 and 48 to self-optimizing performance controller 29. The two channels 49 and 50 of FIG. 1 receive the modulation signals supplied over cable 56 from clock and modulation source 55, which may be of the type either shown in FIG. 7 or FIG. 13, to produce modulated control signals $X_1$ and $X_2$, respectively supplied over lines 101 and 112. The modulated control signals $X_1$ and $X_2$ instead of being applied directly to the process being controlled, are supplied to the interposed process control model 558. These two modulated control signals are combined by process control model 558 with the $X_0$ signal from controller 34, the two uncontrolled variable inputs $W_1$ and $W_2$ being supplied as variables M+4 and M+5 of FIG. 1 and the input measurement quantity QL is supplied as uncontrolled variable M+3 to process control model 558 to generate a single modulated control signal on line 561 representative of the bleach rate of flow for optimum operation. This single modulated control signal is supplied over line 561 to controller 562. The flow transmitter 563 measures the rate of flow of the bleach from source 551 and supplies the rate of flow indicating signal to controller 562. The controller 562 is jointly responsive to the single modulated control signal on line 561 and the rate of flow indicating signal to supply an actuating signal over line 564 to adjust valve 565 to cause a rate of bleach flow indicated by the line 561 signal. The bleach is supplied to header 566 at the input to mixer 552. The process control model will be later described with respect to FIG. 17.

Referring next to FIG. 16, there is shown a process as described for FIG. 15 but having cascaded controllers to provide an improved optimizing operation. The same numerals have been used to identify comparable parts. The addition of sensor 570 in hold-up tank 553 obtains intermediate ORP readings in addition to the ORP readings obtained by sensor 555. Sensor 570 supplies the intermediate ORP readings over line 37 to controller 33 (numerals used to identify comparable parts in FIG. 1). A change has been made from FIGS. 1 and 15 in that the output line 40 from controller 34 no longer is applied to the process control model 558 but is connected to line 35 as a set point input for controller 33. Therefore, the variable M+2 is used as a set point such that the controllers 33 and 34 are cascaded in their controlling operations. Controller 33 supplies its control signal $X_0$ over line 39 to process control model 558. This control signal corresponds to the M+1 control signal supplied to the process of FIG. 1. In this illustration, it is supplied to the process control model which eventually effects control over the process. Outside of the above described changes, FIGS. 15 and 16 are the same.

Both systems measure their uncontrolled variables by three sensors: sensor 575 measures the flow, sensor 576 measures the optical brightness, and sensor 577 measures the electrical conductivity of the input pulp. These sensors supply signals indicative of the values of the variables measured respectively over lines 578, 579 and 580 to process control model 558. Tying in the uncontrolled variables TO FIG. 1, the signal on line 578 corresponds to the M+3 uncontrolled variable, the signal on line 579 corresponds to the M+4 uncontrolled variable, while the signal on line 580 corresponds to the M+5 uncontrolled variable. These are shown in FIG. 1 by arrows 31.

It is seen in FIG. 15 that the set point on line 36 is supplied over line 581 to process performance computer 46. The electrical difference between the signals on line 38 and line 581 may be used as performance signal P1.

Turning to FIG. 16, line 37 is connected by the way of line 582 to process performance computer 46. The set point of this controller 33 is connected by line 584 to computer 46. The electrical difference between the signals on lines 582 and 584 is used as performance signal P1. These signals are supplied through the absolute error computer illustrated in FIG. 19. The output signal of the FIG. 19 illustrated error computer for performance signal P1 is supplied to circuit 180 of FIG. 5 as a performance input. In addition, the set point signal on line 36 can be supplied over line 581 to computer 46 at one of outputs "other input" 145 (FIG. 5) such that the difference in signal magnitude of the signals on lines 38 and 581 may represent performance P2.

Figure 17:
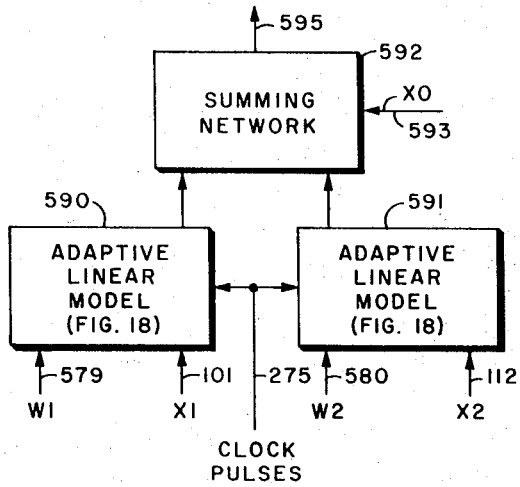
FIG. 17 is a block diagram of a process control model utilizable with the process control system illustrated in FIGS. 15 and 16.

A simplified block diagram of process control model 558 is shown in FIG. 17. The adaptive linear models 590 and 591 (illustrated in FIG. 18 and later described) supply these respective output signals to summing network 592. These two signals with the signal $X_0$ received over line 593 are combined in a linear manner (no limitation thereto intended) to generate a single modulated control signal on line 595. Line 593 is connected to line 39 in FIG. 16 and to line 40 in FIG. 15. Summing network 592 may be a resistance network connected to an input to an amplifier system of the differential type. Such constructions are well known and will not be further described for that reason.

The input signals to the adaptive linear models 590 and 591 are the two uncontrolled variables $W_1$ and $W_2$ respectively received over lines 579 and 580. The modulated control signals $X_1$ and $X_2$ are respectively received over lines 101 and 112 from self-optimizing performance controller 29. The line 275 carried clock pulses are received by both adaptive linear models 590 and 591 which gate the input signals on lines 579 and 580 into the adaptive linear models during RECEIPT of such clock pulses. The adaptive linear models average the input variables $W_1$ and $W_2$ to generate $\overline{W}_1$ and $\overline{W}_2$ signals, as well as respectively computing $X_1(W_1-\overline{W}_2)$ and $X_2(W_2-\overline{W}_2)$ as explained with respect to FIG. 18.

The pulse repetitive frequency of the clock pulses on line 275 in combination with the clock pulse width and the RC time constant of resistor 626 and cap action 627 are such that the $\overline{W}$ signal is an average of the W signal and the averaging period is a few decision periods. Therefore, the control signal on line 595 in a combination of the $X_0$ signal on line 593 and the $X_1$ and $X_2$ modulated control signals as altered by the adaptive linear models 590 AND 591.

Referring next to FIG. 18, the adaptive linear models 590 and 591 are explained. Both can be constructed identically. The W signal, representing an uncontrolled variable from one of the sensors, is received at terminal 600 and supplied through the RC network 601 and thence over line 602 to MOSFET 603. This is a direct input of the W signal into the adaptive linear model.

It is remembered that the W signal must be averaged such that the deviation from average of the uncontrolled variables can be utilized to solve equation (11) for simulating the process being controlled. To this end, MOSFET 605 receives the W signal from line 602 and selectively gates same to averaging circuit 606. The clock pulses from clock 55 are received over line 275 for periodically gating MOSFET 605 to current conduction. The duration of the clock pulses is short with respect to any changes in the W signal to provide an accurate sampled data system of averaging W in circuit 606.

The average established for the W variable in circuit 606 is subtracted from the presently received W signal in arithmetic circuit 607 which includes a pair of MOSFETs 603 and 608 which supply signals to the differential inputs of differential amplifier 609. The difference between the average value $\overline{W}$ and the presently read value W is multiplied in the signed multiplying bridge 610 with the modulated control signal X, and which then supplies its output signals through amplifier 611 to summing network 592 of FIG. 17. The modulated control signal X ($X_1$ or $X_2$ in FIGS. 15 and 16) supplied by self-optimizing performance controller 29 is received at terminal 615 and supplied through phase splitter 616 over a pair of lINES 617 and 618 to the junction FETs (Field-Effect Transistors) 619 and 620 in a signed multiplying bridge 610. The operation of signed multiplying bridge 610 is explained in the section on ANALOG DELAY NETWORKS and will not be described further at this time.

The clock signals on line 275 are continuously received and periodically open gate 605 such that the time constant of averaging circuit 606 will vary simultaneously with any change in frequency of operation of the process control system. Therefore, the averaging circuit 606 is continuously active during both the holding and decision periods to generate a true average of the uncontrolled variable. Based upon the assumption that the difference between the average signal from the uncontrolled variable and read signal or the present signal valve of the controlled variable is small, the linear model is an accurate representation of the process being controlled. It is understood that other forms of linear models may be used.

Averaging circuit 606 is constructed in a manner as shown for the analog memory amplifier described in the above referred to patent application. The output signal of MOSFET gate 605 is supplied over line 625 through resistor 626 to capacitor 627. Both the voltage terminals in the circuit (other than the reference potential terminals) respectively have guard planes 628 and 629 which are connected to line 602. Remembering that the difference between the amplitude average W in the capacitor 627 is relatively close to the actual amplitude of signal W received representing the present status of the uncontrolled variables, it is seen that the guard plane potential will be relatively close to the averaged signal potential. Averaging circuit 606 is an effective RC filter on the W signal of 602. The capacitance of this filter is provided by capacitor 627 and the effective resistance, R, is provided by resistor 626 multiplied by the period of the clock pulse on line 275 and divided by the width of this same clock pulse.

The subtraction circuit, including MOSFETs 603 and 608 and amplifier 609 presents a high impedance to averaging circuit 606 and line 602. MOSFETs are selected for this reason. Further, constant current source 630 of known design and operation is connected through potentiometer 631 to the source and substrates of the two MOSFETs 603 and 608 to provide a balancing adjustment between the two inputs of amplifier 609. The drain of MOSFET 608 is connected to the lower input of amplifier 609 which has a balancing resistor 632 for obtaining true subtraction in amplifier 609. Resistor 633 is a feedback resistor for amplifier 609.

The multiplying bridge 610, in addition to the junction field effect transistors 619 AND 620, includes two resistors 635 and 636. This bridge effects the multiplication of the difference between the uncontrolled variable W and its average $\overline{W}$ with the respective modulated control signal X from controller 29. It is understood that the output signal as provided by amplifier 611 is the product $X(W-\overline{W})$ for a partial solution of equation (11).

Amplifier 611 includes feedback resistor 640 and potentiometer 641. Potentiometer 641 adjusts the range of the adaptive linear models. This range adjustment is for the range of the modulated control signal received on terminal 615 from the self-optimizing performance controller 29.

ABSOLUTE OUTPUT ERROR COMPUTER

As described with respect to FIGS. 15 and 16, it was desired that the ORP error signal on line 557 to be supplied as performance P1 to process performance computer 46 should have its magnitude squared before being applied to the filter input of circuit 180 in FIG. 5. Such squared signal is used so that both positive errors as well as negative errors always have positive electrical polarity. An absolute value computer is equally as effective and such a computer is shown in FIG. 19 in block schematic form. The ORP signal is supplied over terminal 650 through current limiting resistor 651 to one input of differential amplifier 652. A reference signal input, such as the set point signal supplied over line 581 from set point line 36 of FIG. 16, is received at terminal 653. The reference signal is then supplied through current limiting resistor 654 to the upper input of differential amplifier 652. Resistor 655 connects a reference potential to the lower input for balancing the difference amplifier. Feedback resistor 656 completes the input stage of the error computer. The output signal of amplifier 652 on line 657 is the arithmetic difference of the two input signals on terminals 650 and 653.

Amplifier 659 of circuit 658 is a unity gain amplifier having equal summing resistor 680 and feedback resistor 660. If the signal on line 657 is positive, diode 665 passes the signal to summing line 666 and thence through small resistor 667 to output terminal 668. If the signal on line 657 is negative with respect to reference potential, then diode 665 will be reverse biased with no current flow therethrough effectively disconnecting line 657 from line 666. It is desired that the negative signals be supplied through terminal 668 as a corresponding positive signal of equal amplitude. In accordance therewith, circuit 658 transfers the negative signal through current limiting resistor 680 and inverts the polarity thereof at line 681 by unit gain amplifier 659. The magnitude of the signal on line 681 is the same as on line 657 but of opposite polarity. The signal on line 681 being positive then forward biases diode 682 and then supplies the signal over line 666 to output 668. If the signal on line 657 is positive, then amplifier 659 inverts it to cause a negative signal on line 681. This negative signal causes a reverse biasing of diode 682 to effectively disconnect line 681 from line 666. In this manner, one and only one positive signal is supplied to output 668.

ADAPTIVE FEED-FORWARD PROCESS CONTROL FOR PROCESSES HAVING EXTENDED DELAYS BETWEEN WILD VARIABLE MEASUREMENTS AND CONTROLLED VARIABLE MEASUREMENTS AND UTILIZING AN INTERPOSED PROCESS CONTROL MODEL

A drying system is illustrated in flow diagram form in FIG. 20 which uses the FIG. 1 illustrated process control system. A drying process is characterized by long delays. As a tie-in of the drying system as illustrated in FIG. 20 to the bleaching system described with respect to FIGS. 15 and 16, the FIGS. 15 and 16 illustrated systems may be the bleaching operations for paper pulp in preparation for the fabrication of paper. The dryer system shown in FIG. 20 may be the system used to dry the paper after it has been fabricated. Incoming wet paper is over input conveyor 690 and has its moisture sensed by sensor 691, the flow rate (i.e., the bulk) sensed by sensor 692, and the velocity sensed by sensor 693. These three sensors provide the three uncontrolled variables M+3, M+4 and M+5 as electrical signals respectively over lines 694, 695 and 696. These three lines correspond to the uncontrolled variables represented by vectors 31 in FIG. 1. After being sensed, paper is transported through dryer 697 with the dried paper being transported on a conveyor system in the direction of the arrow 698. The residual moisture within the dried paper is continually sensed by moisture sensor 699.

Such a continuous drying operation differs from the bleaching operation described with respect to FIGS. 15 and 16 in several pertinent aspects. The control effected is not at the input to the process which requires that the feed-forward control be substantially delayed from the time of original sensing and computation. The control to the dryer does not react instantaneously upon the product being dried because of dryer or oven time constant and characteristics of the particular product being dried. The preferred control strategy in controlling such a process is to introduce a lead-lag network to compensate for such process lags. Such lead-lag network is preferably combined with a delay network which compensates for The process control not being at the input of the drying process.

A process lag is compensated for by a leading control signal. A leading control signal (analog) has an amplitude in the direction of a desired change greater than that presently required in the process being controlled. Another way of describing it is that the control signal is such that the process would be overcontrolled to produce overshoot except for the time lag therein. On the other hand, a lagging control signal is such as to exert an undercontrol to compensate for a process having leading response characteristics.

Another difference is that the optimum control strategy for a drying process is not necessarily directly proportional to the input flow as was the case in the above-described bleaching application of the invention. This fact requires that the mass or volumetric flow rate be handled as an uncontrolled variable. Such flow rate sensed by sensor 692 may be computed also. If the thickness of the incoming paper and its width are constant, then a simple computer can receive the velocity signal on line 696 and compute the flow rate therefrom.

In a self-optimizing control system, the preferred delay time in exercising control is proportional to the velocity of the conveying system as sensed by sensor 693. A delay network is designed such that the delay is inversely proportional to the quantity $S(X_4)$ wherein S is the velocity of the conveying system and $X_4$ is the control signal output voltage. As used herein, the control signal is modulated and, therefore, the DC value of such modulated control signal is the value referred to in the term $S(X_4)$.

Further, drying operations are characterized by a relatively long delay time, i.e., a long process delay. Multiple cascading as used in the FIG. 16 illustrated bleaching system may not be practical in many drying applications. The process delay combined with additional lead-lag and a delay network must be adapted to suggest that possibly only one or two variables can be adapted at a given time. In such an instance, the optimizer can be selectively switched from one variable to another. This can be done automatically or manually. However, the optimizer shown in FIG. 20 is responsive to a plurality of variables to optimumly control the temperature of dryer 697 through controller 705 by optimally controlling the set point signal supplied over line 706. The dryer temperature is supplied from the dryer over line 707 to controller 705 with the resultant temperature control signal being supplied back to the dryer over line 708. The electrical signal on line 707 may be directly from a single sensor or may be a composite of several sensors, the choice of which is one of design and not pertinent to the successful practice of the present invention.

The moisture meter or sensor 699 supplies an electrical signal indicative of moisture over line 710 to controller 34 (compare with controller 34 in FIG. 1) which receives the set point signal over line 36 and supplies a control signal over line 40. Equation 11 as used for control of the process illustrated in FIGS. 15 and 16 is also utilized in the construction of the process control model 711 with line 40 supplying the $X_0$ signal to summing circuit 712.

The line 710 moisture indicating signal is supplied over line 38 to process performance computer 46. Line 38 is connected to circuit 653 of FIG. 19. The set point signal 36 is supplied over line 715 to process performance computer 46 and is connected to line 650 of FIG. 19. Process performance computer 46 supplies the total performance process signal over lines 47 and 48 to self-optimizing performance controller 29. Other inputs to process performance computer 46 are indicated by arrows 716.

The set point signal on line 715 may be supplied as both the high and low limit signals as shown in FIG. 6, i.e., supplied in lieu of the signals supplied through potentiometers 135 and 138. In such an instance, the set point signal is both the high and low limits and the system will optimize the moisture indicating signal on line 17 about the set point. In such an instance, the signal on line 38 would be supplied through terminal 121 of FIG. 6 into process performance computer 46. This is an alternate method for obtaining the absolute value of the error signal as described in FIG. 19.

Clock and modulation source 55 supplies the above-described signals to self-optimizing performance controller 29. The illustrated system includes four control channels supplying $X_1$, $X_2$, $X_3$ and $X_4$ modulated control signals respectively over lines 101, 112, 722 and 724 to process control model 711.

Process control model 711 includes a pair of adaptive linear models 718 and 719 which may be constructed as shown in FIG. 18. The assumption described with the accuracy of the adaptive linear model and the process control model as stated with respect to FIGS. 15 and 16 applies equallY well to the adaptive linear models 718 and 719. Adaptive linear model 718 receives $X_1$ modulated control signal over line 101 and the uncontrolled variable signal indicating flow rate over line 695. The clock pulses appearing on line 275, such as those shown in FIG. 7, are supplied to the adaptive linear models 718 and 719 to perform the averaging function as aforedescribed.

Adaptive linear model 719 receives the uncontrolled variable signal on line 694 indicating moisture content as well as the $X_2$ modulated control signal over line 112. The output signals of the two adaptive linear models 718 and 719 are supplied over a pair of lines to resistive summer 720. Here the similarities between the process control model 711 of FIG. 20 and the process control model 558 of FIGS. 15 and 16 disappear.

Figure 21:
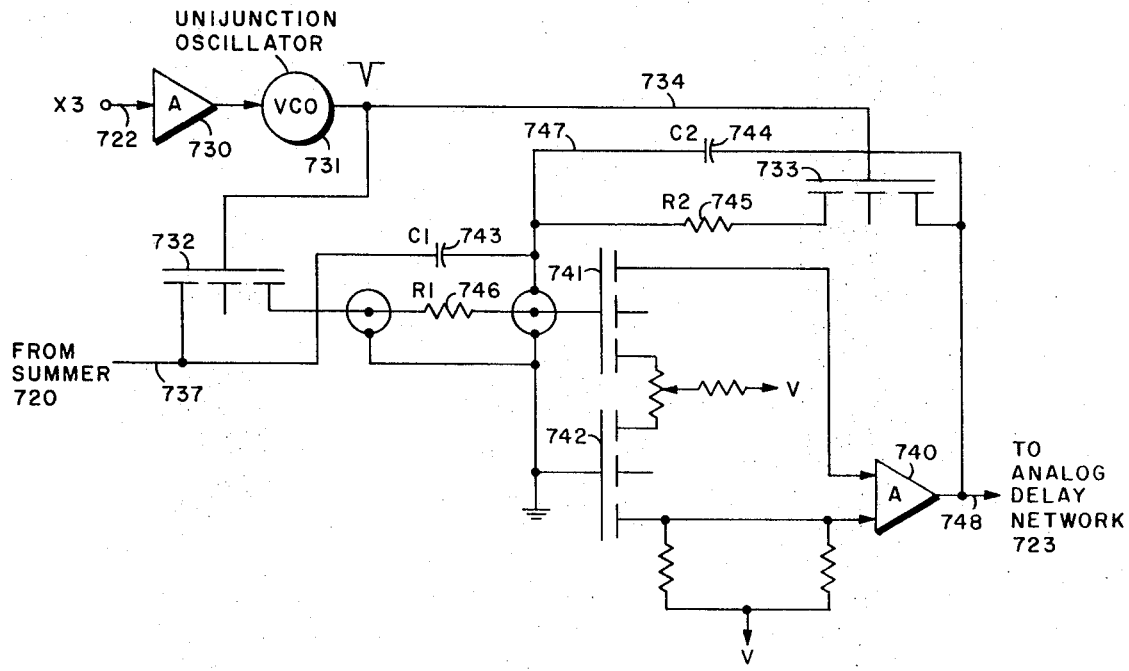
FIG. 21 is a simplified schematic diagram of a lead-lag network for the FIG. 20 illustrated process control system.

The output signal of resistive summer 720 is supplied to lead-lag network 721, described with respect to FIG. 21. Lead and lag network 721 also receives modulated control signal $X_3$ over line 722 from self-optimizing performance controller 29. Therefore, the lead and lag portion of equation (11) as supplied by the two adaptive linear models 718 and 719 is optimized in accordance with the performance signal supplied on line 38. The output signal of lead and lag network 721 is supplied to process control analog delay network 723 which also receives the uncontrolled variable signal indicating velocity from line 696. As before stated, the process delay is a function of velocity irrespective of the actual flow rate. This delay is optimized by the modulated control signal $X_4$ received over line 724 from self-optimizing performance controller 29. The delay by network 723 of the analog control signal having a lead or lag characteristic imposed upon it in an optimum manner by lead and lag network signal 721 is explained in full detail with respect to FIG. 22.

The modulated control signal adjusted according to optimized lead and lag and process delay is supplied over line 725 to summing circuit 712 wherein it is summed with the signal $X_0$ to generate the final set point control signal supplied over line 706. The single set point signal contains all the $X_1$, $X_2$, $X_3$ and $X_4$ orthogonal modulation components.

The FIG. 20 illustrated self-optimizing performance controller 29 has four control channels supplying four modulated control signals $X_1$, $X_2$, $X_3$ and $X_4$ to process control model 711 for supplying the single optimized modulated set point signal over line 706. The orthogonal modulations of the four modulated control signals are reflected through controller 705 into dryer 697. The performance resulting from such orthogonally modulated control signals is reflected back into process performance computer 46 and thence into the total performance indicating signals supplied over lines 47 and 48 to complete the control loop.

Dryer 697 must dry the paper to a certain specification as indicated by the set point signal on line 36 and as measured by the single sensor 699. Therefore, the three uncontrolled variables sensed by sensors 691, 692 and 693, which is substantially before the input of the drying process, are compensated for by the process delay in accordance with the velocity of the paper being supplied to dryer 697 and the $X_4$ modulated control signal on line 724. The lead and lag of the dryer operation with respect to the receipt of the temperature control signal on line 708 is optimally adjusted by lead and lag network 721 in response to the orthogonally modulated control signal $X_3$ supplied over line 722.

LEAD-LAG NETWORK

Figure 23:
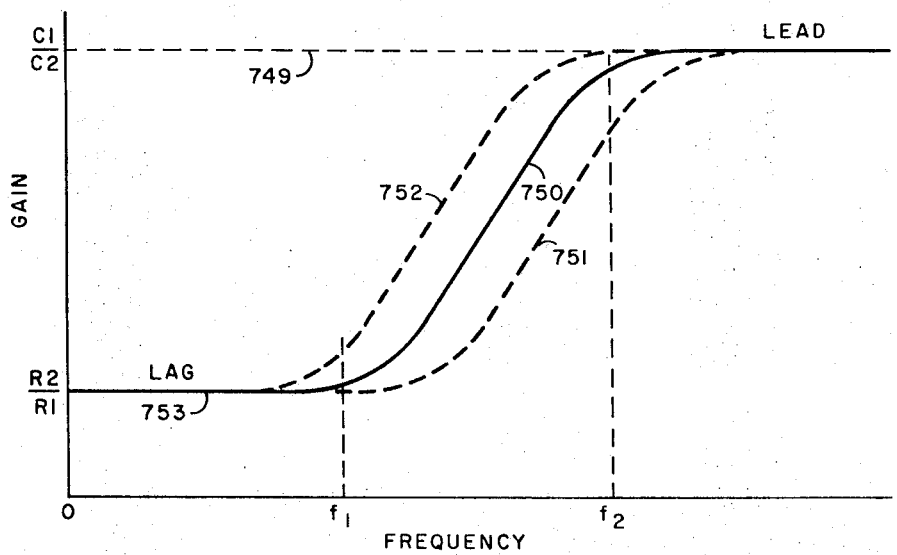
FIG. 23 is a graphical presentation of lead-lag characteristics as a function of a control frequency for the network illustrated in FIG. 21.

This network takes the modulated analog signal from summer 720 and amplifies such signal in accordance with curve 750 of FIG. 23. The higher frequencies are amplified as indicated by line 749, while the lower frequencies are amplified as indicated by line 753. The sloping portion of curve 750 is shifted between dotted lines 751 and 752 as later explained to adjust the lead-lag characteristics of the modulated analog signal toward optimum operation. The $X_3$ modulated initial signal controls such shifting of curve 750.

As illustrated in FIG. 21, the $X_3$ modulated control signal is supplied over line 722 through amplifier 730 to alter the frequency of pulse repetitiveness of pulses generated by oscillator 731 to thereby shift curve 750 in frequency between lines 751 and 752. Oscillator 731 may be a unijunction oscillator having an RC circuit connected to the control electrode of a unijunction transistor (not shown) such that there is a relaxation frequency in accordance with the voltage supplied thereto, as is well known. The output pulses of oscillator 731 are supplied to a pair of MOSFETs 732 and 733 over line 734. These two MOSFETs serve as gates and the pulses provide a sampled data system for providing the type of time constant control referred to for other elements of the illustrated process control system. The modulation of modulated control signal $X_3$ modulates the frequency of the pulse repetitiveness of the pulses supplied over line 734. The modulation is carried into the lead-lag network and will, therefore, effect the control signals supplied to dryer 697. The control signal input over line 737 from summer 720 represents the two terms of equation (11), $X_1(W_1-W_2)+X_2(W_2-W_2)$ respectively, calculated by adaptive linear models 718 and 719. Lead-lag network 721 adaptively adjusts the amplitude of components of such control signal to lead-lag in accordance with defined optimum operation of the process being controlled.

When the MOSFETs 732 and 733 are electrically nonconductive, i.e., there is no pulse being supplied over line 734 by VCO 731, the maximum gain of the amplifying system including differential amplifier 740 with its two input MOSFETs 741 and 742 is equal to the ratio of the capacitances $C_1$ and $C_2$ wherein $C_1$ is the electrical capacitance of capacitor 743 and $C_2$ is the electrical capacitance of capacitor 744.

When the MOSFETs 732 and 733 are electrically conductive (a pulse is supplied on line 734 by VCO 731), the gain of the amplifier system including differential amplifier 740 is equal to the ratio of the resistance value of resistor 745 (R2) to resistance value (R1) resistor 746. Because of the recurrent switching between current conduction and nonconduction of MOSFETs 732 and 733, the effective resistance between input line 737 and intermediate line 747 is equal to the value of the DC resistance of resistor 746 multiplied by the total time involved in the measurement divided by the time that MOSFET 732 is current conductive. In a similar manner, the effective resistance presented between intermediate line 747 and output line 748 by resistor 745 is equal to the total time divided by the current conducting time of MOSFET 733. Therefore, the total resistance will always be greater than the DC resistance of resistor 745.

The FIG. 21 illustrated circuit provides an adjustable lead and lag network that is adjustable with frequency in accordance with the modulated control signal received on input line 722 to cause the signal received on line 737 to lead-lag; the inflection points of the curve 750 are moved in the frequency domain by the $X_3$ signal. The slope between inflection points remains constant at 6 db/octave. It is remembered that a lead is defined as an output signal supplied over line 748 to delay network 723 which increases in amplitude at a rate of 6 db/octave above a selected lower frequency inflection point in line 737, whereas a lag is defined when the FIG. 21 illustrated circuit (lead-lag network 721) supplies a signal over line 748 which decreases in amplitude at a rate of 6 db/octave above a selected frequency. A lead-lag network is a combination of these two basic networks with resulting form as shown in FIG. 23. The term lead-lag implies that the lead inflection point is ahead of the lag inflection point.

If $R_1{}^*$ represents the effective resistance between lines 737 and 747 and $R_2{}^*$ represents the effective resistance between lines 747 and 748, the circuit can be analyzed by linear circuit techniques with the resulting transfer equation in the S domain as follows:

$$\frac{Eo(S)}{En(S)} = \frac{C_1}{C_2}\left(\frac{S+\frac{1}{R_1{}^*C_1}}{S+\frac{1}{R_2{}^*C_2}}\right) = G(S)$$

The lead inflection point is at the frequency $$fo = \frac{1}{2\pi R_1{}^*C_1}$$

and the lag inflection point is at the frequency $$fp = \frac{1}{2\pi R_2{}^*C_2}$$

The low frequency gain is the limit of this equation as S approaches 0 or $$G_o = \frac{R_2{}^*}{R_1{}^*}$$

The high frequency gain is the limit $S \rightarrow \infty$ or $$G_\infty = \frac{C_1}{C_2}$$

Since the $R_1{}^* = R_1\left(\frac{Tp}{Tw}\right)$ $$R_2{}^* = R_2\left(\frac{Tp}{Tw}\right)$$

where Tp is the total time between pulses to gates 732 and 733 and Tw is the duration of the above pulses. Since the duration is constant, the resistors are inversely proportional to the frequency of the oscillator 731. This means that the inflection frequencies will be proportional to the frequency of oscillator 731 with a constant ratio of $\frac{fo}{fp} = \frac{R_2 C_2}{R_1 C_1} =$ constant This means that the frequency domain characteristics will move from curve 752 through 750 to 751 as the frequency of oscillator 731 is increased. The maximum slope of the gain characteristic will remain constant at 6 db/octave.

The above derivation is very accurate if the bandwidth of the signal on line 737 is small compared with the lowest frequency of the oscillator 731. This is well known in the theory of sample data systems and will not be proved. The filter 601 of FIG. 18 assures that the above inequality is satisfied.

The ratio of the capacitance $C_1$ to $C_2$ in a constructed embodiment was made approximately ten times the ratio of resistances $R_2$ to $R_1$. This ratio of ten to one is to limit the high frequency process noise from degrading system performance. If one had a noiseless system, then the ratio would preferably be made higher.

The need for a lead-lag network is to effectively cancel the lag inherent in the control means as well as inertial of the processes. This lag characteristic may not be known so that a constant lead-lag network can be designed for proper cancellation of its effect on the process. Also, this lag may change with time, temperature, and other parameters of the process so that it is necessary that means be provided for adjusting the lead-lag to follow these variations in order to continuously obtain optimum control. Fast processes will require lead-lags toward close to curve 751 whereas slower processes will require curves closer to 752.

Illustrated embodiment teaches that the variation or modulation of the pulse repetitive frequency of the pulses on line 734 is used to adjust the lead or lag. This is used because it is desired to maintain the pulse duration short. However, by proper design, pulse width modulation can be used with equal facility to modulate the duty cycle of MOSFETs 732 and 733 to adjust the lead-lags slope of curve 750 between dotted lines 751 and 752.

ANALOG SIGNAL DELAY NETWORK

An analog delay network utilizing cascaded delay stages delays an analog signal a predetermined amount without dispersion is advantageously employed herein. Included in this network is a MOSFET input gate clocked by an oscillator in accordance with performance criteria derived from the process being controlled. The analog signal is supplied through the gate and is stored in the first large capacity capacitance. The stored charge is then supplied to a smaller capacitor through a large impedance which in turn is connected to the field electrode of an output MOSFET. The output MOSFET then drives the next succeeding stage. Some of the stages in the delay network may have a reset circuit for adjusting the analog signal back to its true value. Such adjustment compensates for any alteration of the analog signal while being processed through various delay stages.

Referring particularly to FIG. 22, the analog signal to be delayed is received over line 748 by first delay stage 760. The analog signal delay network has a plurality of such stages 761, 762, 763 and 764 which then supply an output signal over line 725. Each of these delayed stages may be constructed identically. Each stage has an input MOSFET gate 766 which gates the input analog signal or the received analog signal without amplification and minimum attenuation to a large capacitance memory capacitor 767. The MOSFET gate receives a gate enabling pulse of short duration over line 765 as will be described later. The MOSFET gate 766 is maintained current conductive a sufficient period of time such that the voltage stored across the capacitor 767 is equal to the voltage received on line 748. Upon the closure of MOSFET gate 766 (i.e., it is electrically nonconductive), the analog voltage stored in capacitor 767 is supplied through high impedance resistor 771 to small capacitance capacitor 772. The time MOSFET 766 is current conductive is short and the impedance of resistor 771 is sufficiently large to prevent any changes in the stored electric charge in capacitor 772 while capacitor 767 is being charged. Also, the relationship of the capacitances of capacitors 767 and 772 is such that capacitor 767 is only slightly discharged by charging capacitor 772 to its full value. Further, this small change in stored voltage across the capacitor 767 is reduced in that the changes in the analog signal input on line 748 are relatively small. The pulse repetitive frequency of the control pulses on 765 are such that a true analog magnitude is stored in the capacitors of 767 and 772.

In order to decrease leakage of the electric charge stored in capacitors 767 and 772, a pair of guard planes 769 and 770 are fabricated in accordance with the patent application referred to above. Line 768 connects the guard planes to input line 748. Therefore, the guard planes are maintained at the input voltage. Since this voltage is substantially the same as that stored across capacitors 767 and 772, there is insubstantial leakage.

Output gate MOSFET 773 has its insulated field electrode connected to the junction between resistor 771 and capacitor 772 for forming an output connection. It acts as a source drain amplifier with the drain being connected over line 774 to −V voltage. The source and substrate are connected together to form a common output junction at 775 which in turn is connected through resistor 776 to positive voltage source V. Junction 775 serves as the output connection of the delay stage 760 and as input connection to the next subsequent delay stage 761.

The pulses on line 765 actuate all of the input MOSFET gates simultaneously in all of the delay stages. Therefore, the analog signal input is first stored in capacitor 767 of delay stage 760. At the next succeeding line 765 pulse, the stage 760 stored signal is transferred to delay stage 761, etc., through all of the delay stages until the analog signal is supplied over output line 725. Therefore, the time delay in the analog signal being processed from the input line 748 to the output line 725 is determined by the pulse repetitive frequency of the pulses on line 765 and the number of delay stages.

In capacitor storage delay networks, it is not uncommon that if a large number of delay stages are interposed between the input and output portions, there may be a degradation of the analog signal in that magnitude may decrease. This decrease in magnitude can be determined for each delay network. Therefore, there is provided external additions to delay stage 763 which resets the magnitude to the correct amplitude, i.e., gain is introduced to adjust for any amplitude changes of the analog signal being processed. The output amplifier is connected through a potentiometer 779 having a shorting bar 781 thereacross, instead of a fixed resistor, to voltage V. Drain resistor 782 is interposed between the drain electrode of the output MOSFET and the −V voltage. The gain provided by the output MOSFET in delay stage 763 is controllable by adjustment of shorting bar 781 such that the analog signal magnitude may be restored to its true value. The other delay stages have fixed source resistors 777, 778 and 780 connected to positive voltage V.

The pulses on line 765 are generated in accordance with the velocity of the paper to be dried as shown in FIG. 20 and determined by velocity sensor 693. This velocity is compared with a reference and then multiplied by the modulated control signal $X_4$ as received over line 724. Modulated control signal $X_4$ is received from self-optimizing performance such that the delay time between line 748 and line 725 for the analog signal can be optimally adjusted for proper operation for dryer 697.

Since control signal $X_4$ is modulated, the pulse repetitive frequency of the pulses on line 765 is correspondingly modulated to determine optimum delay.

The velocity signal is received over line 696 and supplied through resistive dividing network 790, 791 to one input of differential amplifier 792. The other or upper input of amplifier 792 is a reference signal received through resistor 793. The reference potential may be the same reference potential as used throughout the system or may be any arbitrarily selected reference in accordance with system design. Resistor 794 is the feedback resistor connection output line 796 to the reference input at resistor 793. The differential voltage on line 796 is then supplied to multiplying bridge 797 through the two bridge resistors 800 and 801. The bridge is completed by a pair of junction field-effect transistors 802 and 803. Transistor 802 has its control electrode connected to ground reference potential to serve as a reference point in the bridge. The control electrode of junction field-effect transistor 803 is connected via line 807 to the junction of resistors 805 and 806 for receiving a reference potential determined by the resistances thereof. The modulated control signal is superposed on the DC reference on line 807 through resistor 804. Multiplication of the differential signal on line 796 and the modulated control signal supplied on line 807 is in accordance with known analog multiplication techniques utilizing bridge circuits. This action will not be further explained for that reason. The output signals of the bridge are supplied through resistors 808 and 809 to differential amplifier 810. Resistor 811 is a feedback resistor from the output line 815 to input line connected to resistor 808. If the bridge is in balance, then the amplifier supplies zero voltage over line 815. Whatever difference there is in accordance with the unbalance end of the bridge (which indicates a multiplication of the velocity and the modulated control system) is supplied over line 815 through amplifier 816 to control the frequency oscillation of VCO 817. VCO 817 is a voltage controlled oscillator preferably of the unijunction type wherein there is a resistor-capacitor network connected to the control electrode of a unijunction transistor (not shown). The effect of varying the voltage on the frequency of the output pulse is well known.

I claim:

1. A process control system for controlling a process toward a defined optimum condition, the improvement including the combination,
   means, including sensing means, for generating measurement signals indicative of measurements made by such sensing means for indicating performances of said process caused by variations in plural variables of such process,
   computer means receiving said signals and having programming therein including performance criteria which are compared with said signals and are utilized in the computer for generating a single total performance signal indicative of all such comparisons, and means responsive to said total performance indicating signal for generating signals having opposite polarities but equal amplitudes and being indicative of said total performance signal,
   clock and modulation source means generating a plurality of orthogonal modulation signals alternating between first and second signal states and each having a given phase, and a period signal, there being one orthogonal modulation signal each for each variable to be optimumly controlled, and
   a plurality of control channels, one control channel each for each variable to be optimumly controlled and receiving one of said orthogonal modulation signals and supplying modulated control signals respectively by said orthogonal modulation signals for said process being controlled for effecting optimum operation thereof, all of said control channels receiving both said opposite polarity signals,
   gating means in each said control channels for gating on a time sampled basis said opposite polarity signals with said respective orthogonal modulations and said control channel having integration means for integrating results of said gating for supplying a control signal in accordance with said opposite polarity signals changing in accordance with process performance variation caused by the respective orthogonally modulated variable, and
   said control channels and said computer being responsive to said period signal to perform changes in said modulated control signals over repetitive finite time intervals and having alternating intervals in which the amplitude of said control signals is maintained, said computer being responsive to said period signal to generate said total performance indicating signal for indicating optimum operation during said alternating intervals and during periods in which said control signals are to be changed said total performance indicating signal indicating the actual performance of said process being controlled.

2. The process control system of claim 1 further including a controller for being operatively associated with said process to receive a signal indicating measurement of a performance and compares such measurement signal with a set point to supply a signal indicative of such comparison, and means jointly responsive to one of said control channel supplied control signals and said controller supplied signal to generate another control signal for controlling a variable in said process.

3. The process control system of claim 1 wherein one of said control channels includes auxiliary control signal means including means for receiving a signal,
   means jointly responsive to said received signal and to a control signal generated by said control channel in response to said opposite polarity signals to generate another control signal for said process.

4. The process control system of claim 1 further including,
   controller means operatively associated with said process for receiving a performance indicating measurement signal and operative to compare said performance indicating measurement signal with a set point for supplying an analog control signal to said process for controlling a variable therein that has an effect on the given performance indicated by said performance indicating measurement signal,
   certain other variables in said process affecting said given performance, some of said other variables being controlled by plural ones of said control channels such that said process performance is optimized as to said other variables to said given performance within a constraint on optimization effected by said controller means.

5. The process control system of claim 1 wherein said computer established performance criteria has an upper and lower bound, said computer being responsive to said measurement signals having values within said bounds, respectively, for effectively disconnecting such measurement signals from affecting calculation of said total performance signal and further responsive to such measurement signals when out of said respective bounds to include such value in generation of said total performance signal.

6. The process control system of claim 1 wherein said orthogonal modulation signals continuously modulate said control signals supplied by said respective control channels irrespective of an action or inaction of said control channels with respect to the optimization of said process
   and said clock and modulation source means further generating clock pulses having a pulse repetitive frequency greater than any frequency of said modulation signals,
   said modulation signals each having first and second alternately occurring signal states, and
   means for combining said clock pulses and said modulation signals for supplying first and second bursts of said clock pulses respectively corresponding to said first and second signal states for each of said modulation signals.

7. The process control system of claim 1 wherein the duration of said time sampling for said integration is short with respect to duration of any cycle of said orthogonal modulation signal used to modulate the control signal in the respective control channel such that the frequency of modulation may be altered without affecting integration time and thereby not affecting the gain of such respective control channel.

8. The process control system of claim 1 wherein said duration of said time sampling is short with respect to duration of any cycle of any of said orthogonal modulation signals used in such systems.

9. The process control system of claim 1 wherein said computer has a process condition detection means and being responsive to detection of a given process performance condition to inhibit all actions of said control channels tending to change values of the respective control signals as long as said given condition exists.

10. The process control system of claim 9 wherein said process condition detection means is responsive to said total performance indicating signal exceeding a predetermined amplitude to inhibit action of said control channels.

11. The process control system of claim 1 wherein said modulation signal for each of said control channels consists of complementary rectangular signals, one of said complementary rectangular signals gating to said integration means one of said opposite polarity signals only during one-half cycle of every cycle thereof and the complementary modulation signal other than said one complementary modulation signal gating to said integration means only during half-cycles of each cycle other than said one-half cycles.

12. The process control system of claim 1 wherein said control channel includes gating means jointly responsive to the modulation signal modulating the control signal thereof for successively gating to said integration means said opposite polarity signals during alternate half-cycles of such modulation signal.

13. The process control system of claim 1 further including electrical filter means in said computer means for receiving a signal to be included in generation of said total performance indicating signal, said filter means being adjustable.

14. The process control system of claim 1 further including means in said clock and modulation source means for delaying any integration in said control channels a predetermined time after onset of a modulation half-cycle calling for integration.

15. The subject matter of claim 1 wherein said clock and modulation source means includes phase reversing means for selectively reversing the phase of some of said orthogonal modulation signals during said alternating intervals from their respective given phases.

16. The subject matter of claim 15 further including noise signal generation means and said phase reversing means being responsive to said noise signal generating means to reverse said phases of said orthogonal modulation signals in accordance with noise signals to result in a random seqUence of phase reversals.

17. The subject matter of claim 1 wherein said clock and modulation source means includes a single frequency generation means from which all of said orthogonal modulation signals, said period signals are derived, and noise signal generation means operatively connected to said single frequency generating means for altering the frequency of operation thereof in accordance with said noise signals.

18. The subject matter of claim 1 wherein one of said control channels has analog memory means receiving signals from said integration means for storing integrated amplitudes therefrom, and second gating means interposed between said integration means and said analog memory means for selectively gating said integrated amplitudes to said analog memory means, said second gating means being responsive to said period signal when indicating on alternating intervals to gate said integrated signal to said analog memory means.

19. The subject matter of claim 18 further including in one of said control channels, means for receiving an analog signal to be tracked, signal combining means receiving one of said control signals and combining same with said analog signal, to form a tracked analog signal, and tracking gating means connected to said integration means in said one channel for selectively passing said tracked analog signal to said integration means.

20. The subject matter of claim 18 further including, means to receive a reset control signal, signal combining means receiving a control signal and an integrated amplitude from one of said control channels to supply a reset to memory analog signal, and gating means electrically interposed between said signal combining means and said integration means in said one channel and responsive to said reset control signal to supply said stored integrated amplitude to said integration means such that said integration means adjusts its integrated amplitude to said stored integrated amplitude, if different.

21. The subject matter of claim 1 further including process control model means receiving some of said modulated control signals, and further receiving some of said signals indicative of measurements made by said sensing means, said process control model including adaptive linear model means having circuit means operative as a representation of a process performance and combining said signals indicative of measurements and said modulated control signals for supplying another control signal to the process being controlled.

22. The subject matter of claim 21 further including first controller means receiving a first set point signal and one of said signals indicating a measurement and supplying a first controller signal in joint response to said first set point signal and said one measurement signals, said process control model means receiving said first controller signal and combining same with said another control signal for supplying a single control signal including signals derived from said first controller means and from said modulated control signal.

23. The subject matter of claim 22 further including second controller means receiving another one of said signals indicating one of said measurements and being electrically interposed between said first controller and said process controller model means for receiving as a set point said first controller signal and generating and supplying to said process control model means a second controller signal in place of said first controller signal, said process control model means receiving only said second controller signal and combining it with said modulated control signal for supplying another control signal.

24. The subject matter of claim 21 wherein said process control model means further includes delay means electrically interposed between said adaptive linear model means and the process being controlled for receiving said another control signal from said adaptive linear model means and delaying same, said process delay means further receiving another modulated control signal and further receiving a measurement signal and jointly responsive to the two last mentioned signals to adjust the delay of said another control signal in joint accordance with said measurement signal and said another modulated control signal.

25. The subject matter of claim 24 wherein said process control model means further includes lead and lag means receiving a third modulated control signal and being electrically interposed between said process delay means and said adaptive linear models and being responsive to said yet another modulated control signal to adjust the frequency characteristics of said another control signal in accordance with said third modulated control signal.

26. A plural control-channel process-control system for controlling a process having plural performances resulting from plural interacting variables in accordance with control signals modulated by a different modulation signal for each control signal from the respective control channels, said modulation signals being orthogonal signals, said process supplying plural signals respectively indicative of process performances, means responsive to such plural performance signals for supplying at least one signal indicative of total process performance in accordance with such plural performance signals, the improvement including the combination, plural control channel means including integration means receiving said modulation signals, respectively, and responsive thereto to activate said integration means over repetitive finite time intervals for integrating said total performance signal and supplying same to control such process, clock means supplying strobe pulses having pulse durations less than any period of said modulation signals for the respective control channels, plural gating means respectively in said plural control channels and jointly responsive to said strobe pulses and, said respective modulation signals and receiving said total performance signal to supply sets of pulses to said integration means of opposing polarities respectively during alternate one-half cycles of said respective modulation signals, and means for altering the frequency of modulation without affecting said integration such that the speed of response of the system may be altered without affecting gain of the system.

27. The process control system for controlling a process with a plurality of control channel means, clock source means generating modulation signals and quadrature modulation signals whose frequencies are related by the series 1, 2, 4, 8,... and supplying the same to said control channels, respectively, each of said control channels being responsive to said modulation signals to supply a control signal modulated by said modulation signals, respectively, means responsive to the performance of process being controlled for supplying performance indicating signals to said control channels, each of said control channels being responsive to said supplied signals for determining a gradient of process performance generated in accordance with said modulated control signals, and means for adding penalties to the performance signal for imposing plural constraints on the operation of said process control system such that the process is optimized within such set of constraints, said constraints including weighted limits on variations of plural variables in said process.

28. A process control system for controlling a process which supplies plural signals respectively indicative of like plural performance of a process from which a total process performance can be ascertained, and such process being responsive to control signals from a process control system to adjust variables in the process which affect such performances, the improvement including the combination, first means for supplying timing and modulation signals including quadrature modulation signals whose frequencies are related by the series 1, 2, 4, 8,... to modulate said control signals supplied to said process for effecting a dithered control of at least some of said variables with modulation having first and second half cycles, modulation of the respective variables having an orthogonal relationship, second means for receiving said plural performance signals of said process at least during modulation of said controlled variables and generating a single total performance indicating signal in accordance with said measured performances, separate third means for each of said dithered controlled variable being jointly responsive to said total performance signal and said modulation of said respective control signals for simultaneously generating changes in said respective modulated control signals such that the total performance indicating signal for both half cycles of said modulation is equal or tends to become equal in amplitude with respect to the respective control signal modulations.

29. The process control system of claim 28 wherein said second means includes plural out-of-bound detector means respectively receiving said performance signals for comparing same with an electrically established bounds on the respective performances, and generating a first signal when said performance signal exceeds said one of said bounds, and current summing means connected to said out-of-bound detectors and responsive to said first signals to generate said single total performance signal.

30. The process control system of claim 29 wherein said current summing means has input connections other than to said out-of-bound detectors for receiving signals other than said performance signals indicative of said measured performances and responsive thereto for imposing an electrical effect on the generation of said single total performance signal.

31. The process control system of claim 29 wherein said second means includes upset detector means receiving said total performance signal and responsive thereto when exceeding a predetermined magnitude to supply an inhibit signal to each said separate third means for inhibiting any changes from being made in any said control signals.

32. The process control system of claim 29 wherein said second means further includes period clamp circuit means receiving a timing signal from said first means and connected to said current summing means and responsive to said timing signal for repetitively clamping same to a reference potential indicative of optimum performance thereby inhibiting said separate third means from changing said control signals and further responsive to said timing signal to enable operation of said current summing means for repetitive finite time intervals, each finite time interval having an integral time relationship with cycle times of all said modulation signals.

33. The process control system of claim 28 wherein one of said separate third means includes signal receiving means for receiving an auxiliary signal, mixing means receiving said control signal from said one separate third means and said auxiliary signal and jointly responsive thereto to generate another control signal.

34. The subject matter of claim 33 wherein said auxiliary signal is one of said plural performance signals and said mixing means exhibits electrical characteristics representative of a relationship of said one plural performance signal and said control signal from said one separate third means as to operation of the process being controlled.

35. A process control system for controlling a process toward optimal operation to perform a given function, said process being responsive to plural control signals to effect variations in operation and supplying plural signals indicative of plural process performances, the improvement including the combination, controller means including set point means, said controller being jointly responsive to said set point means and to said function being performed to generate a control signal and supplying same to said process for effecting control of a first variable in said process, said process being responsive to said control signal for altering operation thereof, plural sensing means for sensing a plurality of performances in said process and supplying a performance indicating signal for each sensed performance, computer means jointly responsive to said plurality of measured performances to generate a signal indicative of the relationship thereof as to a total process performance, optimizing controller means including orthogonal modulation means jointly responsive to said signal indicative of total process performance, said first variable and said orthogonal modulation means for simultaneously adjusting a plurality of variables such that said total performance indicating signal is adjusted toward a predetermined magnitude, and said modulation means utilizing modulation signals and quadrature modulation signals whose frequencies are related by the series 1, 2, 4, 8,...

36. A process control system for a process having plural performances resulting from plural interacting variables, the improvement including the combination, first means for receiving measurement signals indicative respectively of said plural performances, computer means receiving said measurement signals and responsive thereto to generate a single total performance indicating signal $P(t)$ in accordance with $$\sum_{x=1}^{x=j} \frac{DxH}{2} (Px - SxH + |Px - SxH|)$$

$$+ \frac{DxL}{2} (SxL - Px + |SxL - Px|)$$

wherein

Px are measured process performances,

SxH are high limits on optimum process performances,

SxL are low limits on optimum process performances,

DxH are assigned weighting factors indicative of degraded total process performance $P(t)$ when the measured performance Px exceeds the high limit SxH on optimum process performance, DxL are assigned weighting factors indicative of degraded total process performance $P(t)$ when the measured performance Px exceeds the low limit SxL on optimum process performance, the slashed lines / / indicate absolute magnitude of the polarity assigned to the respective Px, and control means including means for generating orthogonal modulation signals responsive to said process total performance signal $P(t)$ and to said modulation signals to respectively generate plural orthogonally modulated control signals for respectively controlling plural variables in said process.

37. The process control system of claim 36 further including signal supply means supplying a further signal to said control means, and said control means being jointly responsive to said further signal and one of said control signals to generate another control signal.

38. The process control system of claim 36 further including an analog controller receiving a measurement of a performance from said process, comparing said measurement with a Set point in said controller and supplying one control signal to said process for controlling one variable in said process such that interaction of said plural variables and said one variable effects an optimization of said one variable with respect to process total performance even without modulating said control signal.

39. The subject matter of claim 36 further including process control model means interposed between said control means and the process being controlled receiving predetermined ones of said plural orthogonally modulated control signals and receiving other indicating signals respectively indicative of predetermined process performances, said process control model means including signal processing model means having signal processing characteristics approximately representative of at least some operation of the process being performed for simulating such process performances, and said signal processing model means receiving said other indicating signals and said predetermined ones of said orthogonally modulated control signals to produce a single control signal from said predetermined ones of said orthogonally modulated control signals in accordance with the relationship of said other indicating signals and said approximate representation.

40. A process control system having a plurality of control channels for supplying a plurality of orthogonally modulated control signals for controlling a plurality of variables and responsive to a plurality of measurement signals for effecting changes in said control signals, the improvement including the combination, a source of pulses supplying clock pulses having a given repetition rate, counter means receiving said clock pulses and responsive thereto to generate a plurality of orthogonal signals in synchronism with said pulses, said orthogonal signals having alternating first and second signal states, process performance computer means receiving at least one of said measurements and responsive thereto to supply a single performance indicating signal, self-optimizing performance controller means receiving said performance signal, and said orthogonal signals and being responsive to one of said orthogonal signals having a frequency lower than other ones of said orthogonal signals for serving as a period signal with first and second alternating period signal states, a plurality of control channels in said self-optimizing performance controller and receiving said performance signal, each channel receiving a different one of said orthogonal signals, each channel including input gating means jointly responsive to said period signal being in said first period signal state, said pulses and the respective one of said orthogonal signals for supplying said performance signal respectively as positive and negative pulses during said first and second portions of said orthogonal modulation signals, respectively, integration means in each said control channels receiving said supplied positive and negative pulses for integrating same, analog memory means in each of said control channels including gating means which are responsive to said period signal in said second signal state to gate the integrated signal to said analog memory means and being further responsive to said period signal in said first signal state to block the passage of said integrated signal to said analog memory means, modulation means in each of said control channels receiving signals from said analog memory means and the respective ones of said orthogonal modulation signals for modulating the output of said analog memory means and supplying same as one of the orthogonally modulated control signals, and further means responsive to said orthogonally modulated control signals for effecting control over a process, said last mentioned means including means receiving said clock pulses and another signal for adjusting said orthogonal modulated signals in accordance with said another signal, and frequency adjustment means connected to said pulse generating means for adjusting the frequency of operation thereof for altering the frequency of operation of said process control system.

41. The subject matter of claim 40 wherein said further means includes an adaptive model means receiving one of said orthogonally modulated control signals, said clock pulses and one measurement signals, averaging circuit means in said adaptive model means jointly responsive to said clock pulses and to said one measurement signal for averaging said measurement signal, multiplying means receiving said measurement signal and an output signal from said averaging circuit means and jointly responsive thereto to provide a first multiplied control signal, phase splitting means receiving said one orthogonally modulated control signal and supplying complementary ones of said one orthogonally modulated control signal to said multiplying means, said multiplying means being jointly responsive to said multiplied control signal and to said complementary one orthogonally modulated control signals to supply an adapted control signal, and signal combining means receiving said adapted control signal and another signal and combining same to provide a single control signal for controlling at least one variable in said process.

42. The subject matter of claim 41 further including delay means receiving one of said control signals and another one of said orthogonally modulated control signals and yet another signal and jointly responsive to the last mentioned three signals received thereby to delay the said one control signal an amount of time determined cojointly by said another one of said orthogonally modulated signals and said another signal and supplying a signal to said signal combining means for supplying a delayed control signal thereto to be used in the generation of said single control signal.

43. The subject matter of claim 40 wherein said counter means supplies a delay signal to said input gating means for inhibiting the supplying of positive and negative pulses to said integration means until a predetermined time after transition of the one of said orthogonally modulated signals from one signal state to another signal state.

44. The subject matter of claim 40 further including noise signal generation means supplying control signals to said counter means for altering said period signal such that said second signal state has a duration different in accordance with said received noise control signals such that the changes effected in said orthogonally modulated control signals are effected on a random time basis.

45. The subject matter of claim 40 further including random noise generation means connected to said source of pulses for randomly altering the frequency of operation thereof such that the clock pulses have a varying pulse repetitive frequency and that all of said orthogonally modulated control signals have a randomly modulated frequency, the duration of said clock pulses remaining constant such that the gain of the process control system remains constant irrespective of the variation of frequencies of modulation and of said clock pulse repetitiveness.

46. The subject matter of claim 40 wherein said further means comprises process control model means including signal processing circuits representative of certain characteristics of a process being controlled, said process control model means receiving a set of said orthogonally modulated control signals from said self-optimizing performance controller, further receiving a set of measurement signals, a first controller receiving a measurement signal and a set point signal and supplying a first controller signal to said process control model means, and said process control model means being jointly responsive to said first controller signal, and said sets of signals to generate a single control signal in accordance with said certain characteristics.

* * * * *